US 11,097,769 B2

(12) United States Patent
Kodera

(10) Patent No.: US 11,097,769 B2
(45) Date of Patent: Aug. 24, 2021

(54) STEERING CONTROL DEVICE

(71) Applicant: JTEKT CORPORATION, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 324 days.

(21) Appl. No.: 16/424,634

(22) Filed: May 29, 2019

(65) Prior Publication Data

US 2019/0367075 A1 Dec. 5, 2019

(30) Foreign Application Priority Data

Jun. 1, 2018 (JP) .............................. JP2018-106409
Jun. 1, 2018 (JP) .............................. JP2018-106410
Jun. 1, 2018 (JP) .............................. JP2018-106411

(51) Int. Cl.
*B62D 5/04* (2006.01)
*B62D 5/00* (2006.01)

(52) U.S. Cl.
CPC .............. *B62D 5/046* (2013.01); *B62D 5/003* (2013.01); *B62D 5/006* (2013.01); *B62D 5/0481* (2013.01)

(58) Field of Classification Search
CPC ........ B62D 5/046; B62D 5/003; B62D 5/006; B62D 5/0481
See application file for complete search history.

(56) References Cited

U.S. PATENT DOCUMENTS

| 8,544,592 | B2* | 10/2013 | Goutsu ................ | B62D 6/002 180/402 |
| 2002/0129988 | A1* | 9/2002 | Stout .................... | B62D 6/008 180/400 |
| 2008/0021614 | A1* | 1/2008 | Endo .................... | B62D 6/008 701/41 |
| 2010/0077847 | A1* | 4/2010 | Joe ...................... | B60W 40/101 73/146 |

(Continued)

FOREIGN PATENT DOCUMENTS

| EP | 2 772 409 A2 | 9/2014 |
| EP | 3 219 580 A1 | 9/2017 |

(Continued)

OTHER PUBLICATIONS

Nov. 7, 2019 Extended Search Report issued in European Patent Application No. 19177350.6.

*Primary Examiner* — Peter D Nolan
*Assistant Examiner* — Wae L Louie
(74) *Attorney, Agent, or Firm* — Oliff PLC

(57) ABSTRACT

A steering control device includes a control unit, and the control unit includes a target steering angle calculating unit configured to calculate a target steering angle based on a steering torque and is configured to calculate a target reaction torque based on execution of feedback control for causing the steering angle to match the target steering angle. The control unit includes a plurality of axial force calculating units configured to calculate a plurality of kinds of axial forces acting on a turning shaft based on different state (Continued)

quantities and a grip state quantity calculating unit configured to calculate a grip state quantity based on the plurality of kinds of axial forces. The target steering angle calculating unit is configured to calculate the target steering angle in consideration of the grip state quantity.

17 Claims, 28 Drawing Sheets

(56) References Cited

U.S. PATENT DOCUMENTS

| | | | | |
|---|---|---|---|---|
| 2012/0197493 | A1* | 8/2012 | Fujimoto | B62D 5/0463 |
| | | | | 701/41 |
| 2014/0343794 | A1* | 11/2014 | Tamaizumi | B62D 5/0472 |
| | | | | 701/42 |
| 2017/0073000 | A1* | 3/2017 | Numazaki | B62D 15/0265 |
| 2017/0267276 | A1* | 9/2017 | Kodera | B62D 6/008 |
| 2019/0233005 | A1* | 8/2019 | Maeda | B62D 6/04 |
| 2019/0367075 | A1* | 12/2019 | Kodera | B62D 6/008 |
| 2019/0367079 | A1* | 12/2019 | Kodera | B62D 6/002 |
| 2020/0361517 | A1* | 11/2020 | Namikawa | B62D 15/027 |

FOREIGN PATENT DOCUMENTS

| | | |
|---|---|---|
| JP | 2009-040341 A | 2/2009 |
| JP | 2017-165219 A | 9/2017 |

* cited by examiner

STEERING CONTROL DEVICE

INCORPORATION BY REFERENCE

The disclosure of Japanese Patent Application No. 2018-106409 filed on Jun. 1, 2018, Japanese Patent Application No. 2018-106410 filed on Jun. 1, 2018, and Japanese Patent Application No. 2018-106411 filed on Jun. 1, 2018, each including the specification, drawings and abstract, is incorporated herein by reference in its entirety.

BACKGROUND

1. Technical Field

The disclosure relates to a steering control device.

2. Description of Related Art

Electric power steering systems (EPS) using a motor as a drive source have been widely employed as steering systems for vehicles. A steering control device configured to control an EPS as a control object may execute various compensation controls to improve a steering feeling. For example, Japanese Unexamined Patent Application Publication No. 2009-40341 (JP 2009-40341 A) discloses that a grip state of tires (for example, a degree of grip loss indicating a degree of loss of grip of tires) is detected and an assist force is changed based on the degree of grip loss. The degree of grip loss is acquired by calculating a difference between a first self-aligning torque (SATa) and a second self-aligning torque (SATb). The first self-aligning torque is calculated based on an assist torque calculated based on a steering torque, an inertia of a motor applying the assist torque, and a frictional force. The second self-aligning torque is obtained by multiplying a lateral force acting on the tires by a trail.

In a steer-by-wire steering system which has been developed in recent years, transmission of power between turning wheels and a steering wheel is interrupted. Accordingly, since a road-surface reaction force which is applied to the turning wheels or the like is not mechanically transmitted to the steering wheel, a steering control device that controls the same type steering system as a control object applies a steering reaction force in consideration of road surface information to the steering wheel using a steering-side actuator (a steering-side motor). For example, in Japanese Unexamined Patent Application Publication No. 2017-165219 (JP 2017-165219 A), consideration is given to axial forces acting on a turning shaft connected to turning wheels. JP 2017-165219 A discloses a steering control device that determines a steering reaction force in consideration of a distributed axial force which is obtained by employing (by summing) an ideal axial force calculated from a target turning angle corresponding to a target steering angle of a steering wheel and a road-surface axial force calculated from a drive current of a turning-side motor which is a drive source of a turning-side actuator at predetermined distribution proportions.

SUMMARY

In the steering control device that controls a steer-by-wire steering system as a control object, it is required to provide a superior steering feeling. Even when the configuration described in JP 2017-165219 A may be employed, it cannot be said that a required level is achieved. Accordingly, there is demand for creation of new technology that can provide a superior steering feeling.

The method of detecting a grip state which is described in JP 2009-40341 A cannot be employed for a steer-by-wire steering system, for example, because an assist torque or the like is used as a parameter for detecting a degree of grip loss.

In the steering control device that controls a steer-by-wire steering system as a control object, it is required to provide a superior steering feeling. Therefore, for example, it is conceivable that, in the configuration described in JP 2017-165219 A, an influence of grip loss or the like due to a low-μ road is transmitted to a driver by detecting a grip state from the difference between the road-surface axial force and the ideal axial force and compensating for a steering reaction force which is to be applied based on the detection result.

In the configuration, the road-surface axial force is a component in which road surface information is reflected, and the ideal axial force is an axial force in an ideal situation, which is calculated based on a target turning angle. Accordingly, a difference between the ideal axial force and the axial force which is actually applied to the turning shaft increases, for example, when the behavior of a vehicle changes. As a result, when the grip state is determined based on the difference between the road-surface axial force and the ideal axial force, there is a possibility that the grip state may not be accurately determined, and the steering reaction force may not be appropriately compensated for.

The disclosure provides a steering control device that can provide a superior steering feeling. The disclosure provides a steering control device that can apply an appropriate steering reaction force according to a grip state.

According to a first aspect of the disclosure, there is provided a steering control device configured to control a steering system having a structure in which a steering unit and a turning unit that turns turning wheels in response to steering input to the steering unit are mechanically separated or are configured to be mechanically disconnected and connected. The steering control device includes a control unit configured to control operation of a steering-side motor that applies a steering reaction force which is a force resisting the steering input to the steering unit. The control unit includes a target steering angle calculating unit configured to calculate a target steering angle which is a target value of a steering angle of a steering wheel which is connected to the steering unit based on a steering torque input to the steering unit and is configured to calculate a target reaction torque which is a target value of the steering reaction force based on execution of feedback control for causing the steering angle to match the target steering angle. The control unit includes a plurality of axial force calculating units configured to calculate a plurality of kinds of axial forces acting on a turning shaft to which the turning wheels are connected based on different state quantities and a grip state quantity calculating unit configured to calculate a grip state quantity based on the plurality of kinds of axial forces. The target steering angle calculating unit is configured to calculate the target steering angle in consideration of the grip state quantity.

With this configuration, the target steering angle is calculated in consideration of the grip state quantity, and the target reaction torque is calculated by executing feedback control such that the steering angle matches the target steering angle. By reflecting the grip state quantity in the target steering angle which is used to calculate the target reaction torque, it is possible to provide a superior steering feeling.

In the steering control device according to the aspect, the target steering angle calculating unit may be configured to calculate the target steering angle based on a model formula for correlating an input torque input to a rotation shaft that rotates due to rotation of the steering wheel with a rotation angle of the rotation shaft when the steering unit and the turning unit are assumed to be mechanically connected.

In the steering control device according to the aspect, the target steering angle calculating unit may include an inertia control operation unit that corresponds to an inertia term based on an angular acceleration of the rotation shaft in the model formula. The inertia control operation unit may be configured to calculate a target angular acceleration which is a target value of the angular acceleration of the rotation shaft by multiplying a value based on the input torque by an inertia reciprocal gain corresponding to the target angular acceleration. The inertia control operation unit may be configured to change the inertia reciprocal gain based on the grip state quantity.

With this configuration, since the target angular acceleration is changed by adjusting the inertia gain based on the grip state quantity, it is possible to appropriately adjust a sense of inertia of a steering feeling according to a grip state. In the steering control device according to the aspect, the inertia control operation unit may be configured to change the inertia reciprocal gain based on a vehicle speed.

With this configuration, it is possible to appropriately adjust an inertia gain based on the vehicle speed. In the steering control device according to the aspect, the target steering angle calculating unit may include a viscosity control operation unit that corresponds to a viscosity term based on an angular velocity of the rotation shaft in the model formula. The viscosity control operation unit may be configured to calculate a target viscosity torque which is to be added to the input torque based on a viscosity gain corresponding to a target angular velocity which is a target value of the angular velocity of the rotation shaft and the target angular velocity. The viscosity control operation unit may be configured to change the viscosity gain based on the grip state quantity.

With this configuration, since the target viscosity torque is changed by adjusting the viscosity gain based on the grip state quantity, it is possible to appropriately adjust a sense of viscosity of a steering feeling according to a grip state. In the steering control device according to the aspect, the viscosity control operation unit may be configured to change the viscosity gain based on a vehicle speed. With this configuration, it is possible to appropriately adjust the viscosity gain based on the vehicle speed.

In the steering control device according to the aspect, the target steering angle calculating unit may include a return viscosity control operation unit that corresponds to a viscosity term based on an angular velocity of the rotation shaft in the model formula and operates in a non-steered state. The return viscosity control operation unit may be configured to calculate a target return viscosity torque which is to be added to the input torque based on a return viscosity gain corresponding to a target angular velocity which is a target value of the angular velocity of the rotation shaft and the target angular velocity. The return viscosity control operation unit may be configured to change the return viscosity gain based on the grip state quantity.

With this configuration, since the target return viscosity torque is changed by adjusting the return viscosity gain based on the grip state quantity, it is possible to appropriately adjust a sense of viscosity in a non-steered state according to a grip state.

In the steering control device according to the aspect, the return viscosity control operation unit may be configured to change the return viscosity gain based on a vehicle speed. With this configuration, it is possible to appropriately adjust the return viscosity gain based on the vehicle speed.

In the steering control device according to the aspect, the target steering angle calculating unit may include an angular velocity feedback control operation unit configured to cause a value corresponding to a target angular velocity which is a target value of an angular velocity of the rotation shaft in the model formula to match a target compensatory angular velocity. The angular velocity feedback control operation unit may be configured to calculate a compensatory angular velocity torque which is to be added to the input torque based on an angular velocity deviation between the target compensatory angular velocity based on the value corresponding to the target steering angle and a value corresponding to the target angular velocity. The angular velocity feedback control operation unit may be configured to change the target compensatory angular velocity based on the grip state quantity.

With this configuration, the compensatory angular velocity torque is changed by adjusting the target compensatory angular velocity based on the grip state quantity. Accordingly, it is possible to appropriately adjust the angular velocity of the rotation shaft according to a grip state.

In the steering control device according to the aspect, the angular velocity feedback control operation unit may be configured to change the target compensatory angular velocity based on a vehicle speed. With this configuration, it is possible to appropriately adjust the target compensatory angular velocity based on the vehicle speed.

In the steering control device according to the aspect, the angular velocity feedback control operation unit may be configured to adjust the compensatory angular velocity torque by multiplying a value based on the angular velocity deviation by a proportional gain based on a vehicle speed. The angular velocity feedback control operation unit may be configured to change the proportional gain based on the grip state quantity.

With this configuration, it is possible to calculate an appropriate compensatory angular velocity torque based on a vehicle speed by multiplying a value based on the angular velocity deviation by the proportional gain based on the vehicle speed. Since the proportional gain is changed based on the grip state quantity, the grip state can be reflected in the proportional gain which is used to calculate the compensatory angular velocity torque.

In the steering control device according to the aspect, the angular velocity feedback control operation unit may be configured to change the proportional gain based on a vehicle speed. With this configuration, it is possible to appropriately adjust the proportional gain based on the vehicle speed.

In the steering control device according to the aspect, the angular velocity feedback control operation unit may be configured to adjust the compensatory angular velocity torque by multiplying a value based on the angular velocity deviation by a positional gain based on the value corresponding to the target steering angle. The angular velocity feedback control operation unit may be configured to change the positional gain based on the grip state quantity.

With this configuration, it is possible to calculate an appropriate compensatory angular velocity torque based on the target steering angle by multiplying the angular velocity deviation by the positional gain based on a value corresponding to the target steering angle. Since the positional gain is changed based on the grip state quantity, the grip state can be reflected in the positional gain which is used to calculate the compensatory angular velocity torque.

In the steering control device according to the aspect, the angular velocity feedback control operation unit may be configured to change the positional gain based on a vehicle speed. According to this configuration, it is possible to appropriately adjust the positional adjustment gain based on the vehicle speed.

In the steering control device according to the aspect, the angular velocity feedback control operation unit may be configured to adjust the compensatory angular velocity torque by multiplying a value based on the angular velocity deviation by a steering torque compensation gain based on the steering torque input to the steering unit. The angular velocity feedback control operation unit may be configured to change the steering torque compensation gain based on the grip state quantity.

With this configuration, it is possible to calculate an appropriate compensatory angular velocity torque based on the steering torque by multiplying a value based on the angular velocity deviation by the steering torque compensation gain based on the steering torque. Since the steering torque compensation gain is changed based on the grip state quantity, the grip state can be reflected in the steering torque compensation gain which is used to calculate the compensatory angular velocity torque.

In the steering control device according to the aspect, the angular velocity feedback control operation unit may be configured to calculate the steering torque compensation gain such that the steering torque compensation gain is zero when an absolute value of the steering torque is greater than a non-steered threshold value indicating a non-steered state.

With this configuration, the compensatory angular velocity torque is reflected in the target steering angle in a non-steered state in which a driver does not input steering to the steering unit. Accordingly, it is possible to adjust a steering velocity of the steering wheel at the time of return based on the grip state.

In the steering control device according to the aspect, the angular velocity feedback control operation unit may be configured to change the steering torque compensation gain based on a vehicle speed. With this configuration, it is possible to appropriately adjust the steering torque compensation gain based on the vehicle speed.

According to the aspect of the disclosure, it is possible to provide a superior steering feeling.

According to a second aspect of the disclosure, there is provided a steering control device configured to control a steering system having a structure in which a steering unit and a turning unit that turns turning wheels in response to steering input to the steering unit are mechanically separated or are configured to be mechanically disconnected and connected. The steering control device includes a control unit configured to control operation of a steering-side motor that applies a steering reaction force which is a force resisting the steering input to the steering unit. The control unit includes a plurality of axial force calculating units configured to calculate a plurality of kinds of axial forces acting on a turning shaft to which the turning wheels are connected based on different state quantities; a distributed axial force calculating unit configured to calculate a distributed axial force by summing the plurality of kinds of axial forces at distribution proportions which are individually set; a grip state quantity calculating unit configured to calculate a grip state quantity based on the plurality of kinds of axial forces; a distributed axial force adjusting unit configured to adjust the distributed axial force based on the grip state quantity; and a target steering angle calculating unit configured to calculate a target steering angle which is a target value of a steering angle of a steering wheel connected to the steering unit in consideration of an adjusted distributed axial force that is the distributed axial force adjusted by the distributed axial force adjusting unit. The control unit is configured to calculate a target reaction torque which is a target value of the steering reaction force based on execution of angle feedback control for causing the steering angle to match the target steering angle.

According to a third aspect of the disclosure, there is provided a steering control device configured to control a steering system having a structure in which a steering unit and a turning unit that turns turning wheels in response to steering input to the steering unit are mechanically separated or are configured to be mechanically disconnected and connected. The steering control device includes a control unit configured to control operation of a steering-side motor that applies a steering reaction force which is a force resisting the steering input to the steering unit. The control unit includes a plurality of axial force calculating units configured to calculate a plurality of kinds of axial forces acting on a turning shaft to which the turning wheels are connected based on different state quantities; a distributed axial force calculating unit configured to calculate a distributed axial force by summing the plurality of kinds of axial forces at distribution proportions which are individually set; a grip state quantity calculating unit configured to calculate a grip state quantity based on the plurality of kinds of axial forces; and a distributed axial force adjusting unit configured to adjust the distributed axial force based on the grip state quantity. The control unit is configured to calculate a target reaction torque which is a target value of the steering reaction force based on the steering torque input to the steering unit and the adjusted distributed axial force adjusted by the distributed axial force adjusting unit.

According to a fourth aspect of the disclosure, there is provided a steering control device configured to control a steering system having a structure in which a steering unit and a turning unit that turns turning wheels in response to steering input to the steering unit are mechanically separated or are configured to be mechanically disconnected and connected. The steering control device includes a control unit configured to control operation of a steering-side motor that applies a steering reaction force which is a force resisting the steering input to the steering unit. The control unit includes a plurality of axial force calculating units configured to calculate a plurality of kinds of axial forces acting on a turning shaft to which the turning wheels are connected based on different state quantities; a distributed axial force calculating unit configured to calculate a distributed axial force by summing the plurality of kinds of axial forces at distribution proportions which are individually set; a grip state quantity calculating unit configured to calculate a grip state quantity based on the plurality of kinds of axial forces; and a distributed axial force adjusting unit configured to adjust the distributed axial force based on the grip state quantity. The control unit is configured to calculate a target reaction torque which is a target value of the steering reaction force based on the adjusted distributed axial force adjusted by the distributed axial force adjusting unit.

A steering feeling is basically realized (provided) by a sense of inertia, a sense of viscosity, and a sense of stiffness which are expressed by an inertia term, a viscosity term, and a spring term in an equation of motion representing a relationship between an input torque input to the steering system and a turning angle. By adjusting the distributed axial force corresponding to the spring term of the equation of motion based on the grip state quantity as in the above-mentioned configuration, it is possible to apply a sense of stiffness of a steering operation based on a grip state as a response to a driver and to provide a superior steering feeling.

In the steering control device according to the aspect, the distributed axial force adjusting unit may include a distribution adjustment gain calculating unit configured to calculate a distribution adjustment gain by which the distributed axial force is multiplied. The distribution adjustment gain calculating unit may be configured to change the distribution adjustment gain based on the grip state quantity.

With this configuration, it is possible to adjust the distributed axial force by multiplying the distributed axial force by the distribution adjustment gain. Then, since the distribution adjustment gain is changed based on the grip state quantity, it is possible to adjust a sense of stiffness of a steering operation based on a gradient of the adjusted distributed axial force, that is, change of a spring constant of the spring term.

In the steering control device according to the aspect, the distribution adjustment gain calculating unit may be configured to change the distribution adjustment gain based on a vehicle speed. With this configuration, by reflecting the vehicle speed in calculating the distribution adjustment gain, it is possible to cause a driver to feel a grip state which varies according to the vehicle speed, as a response, through a sense of stiffness of a steering operation which is realized based on the distribution adjustment gain.

In the steering control device according to the aspect, the distributed axial force adjusting unit may include an offset value calculating unit configured to calculate an offset value which is added to the distributed axial force. The offset value calculating unit may be configured to change the offset value based on the grip state quantity.

With this configuration, it is possible to adjust the distributed axial force by adding an offset value thereto. Since the offset value is changed based on the grip state quantity, it is possible to cause a driver to feel a sense of stiffness of a steering operation based on the grip state quantity, as a predetermined response, regardless of the spring constant of the spring term, and it is thus possible to provide a superior steering feeling.

In the steering control device according to the aspect, the distributed axial force adjusting unit may be configured to adjust the distributed axial force by adding the offset value to the distributed axial force in a non-steered state in which steering is not input to the steering unit.

With this configuration, since the distributed axial force is adjusted by adding the offset value to the distributed axial force in the non-steered state in which a driver does not operate the steering wheel, it is possible to adjust the steering velocity of the steering wheel at the time of return based on the grip state.

In the steering control device according to the aspect, the offset value calculating unit may be configured to change the offset value based on a vehicle speed. With this configuration, by reflecting the vehicle speed in calculating the offset value, it is possible to cause a driver to feel a grip state which varies according to the vehicle speed, as a response, through a sense of stiffness of a steering operation which is realized based on the offset value.

According to the aspect of the disclosure, it is possible to provide a superior steering feeling.

According to a fifth aspect of the disclosure, there is provided a steering control device configured to control a steering system having a structure in which a steering unit and a turning unit that turns turning wheels in response to steering input to the steering unit are mechanically separated or are configured to be mechanically disconnected and connected. The steering control device includes a control unit configured to control operation of a steering-side motor that applies a steering reaction force which is a force resisting the steering input to the steering unit. The control unit includes an ideal axial force calculating unit configured to calculate an ideal axial force based on a value related to a rotation angle of a rotation shaft, the rotation angle being converted into a turning angle of the turning wheels; a road-surface axial force calculating unit configured to calculate a road-surface axial force based on road surface information; a vehicle state quantity axial force calculating unit configured to calculate a vehicle state quantity axial force based on a vehicle state quantity which varies depending on a traveling state of a vehicle; and a grip state quantity calculating unit configured to calculate a plurality of grip components based on the ideal axial force, the road-surface axial force, and the vehicle state quantity axial force and to calculate a grip state quantity by summing the plurality of grip components at predetermined distribution proportions. The control unit is configured to calculate a target reaction torque which is a target value of the steering reaction force in consideration of the grip state quantity. The grip state quantity calculating unit is configured to calculate the grip state quantity at the distribution proportions including a first grip component based on the ideal axial force and the road-surface axial force when a traveling state quantity indicating the traveling state of the vehicle represents a low-speed state including a stopped state and to calculate the grip state quantity at the distribution proportions including a second grip component based on at least the vehicle state quantity axial force when the traveling state quantity represents an intermediate-to-high speed state which is faster than the stopped state.

An axial force acting on the turning shaft also changes depending on behavior of the vehicle. Therefore, when the vehicle state quantity axial force based on the vehicle state quantity is used, the axial force which actually acts on the turning shaft can be more accurately estimated than when the ideal axial force is used. However, when the traveling state of the vehicle represents the low-speed state including the stopped state, the value of the vehicle state quantity decreases, and therefore, the magnitude of noise relative to the output value of a sensor that detects the vehicle state quantity increases relatively. In this case, when the vehicle state quantity is used, the axial force cannot be detected accurately as compared to when a value related to the rotation angle of the rotation shaft is used. Accordingly, with this configuration, when the traveling state quantity represents the low-speed state and accuracy of the vehicle state quantity axial force cannot be secured, the grip state quantity is calculated at the distribution proportions including the first grip component based on the ideal axial force and the road-surface axial force. When the traveling state quantity represents the intermediate-to-high speed state and accuracy of the vehicle state quantity axial force can be secured, the grip state quantity is calculated at the distribution proportions including the second grip component based on at least the vehicle state quantity axial force. Accordingly, it is possible to calculate an appropriate grip state quantity and to appropriately compensate for the steering reaction force in consideration of the grip state quantity.

In the steering control device according to the aspect, the grip state quantity calculating unit may be configured to calculate the grip state quantity such that the distribution proportion of the second grip component increases as the traveling state quantity becomes closer to the intermediate-to-high speed state from the low-speed state.

With this configuration, since the distribution proportion of the second grip component increases as the traveling state quantity becomes closer to the intermediate-to-high speed state from the low-speed state, it is possible to more appropriately calculate the grip state quantity. In the steering control device according to the aspect, the grip state quantity calculating unit may be configured to calculate the grip state quantity at the distribution proportions including only the first grip component when the traveling state quantity represents the low-speed state.

With this configuration, when the traveling state quantity represents the low-speed state, the grip state quantity is calculated at the distribution proportions including only the first grip component, that is, without using the second grip component based on the vehicle state quantity axial force. With the above-described configuration, since the first grip component is a value based on the ideal axial force which has high accuracy in the low-speed state of the vehicle and is not based on the vehicle state quantity axial force of which the accuracy decreases in the intermediate-to-high speed state of the vehicle, the grip state quantity can be more appropriately calculated.

In the steering control device according to the aspect, the grip state quantity calculating unit may be configured to calculate the grip state quantity at the distribution proportions including only the second grip component when the traveling state quantity represents the intermediate-to-high speed state.

With this configuration, when the traveling state quantity represents the intermediate-to-high speed state, the grip state quantity is calculated at the distribution proportions including only the second grip component, that is, without using the first grip component based on the ideal axial force and the road-surface axial force. With the above-described configuration, since the second grip component is a value based on the vehicle state quantity axial force which has high accuracy in the intermediate-to-high speed state of the vehicle and is not based on the ideal axial force of which the accuracy decreases in the intermediate-to-high speed state of the vehicle, the grip state quantity can be more appropriately calculated.

In the steering control device according to the aspect, the traveling state quantity may include at least one of a lateral acceleration and a vehicle speed. With this configuration, it is possible to determine the traveling state of the vehicle based on an appropriate traveling state quantity and to appropriately calculate a grip state quantity.

According to the aspect of the disclosure, it is possible to apply an appropriate steering reaction force in accordance with the grip state.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
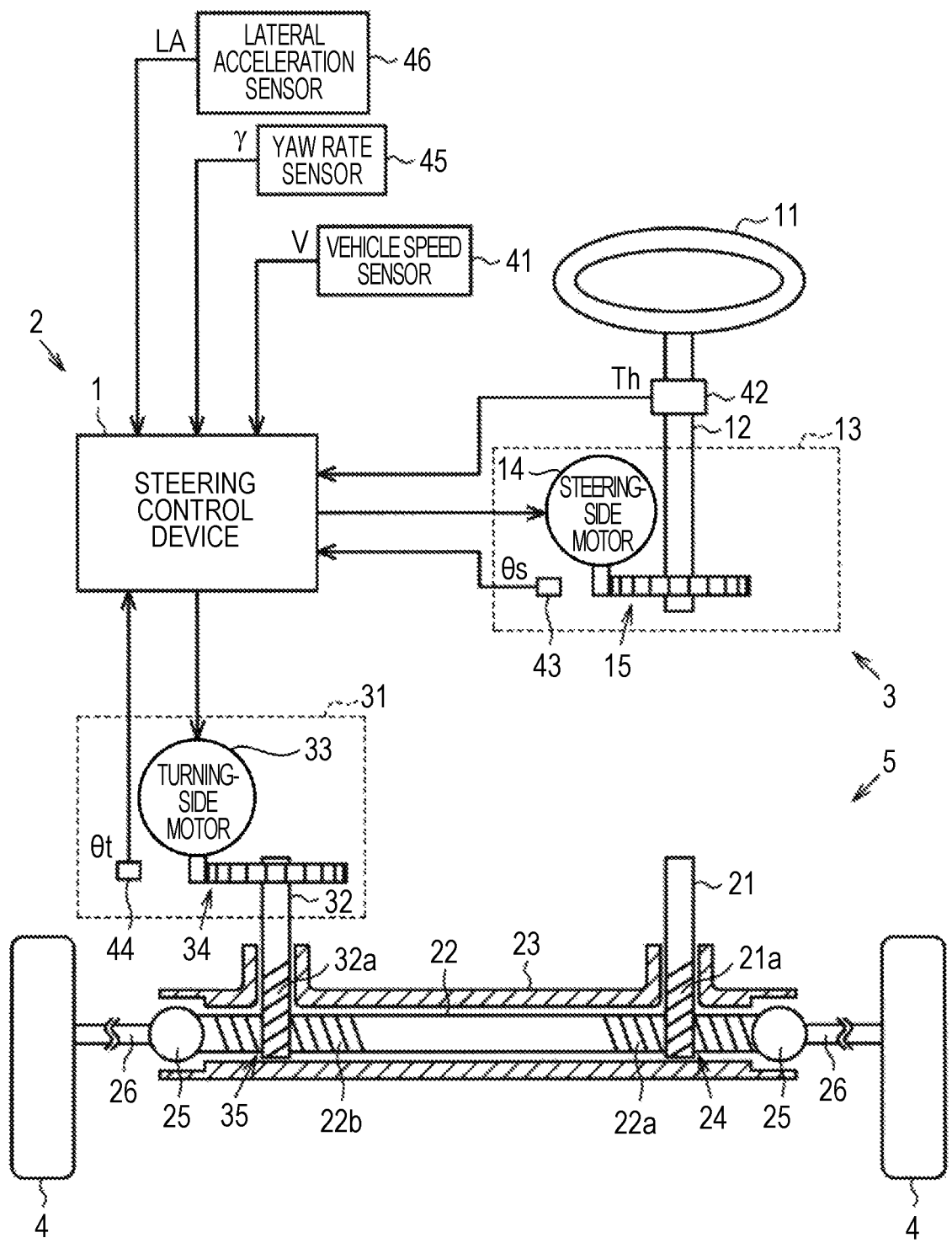
FIG. 1 is a diagram schematically illustrating a configuration of a steer-by-wire steering system according to a first embodiment.

Hereinafter a steering control device according to an embodiment will be described with reference to the accompanying drawings. As illustrated in FIG. 1, a steer-by-wire steering system 2 which is a control object of a steering control device 1 (i.e., the steer-by-wire steering system 2 configured to be controlled by the steering control device 1) includes a steering unit 3 that is steered by a driver and a turning unit 5 that turns turning wheels 4 according to a driver's steering of the steering unit 3.

The steering unit 3 includes a steering shaft 12 to which a steering wheel 11 is fixed and a steering-side actuator 13 that can apply a steering reaction force to the steering shaft 12. The steering-side actuator 13 includes a steering-side motor 14 that serves as a drive source and a steering-side reduction gear 15 that reduces rotation (i.e., rotational speed) of the steering-side motor 14 and transmits the reduced rotation to the steering shaft 12.

The turning unit 5 includes a first pinion shaft 21 serving as a rotation shaft whose rotation angle can be converted to a turning angle of the turning wheels 4, a rack shaft 22 serving as a turning shaft that is connected to the first pinion shaft 21, and a rack housing 23 that accommodates the rack shaft 22 therein such that the rack shaft 22 is movable therein. The first pinion shaft 21 and the rack shaft 22 are arranged to have a predetermined crossing angle, and first pinion teeth 21a formed in the first pinion shaft 21 and first rack teeth 22a formed in the rack shaft 22 engage with each other to constitute a first rack and pinion mechanism 24. One end of the rack shaft 22 in an axial direction is movably supported by the first rack and pinion mechanism 24. Tie rods 26 are respectively connected to both ends of the rack shaft 22 via rack ends 25 formed of ball joints, and the distal ends of the tie rods 26 are connected to knuckles (not illustrated) which are assembled to the turning wheels 4.

In the turning unit 5, a turning-side actuator 31 that applies a turning force for turning the turning wheels 4 to the rack shaft 22 is provided via a second pinion shaft 32. The turning-side actuator 31 includes a turning-side motor 33 that serves as a drive source and a turning-side reduction gear 34 that reduces rotation (rotational speed) of the turning-side motor 33 and transmits the reduced rotation to the second pinion shaft 32. The second pinion shaft 32 and the rack shaft 22 are arranged to have a predetermined crossing angle, and second pinion teeth 32a formed in the second pinion shaft 32 and second rack teeth 22b formed in the rack shaft 22 engage with each other to constitute a second rack and pinion mechanism 35. The other end of the rack shaft 22 in the axial direction is movably supported by the second rack and pinion mechanism 35.

In the steering system 2 having the above-mentioned configuration, the second pinion shaft 32 is rotationally driven by the turning-side actuator 31 according to a driver's steering operation, and this rotation is converted to movement of the rack shaft 22 in the axial direction by the second rack and pinion mechanism 35, whereby the turning angle of the turning wheels 4 is changed. At this time, a steering reaction force that resists the driver's steering is applied to the steering wheel 11 from the steering-side actuator 13.

An electrical configuration of this embodiment will be described below. The steering control device 1 is connected to the steering-side actuator 13 (the steering-side motor 14) and the turning-side actuator 31 (the turning-side motor 33) and controls operation thereof. The steering control device 1 includes a central processing unit (CPU) and a memory which are not illustrated. When the CPU executes a program stored in the memory in a predetermined operation cycle, various controls are executed.

A vehicle speed sensor 41 that detects a vehicle speed V of a vehicle and a torque sensor 42 that detects a steering torque Th applied to the steering shaft 12 are connected to the steering control device 1. The torque sensor 42 is provided closer to the steering wheel 11 than a part of the steering shaft 12 which is connected to the steering-side actuator 13 (the steering-side reduction gear 15) is. A steering-side rotation sensor 43 that detects a rotation angle $\theta s$ of the steering-side motor 14 as a relative angle in a range of 360° as a detection value indicating an amount of steering of the steering unit 3 and a turning-side rotation sensor 44 that detects a rotation angle $\theta t$ of the turning-side motor 33 as a relative angle as a detection value indicating an amount of turning of the turning unit 5 are also connected to the steering control device 1. A yaw rate sensor 45 that detects a yaw rate $\gamma$ of the vehicle and a lateral acceleration sensor 46 that detects a lateral acceleration LA of the vehicle are also connected to the steering control device 1. The steering torque Th and the rotation angles $\theta s$ and $\theta t$ are detected as being a positive value when the steering wheel is steered in one direction (rightwards in this embodiment) and a negative value when the steering wheel is steered in the other direction (leftwards in this embodiment). The steering control device 1 controls operation of the steering-side motor 14 and the turning-side motor 33 based on such various state quantities.

Figure 2:
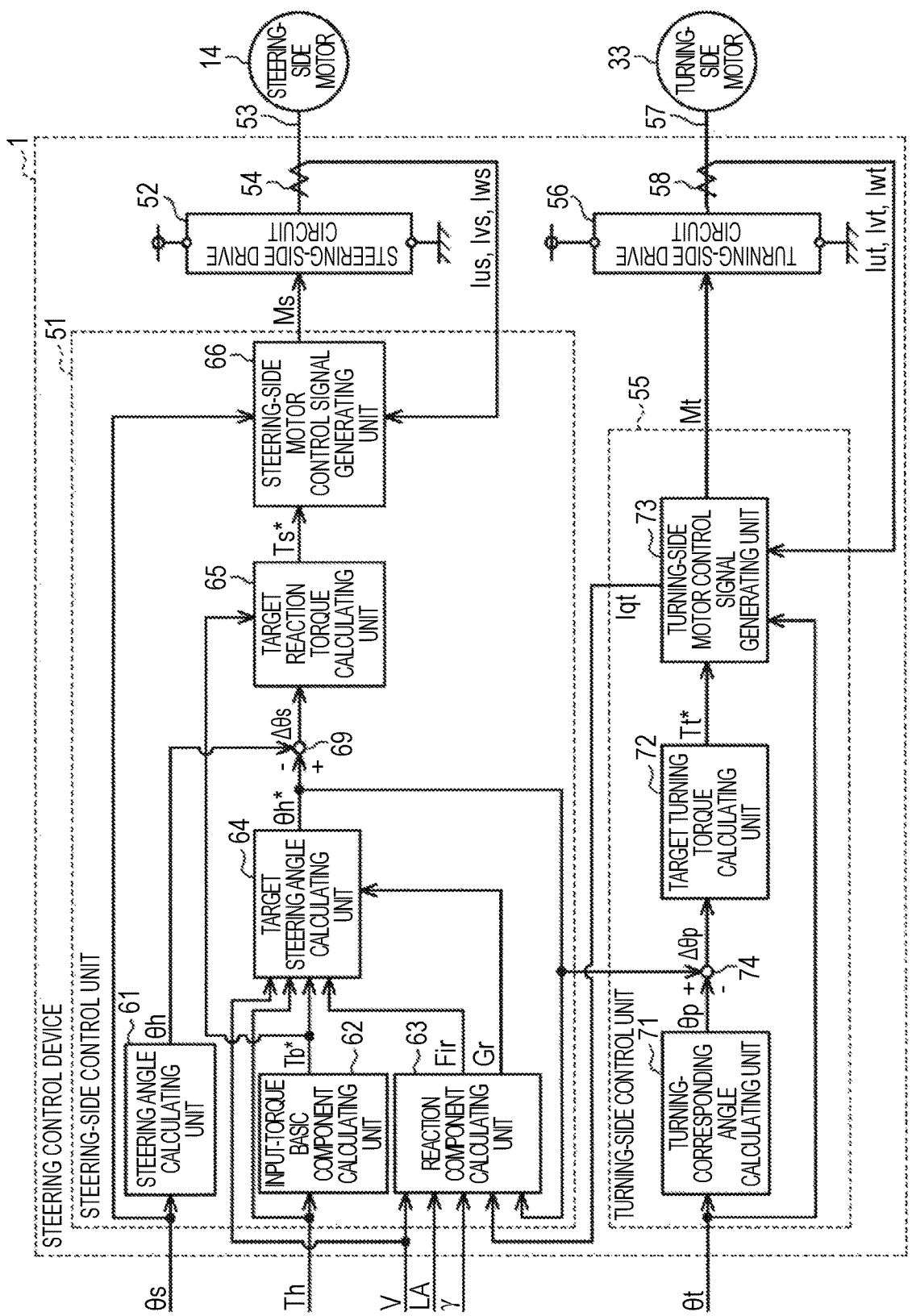
FIG. 2 is a block diagram of a steering control device according to the first embodiment.

The configuration of the steering control device 1 will be described below in detail. As illustrated in FIG. 2, the steering control device 1 includes a steering-side control unit 51 serving as a control unit that outputs a steering-side motor control signal Ms and a steering-side drive circuit 52 that supplies a drive power to the steering-side motor 14 based on the steering-side motor control signal Ms. Current sensors 54 that detect phase current values Ius, Ivs, and Iws of the steering-side motor 14 which flow in connection lines 53 between the steering-side drive circuit 52 and motor coils of phases of the steering-side motor 14 are connected to the steering-side control unit 51. In FIG. 2, for the purpose of convenience of description, the connection lines 53 of the phases and the current sensors 54 of the phases are collectively illustrated as being single.

The steering control device 1 includes a turning-side control unit 55 that outputs a turning-side motor control signal Mt and a turning-side drive circuit 56 that supplies a drive power to the turning-side motor 33 based on the turning-side motor control signal Mt. Current sensors 58 that detect phase current values Iut, Ivt, and Iwt of the turning-side motor 33 which flow in connection lines 57 between the turning-side drive circuit 56 and motor coils of phases of the turning-side motor 33 are connected to the turning-side control unit 55. In FIG. 2, for the purpose of convenience of description, the connection lines 57 of the phases and the current sensors 58 of the phases are collectively illustrated as being single. A known PWM inverter including a plurality of switching elements (for example, FETs) is employed as each of the steering-side drive circuit 52 and the turning-side drive circuit 56 according to this embodiment. The steering-side motor control signal Ms and the turning-side motor control signal Mt are gate-on/off signals that define ON/OFF states of the switching elements.

The steering control device 1 performs operation processes which are described in the following control blocks in a predetermined operation cycle and generates the steering-side motor control signal Ms and the turning-side motor control signal Mt. By outputting the steering-side motor control signal Ms and the turning-side motor control signal Mt to the steering-side drive circuit 52 and the turning-side drive circuit 56, the switching elements are turned on or off and drive powers are supplied to the steering-side motor 14 and the turning-side motor 33. Accordingly, operations of the steering-side actuator 13 and the turning-side actuator 31 are controlled.

The configuration of the steering-side control unit 51 will be first described below. The vehicle speed V, the steering torque Th, the rotation angle θs, the lateral acceleration LA, the yaw rate γ, the phase current values Ius, Ivs, and Iws, and a q-axis current value Iqt are input to the steering-side control unit 51. Then, the steering-side control unit 51 generates the steering-side motor control signal Ms based on these state quantities and outputs the generated steering-side motor control signal Ms.

Specifically, the steering-side control unit 51 includes a steering angle calculating unit 61 that calculates a steering angle θh of the steering wheel 11 based on the rotation angle θs of the steering-side motor 14. The steering-side control unit 51 further includes an input-torque basic component calculating unit 62 that calculates an input-torque basic component Tb* which is a force for rotating the steering wheel 11 and a reaction component calculating unit 63 that calculates a reaction component Fir which is a force resisting the rotation of the steering wheel 11. The steering-side control unit 51 further includes a target steering angle calculating unit 64 that calculates a target steering angle θh* based on the steering torque Th, the input-torque basic component Tb*, the reaction component Fir, and the vehicle speed V. The steering-side control unit 51 further includes a target reaction torque calculating unit 65 that calculates a target reaction torque Ts* based on the steering angle θh and the target steering angle θh* and a steering-side motor control signal generating unit 66 that generates the steering-side motor control signal Ms based on the target reaction torque Ts*.

The steering angle calculating unit 61 converts the input rotation angle θs to an absolute angle in a range greater than 360°, for example, by counting the number of turns of the steering-side motor 14 from a steering neutral position, and acquires the rotation angle. The steering angle calculating unit 61 calculates the steering angle θh by multiplying the rotation angle, which has been obtained by conversion into the absolute angle, by a conversion factor Ks based on a rotation speed ratio of the steering-side reduction gear 15.

The steering torque Th is input to the input-torque basic component calculating unit 62. The input-torque basic component calculating unit 62 calculates the input-torque basic component (a reaction-force basic component) Tb* which has a larger absolute value as the absolute value of the steering torque Th becomes larger. The calculated input-torque basic component Tb* is input to the target steering angle calculating unit 64 and the target reaction torque calculating unit 65.

A reaction component Fir and a grip state quantity Gr which are calculated by the reaction component calculating unit 63 which will be described later in addition to the steering torque Th, the vehicle speed V, and the input-torque basic component Tb* are input to the target steering angle calculating unit 64. The target steering angle calculating unit 64 in this embodiment calculates a target steering angle θh* using a model (steering model) formula in which the target steering angle θh* is correlated with an input torque Tin* which is obtained by adding the steering torque Th to the input-torque basic component Tb* and subtracting the reaction component Fir therefrom. This model formula defines and represents a relationship between an input torque input to a rotation shaft that rotates due to rotation of the steering wheel 11 and the rotation angle of the rotation shaft in a structure in which the steering wheel 11 (the steering unit 3) and the turning wheels 4 (the turning unit 5) are mechanically connected. This model formula is expressed using a viscosity coefficient C modeling friction or the like of the steering system 2 and an inertia coefficient J modeling the inertia of the steering system 2. The viscosity coefficient C and the inertia coefficient J are set to vary depending on the vehicle speed V. The target steering angle θh* which is calculated using the model formula is output to the reaction component calculating unit 63 in addition to a subtractor 69 and the turning-side control unit 55.

In addition to the input-torque basic component Tb*, an angle deviation Ms obtained by causing the subtractor 69 to subtract the steering angle θh from the target steering angle θh* is input to the target reaction torque calculating unit 65. Then, the target reaction torque calculating unit 65 calculates a basic reaction torque serving as a basis of the steering reaction force which is given by the steering-side motor 14 as a controlled variable for feedback-controlling the steering angle θh to the target steering angle θh* based on the angle deviation Δθs, and calculates the target reaction torque Ts* by adding the input-torque basic component Tb* to the basic reaction torque. Specifically, the target reaction torque calculating unit 65 calculates, as the basic reaction torque, the sum of output values of a proportional element, an integral element, and a differential element with the use of the angle deviation Δθs as an input.

The rotation angle θs and the phase current values Ius, Ivs, and Iws, in addition to the target reaction torque Ts*, are input to the steering-side motor control signal generating unit 66. The steering-side motor control signal generating unit 66 in this embodiment calculates a q-axis target current value Iqs* on the q axis in a d/q coordinate system based on the target reaction torque Ts*. In this embodiment, a d-axis target current value Ids* on the d axis is set to zero.

The steering-side motor control signal generating unit 66 generates (calculates) the steering-side motor control signal Ms which is output to the steering-side drive circuit 52 by executing current feedback control in the d/q coordinate system. Specifically, the steering-side motor control signal generating unit 66 calculates a d-axis current value Ids and a q-axis current value Iqs which are actual current values of the steering-side motor 14 in the d/q coordinate system by mapping the phase current values Ius, Ivs, and Iws onto the d/q coordinates based on the rotation angle θs. Then, the steering-side motor control signal generating unit 66 calculates a voltage command value based on the current deviations on the d axis and the q axis such that the d-axis current value Ids matches the d-axis target current value Ids* and such that the q-axis current value Iqs matches the q-axis target current value Iqs*, and generates the steering-side motor control signal Ms having a duty ratio based on the voltage command value. By outputting the calculated steering-side motor control signal Ms to the steering-side drive circuit 52, a drive power corresponding to the steering-side motor control signal Ms is output to the steering-side motor 14 and the operation thereof is controlled.

The turning-side control unit 55 will be described below. The rotation angle θt, the target steering angle θh*, and the phase current values Iut, Ivt, and Iwt of the turning-side motor 33 are input to the turning-side control unit 55. Then, the turning-side control unit 55 generates the turning-side motor control signal Mt based on these state quantities and outputs the generated turning-side motor control signal Mt.

Specifically, the turning-side control unit 55 includes a turning-corresponding angle calculating unit 71 that calculates a turning-corresponding angle θp corresponding to a rotation angle (a pinion angle) of the first pinion shaft 21 as a rotation shaft whose rotation angle can be converted into a turning angle of the turning wheels 4. The turning-side control unit 55 further includes a target turning torque calculating unit 72 that calculates a target turning torque Tt* based on the turning-corresponding angle θp and the target steering angle θh*, and a turning-side motor control signal generating unit 73 that generates the turning-side motor control signal Mt based on the target turning torque Tt*. In the steering system 2 according to this embodiment, a steering angle ratio which is a ratio of the steering angle θh and the turning-corresponding angle θp is set to be constant and a target turning-corresponding angle is the same as the target steering angle θh*.

The turning-corresponding angle calculating unit 71 converts the input rotation angle θt to an absolute angle in a range greater than 360°, for example, by counting the number of turns of the turning-side motor 33 from the neutral position at which the vehicle travels straight, and thus acquires the rotation angle. The turning-corresponding angle calculating unit 71 calculates the turning-corresponding angle θp by multiplying the rotation angle, which has been obtained by conversion into the absolute angle, by a conversion factor Kt based on a rotation speed ratio of the turning-side reduction gear 34 and a rotation speed ratio of the first and second rack and pinion mechanisms 24 and 35. That is, the turning-corresponding angle θp corresponds to the steering angle θh of the steering wheel 11 when the first pinion shaft 21 is assumed to be connected to the steering shaft 12.

An angle deviation Δθp obtained by causing the subtractor 74 to subtract the turning-corresponding angle θp from the target steering angle θh* (the target turning-corresponding angle) is input to the target turning torque calculating unit 72. Then, the target turning torque calculating unit 72 calculates a target turning torque Tt* which is a target value of a turning force given by the turning-side motor 33 as a controlled variable for feedback-controlling the turning-corresponding angle θp to the target steering angle θh*, based on the angle deviation Δθp. Specifically, the target turning torque calculating unit 72 calculates, as the target turning torque Tt*, the sum of output values of a proportional element, an integral element, and a differential element with the use of the angle deviation Δθp as an input.

The rotation angle θt and the phase current values Iut, Ivt, and Iwt, in addition to the target turning torque Tt*, are input to the turning-side motor control signal generating unit 73. The turning-side motor control signal generating unit 73 calculates a q-axis target current value Iqt* on the q axis in the d/q coordinate system based on the target turning torque Tt*. In this embodiment, a d-axis target current value Idt* on the d axis is set to zero.

The turning-side motor control signal generating unit 73 generates (calculates) the turning-side motor control signal Mt which is output to the turning-side drive circuit 56 by executing current feedback control in the d/q coordinate system. Specifically, the turning-side motor control signal generating unit 73 calculates a d-axis current value Idt and a q-axis current value Iqt which are actual current values of the turning-side motor 33 in the d/q coordinate system by mapping the phase current values Iut, Ivt, and Iwt onto the d/q coordinates based on the rotation angle θt. Then, the turning-side motor control signal generating unit 73 calculates a voltage command value based on the current deviations on the d axis and the q axis such that the d-axis current value Idt matches the d-axis target current value Idt* and such that the q-axis current value Iqt matches the q-axis target current value Iqt*, and generates the turning-side motor control signal Mt having a duty ratio based on the voltage command value. By outputting the calculated turning-side motor control signal Mt to the turning-side drive circuit 56, a drive power corresponding to the turning-side motor control signal Mt is output to the turning-side motor 33 and the operation thereof is controlled. The q-axis current value Iqt which is calculated in the process of generating the turning-side motor control signal Mt is output to the reaction component calculating unit 63.

The configuration of the reaction component calculating unit 63 will be described below. The vehicle speed V, the steering torque Th, the lateral acceleration LA, the yaw rate γ, the q-axis current value Iqt of the turning-side motor 33, and the target steering angle θh* are input to the reaction component calculating unit 63. The reaction component calculating unit 63 calculates a reaction component Fir (a basic reaction force) corresponding to an axial force acting on the rack shaft 22 based on these state quantities and outputs the calculated reaction component Fir to the target steering angle calculating unit 64.

Figure 3:
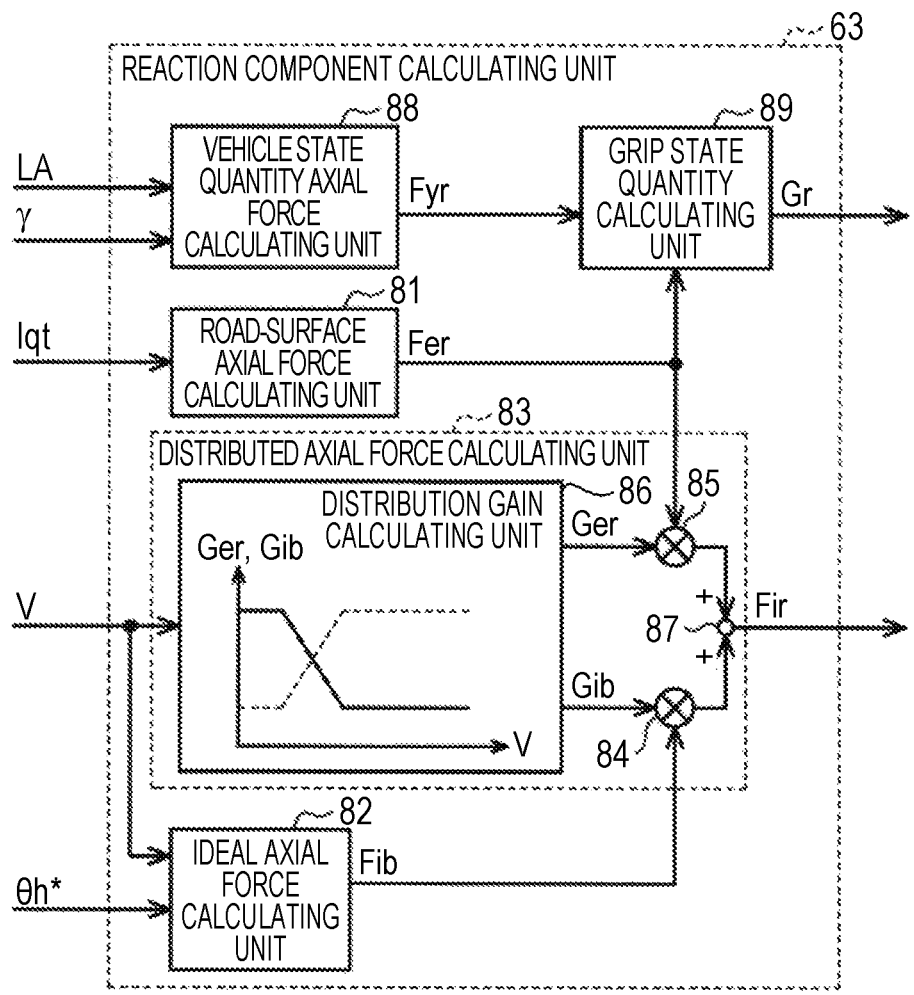
FIG. 3 is a block diagram of a reaction component calculating unit according to the first embodiment.

As illustrated in FIG. 3, the reaction component calculating unit 63 includes a road-surface axial force calculating unit 81 serving as an axial force calculating unit that calculates a road-surface axial force Fer and an ideal axial force calculating unit 82 serving as an axial force calculating unit that calculates an ideal axial force Fib. The road-surface axial force Fer and the ideal axial force Fib are calculated in the dimension of a torque (N·m). The reaction component calculating unit 63 includes a distributed axial force calculating unit 83 that calculates a distributed axial force which is distributed to the ideal axial force Fib and the road-surface axial force Fer at predetermined proportions, as a reaction component Fir, such that an axial force which is applied to the turning wheels 4 from a road surface (road surface information which is transmitted from the road surface) is reflected in the distributed axial force.

The target steering angle θh* (the target turning-corresponding angle) and the vehicle speed V are input to the ideal axial force calculating unit 82. The ideal axial force calculating unit 82 calculates the ideal axial force Fib which is an ideal value of the axial force applied to the turning wheels 4 (a force transmitted to the turning wheels 4) and in which road surface information is not reflected, based on the target steering angle θh*. Specifically, the ideal axial force calculating unit 82 calculates the ideal axial force Fib such that the absolute value thereof increases as the absolute value of the target steering angle θh* increases. The ideal axial force calculating unit 82 calculates the ideal axial force Fib such that the absolute value thereof increases as the vehicle speed V increases. The calculated ideal axial force Fib is output to a multiplier 84.

The q-axis current value Iqt of the turning-side motor 33 is input to the road-surface axial force calculating unit 81. The road-surface axial force calculating unit 81 calculates the road-surface axial force Fer which is an estimated value of the axial force applied to the turning wheels 4 (a force transmitted to the turning wheels 4) and in which road surface information is reflected, based on the q-axis current value Iqt. Specifically, the road-surface axial force calculating unit 81 calculates the road-surface axial force Fer such that the absolute value thereof increases as the absolute value of the q-axis current value Iqt increases on the assumption that the torque applied to the rack shaft 22 from the turning-side motor 33 and the torque corresponding to the force applied to the turning wheels 4 from the road surface match each other. The calculated road-surface axial force Fer is output to a multiplier 85.

The road-surface axial force Fer and the ideal axial force Fib in addition to the vehicle speed V are input to the distributed axial force calculating unit 83. The distributed axial force calculating unit 83 includes a distribution gain calculating unit 86 that calculates a distribution gain Gib and a distribution gain Ger which are distribution proportions at which the distributed axial force is distributed to the ideal axial force Fib and the road-surface axial force Fer based on the vehicle speed V. The distribution gain calculating unit 86 in this embodiment includes a map in which a relationship between the vehicle speed V and the distribution gains Gib and Ger is defined and calculates the distribution gains Gib and Ger corresponding to the vehicle speed V with reference to the map. The distribution gain Gib has a value which is less when the vehicle speed V is high than when the vehicle speed V is low, and the distribution gain Ger has a value which is greater when the vehicle speed V is high than when the vehicle speed V is low. In this embodiment, the values of the distribution gains Gib and Ger are set such that the sum thereof becomes "1." The calculated distribution gain Gib is output to the multiplier 84 and the calculated distribution gain Ger is output to the multiplier 85.

The distributed axial force calculating unit 83 multiplies the ideal axial force Fib by the distribution gain Gib using the multiplier 84, multiplies the road-surface axial force Fer by the distribution gain Ger using the multiplier 85, and sums the resultant values using the adder 87 to calculate the reaction component Fir (the distributed axial force). The calculated reaction component Fir is output to the target steering angle calculating unit 64.

The reaction component calculating unit 63 includes a vehicle state quantity axial force calculating unit 88 serving as an axial force calculating unit that calculates a vehicle state quantity axial force Fyr and a grip state quantity calculating unit 89 that calculates a grip state quantity Gr indicating a grip state of the vehicle. The vehicle state quantity axial force Fyr is calculated in the dimension of a torque (N·m).

The yaw rate γ and the lateral acceleration LA which are vehicle state quantities are input to the vehicle state quantity axial force calculating unit 88. The vehicle state quantity axial force calculating unit 88 calculates the lateral force Fy by inputting the yaw rate γ and the lateral acceleration LA to Equation (1).

$$\text{Lateral force } Fy = Kla \times \text{lateral acceleration } LA + K\gamma \times \gamma' \quad (1)$$

Here, "γ'" represents a differential value of the yaw rate γ, and "Kla" and "Kγ" represent coefficients which are set in advance by experiment or the like. The vehicle state quantity axial force calculating unit 88 outputs the lateral force Fy as the vehicle state quantity axial force Fyr because the calculated lateral force Fy can be approximately considered as an axial force which is applied to the rack shaft 22.

The vehicle state quantity axial force Fyr and the road-surface axial force Fer are input to the grip state quantity calculating unit 89. The grip state quantity calculating unit 89 calculates the grip state quantity Gr indicating a degree of grip indicating to what degree the turning wheel 4 grips the road surface, by inputting the vehicle state quantity axial force Fyr and the road-surface axial force Fer to Equation (2).

$$\text{Grip state quantity } Gr = (Ker \times \text{road-surface axial force})/(Ky \times \text{vehicle state quantity axial force}) \quad (2)$$

Here, "Ker" and "Ky" represent coefficients which are set in advance by experiment or the like. The calculated grip state quantity Gr is output to the target steering angle calculating unit 64.

Figure 4:
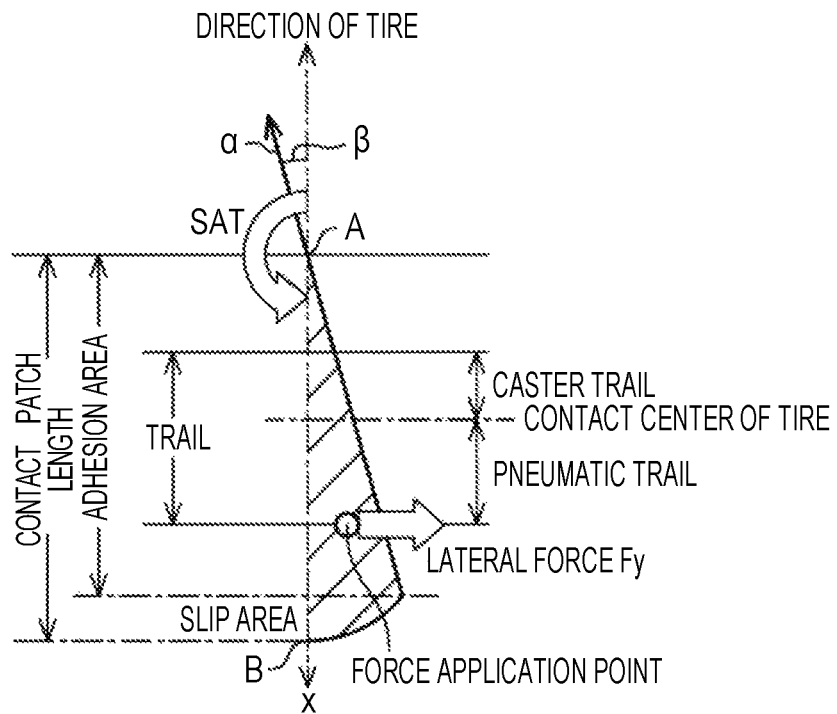
FIG. 4 is a diagram schematically illustrating a relationship between a lateral force acting on a force application point, a self-aligning torque, and a pneumatic trail.

A relationship between a slip angle β of the turning wheels and a force which is applied to the turning wheels will be described below with reference to FIGS. 4 and 5. FIG. 4 is a top view of a tread (contact patch) of one turning wheel with a slip angle β. A center line x directed in the direction of one turning wheel indicates the original direction of the turning wheel, and the progress direction of the turning wheel is indicated by a line α. In the drawing, when point A is defined as a contact start point of the turning wheel and point B is defined as a contact end point, the tread is dragged by the road surface by the slip angle β and is shifted from the center line x to the line α and thus warps. In FIG. 4, an area in which the tread is shifted and warps is hatched. In the warping area, an area on the side of point A is an adhesion area, and an area on the side of point B is a slip area. A lateral force Fy acts on a force application point of the tread of the turning wheel when the tire turns at the slip angle β, and a moment around the vertical axis is a self-aligning torque SAT. A distance between the contact center of the turning wheel and the force application point is a pneumatic trail, and the sum of the pneumatic trail and a caster trail is a trail.

Figure 5:
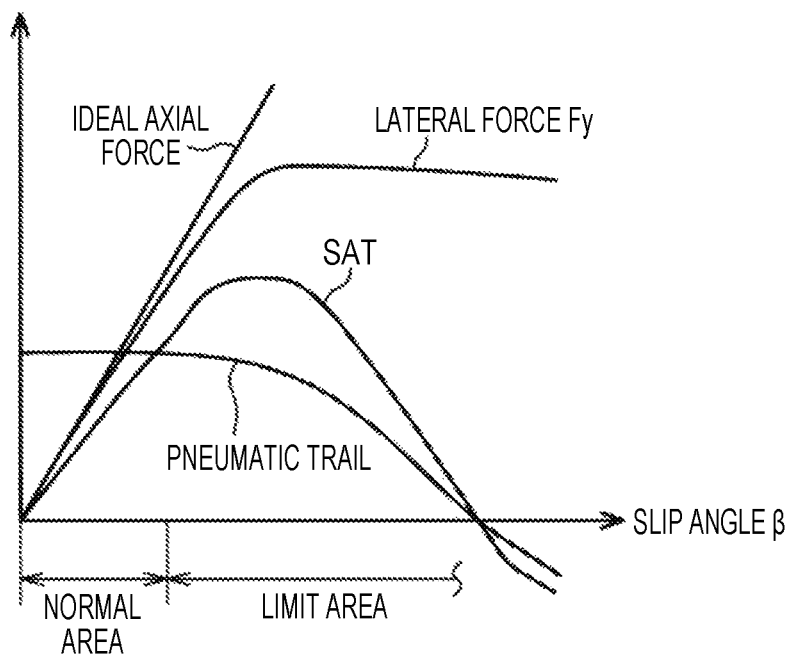
FIG. 5 is a graph illustrating changes of an ideal axial force, a lateral force (a vehicle state quantity axial force), a self-aligning torque (a road-surface axial force), and a pneumatic trail with respect to the change of a slip angle.

FIG. 5 illustrates changes of the ideal axial force Fib, the lateral force Fy (the vehicle state quantity axial force Fyr), the self-aligning torque SAT (the road-surface axial force Fer), and the pneumatic trail with respect to the change of the slip angle β. As illustrated in the drawing, in an area in which the slip angle β is small in the turning wheel which is turning, the ideal axial force Fib, the lateral force Fy, and the self-aligning torque SAT increase substantially linearly with an increase in the slip angle β, and a difference between these values is small. On the other hand, in an area in which the slip angle β has a certain large magnitude, the ideal axial force Fib continues to increase substantially linearly with the increase in the slip angle β, and the lateral force Fy continues to increase and then tends to be substantially constant or to decrease slightly. The self-aligning torque SAT continues to increase for a moment with the increase in the slip angle β, but exhibits a tendency to decrease greatly with the decrease in the pneumatic trail. The area in which the values change substantially linearly and the differences therebetween is small is defined as a normal area, and the area in which the lateral force Fy and the self-aligning torque SAT change nonlinearly and the difference therebetween increases is defined as a limit area. The normal area and the limit area which are illustrated in FIG. 5 are distinguished from each other for the purpose of convenience.

When the axial force at the time of turning is regarded as the self-aligning torque SAT, the relationship between the self-aligning torque SAT and the lateral force Fy can be expressed by Equation (3) using a parameter corresponding to a pneumatic trail from the contact center between the turning wheel and the road surface to the force application point on which the lateral force acts as illustrated in FIG. 4.

$$\text{Self-aligning torque } SAT = \text{Lateral force } Fy \times \text{Pneumatic trail} \quad (3)$$

Then, when "axial force≈reaction force from the road surface" is considered as the self-aligning torque SAT, it can be said that the road-surface axial force Fer based on the drive current (that is, the q-axis current value Iqt) of the turning-side motor 33 approximately expresses the self-aligning torque SAT.

The lateral force Fy is a force which is generated in the turning wheel 4, and the lateral force Fy can be approximately expressed by the lateral acceleration LA with replacement of "lateral force Fy≈force generated in the lateral direction of the vehicle." Since responsiveness to an actual axial force when movement is started is not made sufficient by only the lateral acceleration LA, a differential of the yaw rate γ is added thereto to improve the responsiveness and thus Equation (1) is obtained.

The grip state quantity Gr can be expressed by Equation (4) using Equation (3).

$$\text{Grip state quantity } Gr = \text{self-aligning torque } SAT / \text{lateral force } Fy \quad (4)$$

Since the road-surface axial force Fer can approximately express the self-aligning torque SAT and the vehicle state quantity axial force Fyr can approximately express the lateral force, the grip state quantity Gr is expressed by Equation (2).

Figure 6:
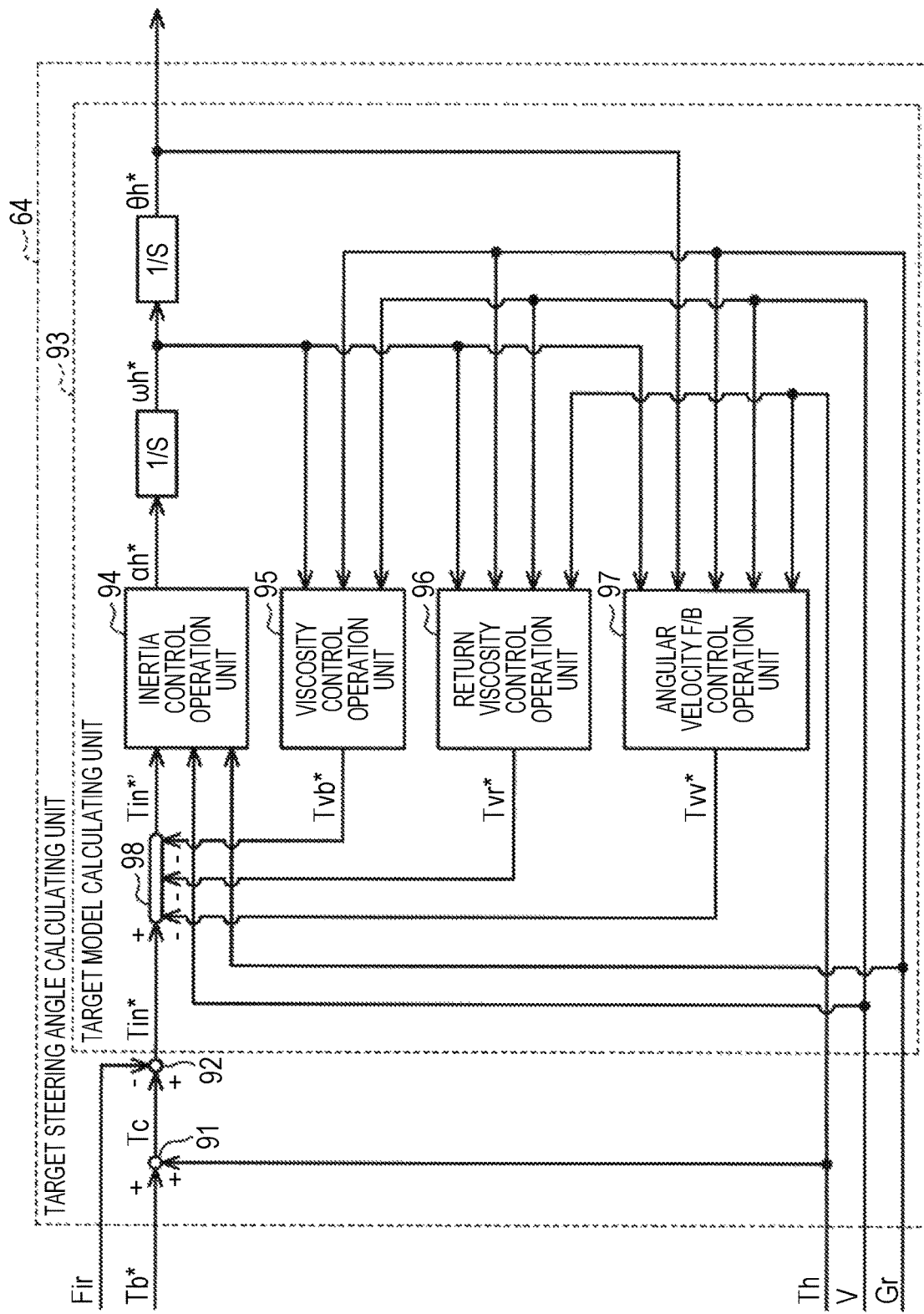
FIG. 6 is a block diagram of a target steering angle calculating unit according to the first embodiment.

The configuration of the target steering angle calculating unit 64 will be described below. As illustrated in FIG. 6, the target steering angle calculating unit 64 includes an adder 91 to which the steering torque Th in addition to the input-torque basic component Tb* is input, and calculates the drive torque Tc by causing the adder 91 to sum the values. The target steering angle calculating unit 64 further includes a subtractor 92 to which the reaction component Fir along with the drive torque Tc is input, and calculates the input torque Tin* by causing the subtractor 92 to subtract the reaction component Fir from the drive torque Tc. The calculated input torque Tin* is input to a target model calculating unit 93.

The target model calculating unit 93 includes an inertia control operation unit 94 that corresponds to an inertia term of the model formula and a viscosity control operation unit 95 that corresponds to a viscosity term. The target model calculating unit 93 includes a return viscosity control operation unit 96 that corresponds to the viscosity term in the model formula and operates in a non-steered state. The target model calculating unit 93 includes an angular velocity feedback control operation unit (hereinafter referred to as an angular velocity F/B control operation unit) 97 that causes a target steering velocity ωh* which is a target value of an angular velocity of a rotation shaft in the model formula to match a target compensatory angular velocity ωr*.

An input torque Tin*′ which is obtained by causing a subtractor 98 to subtract a target viscosity torque Tvb* output from the viscosity control operation unit 95, a target return viscosity torque Tvr* output from the return viscosity control operation unit 96, and a target compensatory angular velocity torque Tvv* output from the angular velocity F/B control operation unit 97 from the input torque Tin* is input to the inertia control operation unit 94. The vehicle speed V and the grip state quantity Gr, in addition to the input torque Tin*′, are input to the inertia control operation unit 94. The inertia control operation unit 94 calculates a target steering acceleration αh* (a target angular acceleration of the rotation shaft) based on the state quantities input thereto. The target model calculating unit 93 calculates a target steering velocity ωh* (a target angular velocity of the rotation shaft) by integrating the target steering acceleration αh*, and calculates the target steering angle θh* of the steering wheel 11 by integrating the target steering velocity ωh*. The calculated target steering velocity ωh* is output to the viscosity control operation unit 95, the return viscosity control operation unit 96, and the angular velocity F/B control operation unit 97, and the target steering angle θh* is output to the angular velocity F/B control operation unit 97, the subtractor 69, and the reaction component calculating unit 63 (see FIG. 2). The signs of the target steering acceleration αh*, the target viscosity torque Tvb*, the target return viscosity torque Tvr*, and the target compensatory angular velocity torque Tvv* are set in the same manner as the signs of the steering torque Th and the rotation angles θs and θt. When the target steering acceleration αh* has a positive value, the target viscosity torque Tvb* and the target return viscosity torque Tvr* are calculated as positive values and the target compensatory angular velocity torque Tvv* is calculated as a negative value.

The vehicle speed V and the grip state quantity Gr in addition to the target steering velocity ωh* are input to the viscosity control operation unit 95. The viscosity control operation unit 95 calculates a target viscosity torque Tvb* which is to be added to the input torque Tin*, based on the input state quantities. The steering torque Th, the vehicle speed V, and the grip state quantity Gr in addition to the target steering velocity ωh* are input to the return viscosity control operation unit 96. The return viscosity control operation unit 96 calculates the target return viscosity torque Tvr* which is to be added to the input torque Tin*, based on the input state quantities. The steering torque Th, the vehicle speed V, and the grip state quantity Gr in addition to the target steering velocity ωh* and the target steering angle θh* are input to the angular velocity F/B control operation unit 97. The angular velocity F/B control operation unit 97 calculates the target compensatory angular velocity torque Tvv* which is to be subtracted from the input torque Tin*, based on the input state quantities.

Figure 7:
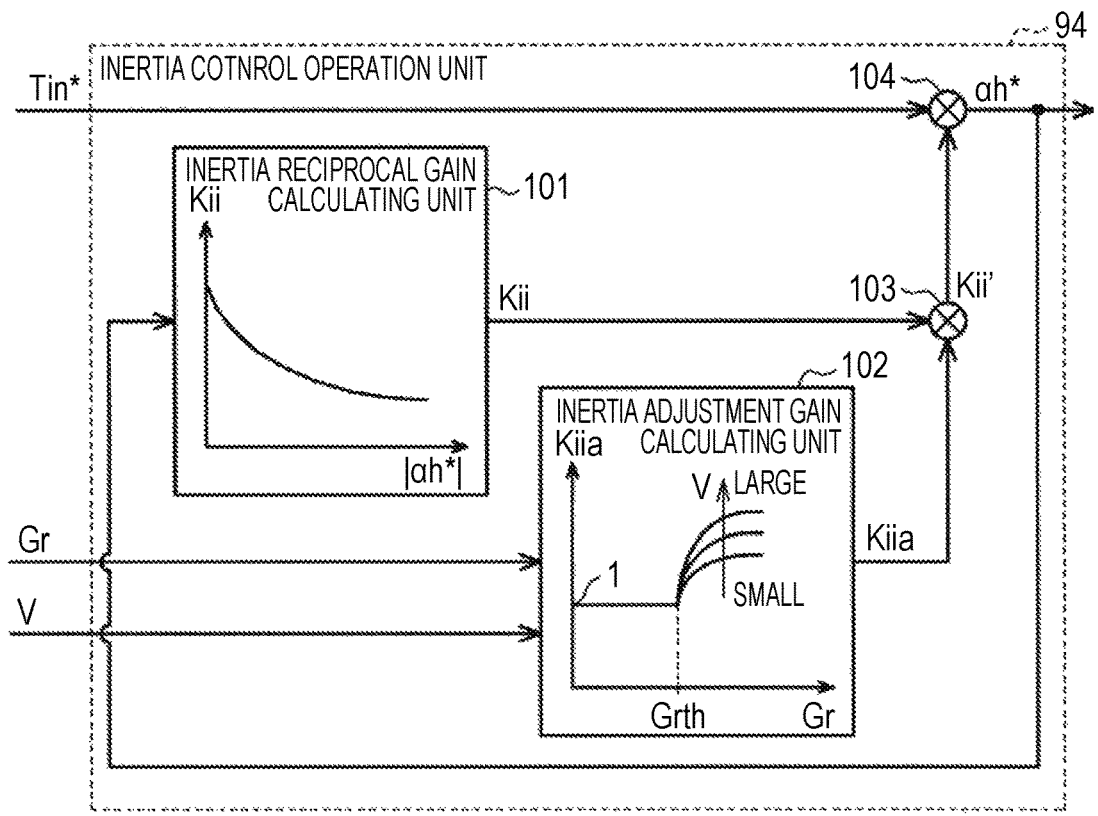
FIG. 7 is a block diagram of an inertia control operation unit according to the first embodiment.

The configuration of the inertia control operation unit 94 will be described below. As illustrated in FIG. 7, the inertia control operation unit 94 includes an inertia reciprocal gain calculating unit 101 that calculates an inertia reciprocal gain Kii based on the target steering acceleration αh* and an inertia adjustment gain calculating unit 102 that calculates an inertia adjustment gain Kiia for adjusting the inertia reciprocal gain Kii.

The target steering acceleration αh* is input to the inertia reciprocal gain calculating unit 101. The inertia reciprocal gain calculating unit 101 includes a map in which a relationship between the target steering acceleration αh* and the inertia reciprocal gain Kii is defined, and calculates the inertia reciprocal gain Kii corresponding to the target steering acceleration αh* with reference to the map. This map is set such that the inertia reciprocal gain Kii decreases non-linearly with the increase of the target steering acceleration αh*. The calculated inertia reciprocal gain Kii is output to a multiplier 103.

The grip state quantity Gr and the vehicle speed V are input to the inertia adjustment gain calculating unit 102. The inertia adjustment gain calculating unit 102 includes a map in which a relationship between the grip state quantity Gr and the vehicle speed V and the inertia adjustment gain Kiia is defined, and calculates the inertia adjustment gain Kiia corresponding to the grip state quantity Gr and the vehicle speed V with reference to the map. This map is set such that the inertia adjustment gain Kiia is "1" in an area in which the grip state quantity Gr is equal to or less than a grip threshold value Grth and the inertia adjustment gain Kiia increases with the increase in the grip state quantity Gr when the grip state quantity Gr is greater than the grip threshold value Grth. The grip threshold value Grth is a value indicating the grip state quantity Gr at the slip angle β which is a boundary between the normal area and the limit area and is set in advance by experiment or the like. The map is set such that the inertia adjustment gain Kiia increases with the increase in the vehicle speed V in an area in which the grip state quantity Gr is greater than the grip threshold value Grth. The form of the map can be appropriately modified and, for example, may be set such that the inertia adjustment gain Kiia decreases with the increase in the grip state quantity Gr or may be set such that the inertia adjustment gain Kiia decreases with the increase in the vehicle speed V in the area in which the grip state quantity Gr is greater than the grip threshold value Grth. The calculated inertia adjustment gain Kiia is output to a multiplier 103.

The inertia control operation unit 94 calculates a value obtained by causing the multiplier 103 to multiply the inertia reciprocal gain Kii by the inertia adjustment gain Kiia, as an inertia reciprocal gain Kii', and outputs the calculated inertia reciprocal gain Kii' to a multiplier 104. Then, the inertia control operation unit 94 calculates the target steering acceleration αh* by causing the multiplier 104 to multiply the input torque Tin*' by the inertia reciprocal gain Kii'.

Figure 8:
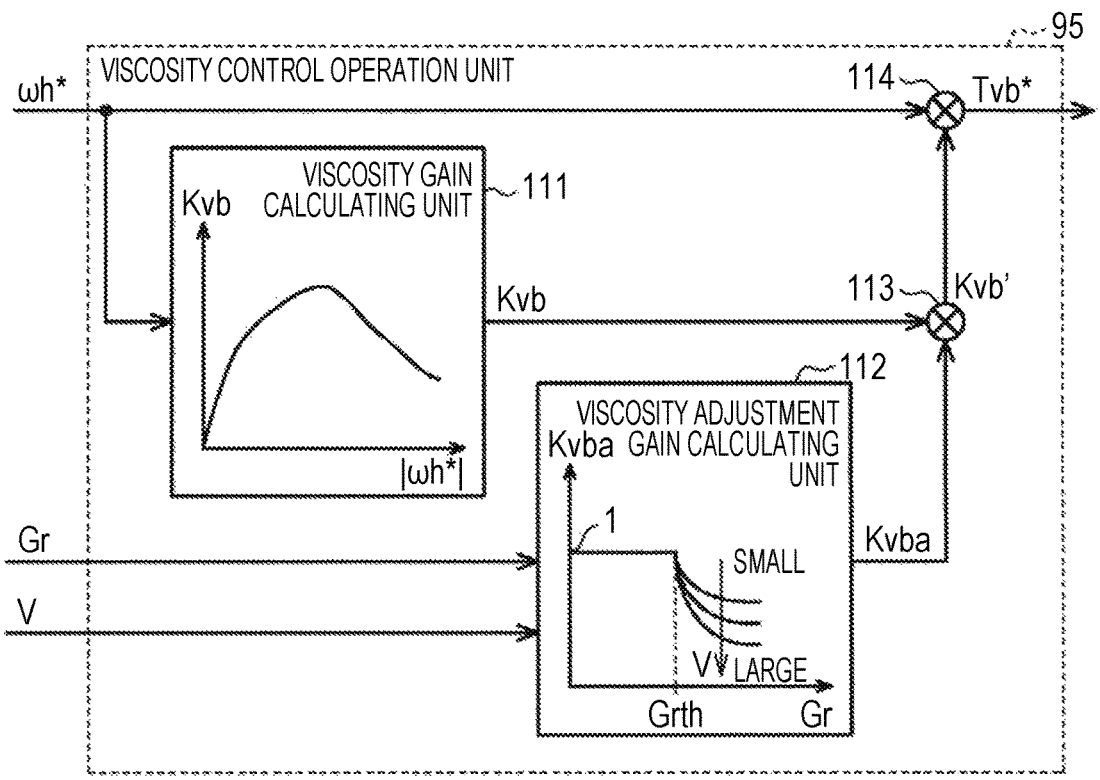
FIG. 8 is a block diagram of a viscosity control operation unit according to the first embodiment.

The configuration of the viscosity control operation unit 95 will be described below. As illustrated in FIG. 8, the viscosity control operation unit 95 includes a viscosity gain calculating unit 111 that calculates a viscosity gain Kvb based on the target steering velocity ωh* and a viscosity adjustment gain calculating unit 112 that calculates a viscosity adjustment gain Kvba for adjusting the viscosity gain Kvb.

The target steering velocity ωh* is input to the viscosity gain calculating unit 111. The viscosity gain calculating unit 111 includes a map in which a relationship between the target steering velocity ωh* and the viscosity gain Kvb is defined, and calculates the viscosity gain Kvb corresponding to the target steering velocity ωh* with reference to the map. This map is set such that the viscosity gain Kvb increases nonlinearly and then decreases with the increase of the target steering velocity ωh*. The calculated viscosity gain Kvb is output to a multiplier 113.

The grip state quantity Gr and the vehicle speed V are input to the viscosity adjustment gain calculating unit 112. The viscosity adjustment gain calculating unit 112 includes a map in which a relationship between the grip state quantity Gr and the vehicle speed V and the viscosity adjustment gain Kvba is defined, and calculates the viscosity adjustment gain Kvba corresponding to the grip state quantity Gr and the vehicle speed V with reference to the map. This map is set such that the viscosity adjustment gain Kvba is "1" in an area in which the grip state quantity is equal to or less than the grip threshold value Grth and the viscosity adjustment gain Kvba decreases with the increase in the grip state quantity Gr when the grip state quantity Gr is greater than the grip threshold value Grth. The map is set such that the viscosity adjustment gain Kvba decreases with the increase in the vehicle speed V in an area in which the grip state quantity Gr is greater than the grip threshold value Grth. The form of the map can be appropriately modified and, for example, may be set such that the viscosity adjustment gain Kvba increases with the increase in the grip state quantity Gr or may be set such that the viscosity adjustment gain Kvba increases with the increase in the vehicle speed V in the area in which the grip state quantity Gr is greater than the grip threshold value Grth. The calculated viscosity adjustment gain Kvba is output to the multiplier 113.

The viscosity control operation unit 95 calculates a value obtained by causing the multiplier 113 to multiply the viscosity gain Kvb by the viscosity adjustment gain Kvba, as a viscosity gain Kvb', and outputs the calculated viscosity gain Kvb' to a multiplier 114. Then, the viscosity control operation unit 95 calculates the target viscosity torque Tvb* by causing the multiplier 114 to multiply the target steering velocity ωh* by the viscosity gain Kvb'.

Figure 9:
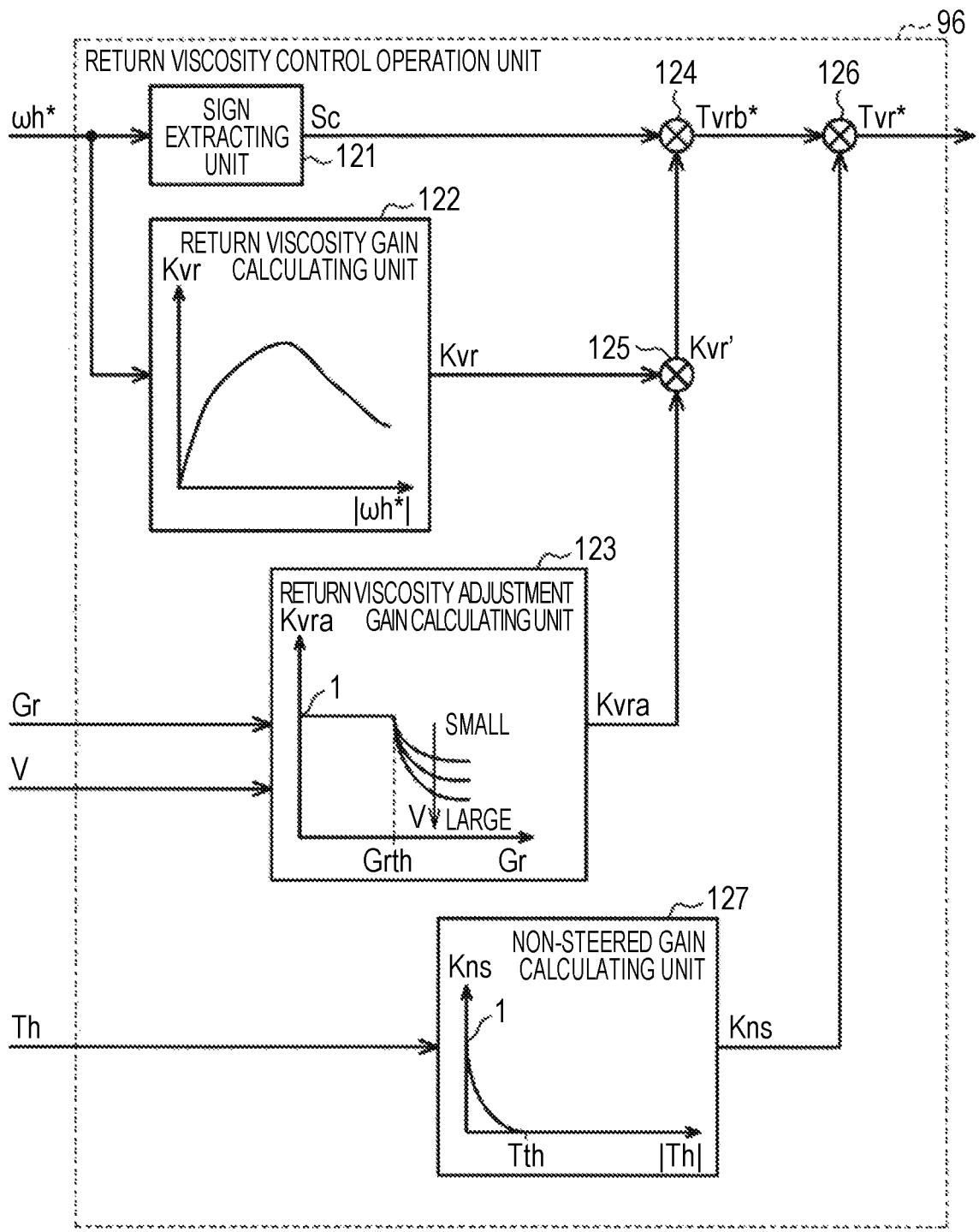
FIG. 9 is a block diagram of a return viscosity control operation unit according to the first embodiment.

The configuration of the return viscosity control operation unit 96 will be described below. As illustrated in FIG. 9, the return viscosity control operation unit 96 includes a sign extracting unit 121 that extracts a sign of the target steering velocity ωh* based on the target steering velocity ωh*, a return viscosity gain calculating unit 122 that calculates a return viscosity gain Kvr, and a return viscosity adjustment gain calculating unit 123 that calculates a return viscosity adjustment gain Kvra for adjusting the return viscosity gain Kvr The target steering velocity ωh* is input to the sign extracting unit 121. The sign extracting unit 121 outputs a sign signal Sc indicating "1" to a multiplier 124 when the target steering velocity ωh* has a positive value, and outputs a sign signal Sc indicating "−1" to the multiplier 124 when the target steering velocity ωh* has a negative value.

The target steering velocity ωh* is input to the return viscosity gain calculating unit 122. The return viscosity gain calculating unit 122 includes a map in which a relationship between the target steering velocity ωh* and the return viscosity gain Kvr is defined, and calculates the return viscosity gain Kvr corresponding to the target steering velocity ωh* with reference to the map. This map is set such that the return viscosity gain Kvr increases nonlinearly and then decreases with the increase in the target steering velocity ωh*. The calculated return viscosity gain Kvr is output to a multiplier 125.

The grip state quantity Gr and the vehicle speed V are input to the return viscosity adjustment gain calculating unit 123. The return viscosity adjustment gain calculating unit 123 includes a map in which a relationship between the grip state quantity Gr and the vehicle speed V, and the return viscosity adjustment gain Kvra is defined, and calculates the return viscosity adjustment gain Kvra corresponding to the grip state quantity Gr and the vehicle speed V with reference to the map. The map in this embodiment is set similarly to the map of the viscosity adjustment gain calculating unit 112, but may be set in a form different from the form of the map of the viscosity adjustment gain calculating unit 112. The calculated return viscosity adjustment gain Kvra is output to the multiplier 125.

The return viscosity control operation unit 96 calculates a value obtained by causing the multiplier 125 to multiply the return viscosity gain Kvr by the return viscosity adjustment gain Kvra, as a return viscosity gain Kvr', and outputs the calculated return viscosity gain Kvr' to the multiplier 124. Then, the viscosity control operation unit 95 calculates a basic return viscosity torque Tvrb* by causing the multiplier 124 to multiply the sign signal Sc by the return viscosity gain Kvr' and outputs the basic return viscosity torque to a multiplier 126.

The return viscosity control operation unit 96 includes a non-steered gain calculating unit 127. The steering torque Th is input to the non-steered gain calculating unit 127. The non-steered gain calculating unit 127 includes a map in which a relationship between the steering torque Th and a non-steered gain Kns is defined, and calculates the non-steered gain Kns corresponding to the steering torque Th with reference to the map. This map is set such that the non-steered gain Kns is "1" when the absolute value of the steering torque Th is "0," the non-steered gain Kns decreases with an increase in the absolute value of the steering torque Th, and the non-steered gain Kns is, for example, "0" when the absolute value of the steering torque Th is greater than a non-steered threshold value Tth. The non-steered threshold value Tth is a value at which it is determined that a driver performs a steering operation and is set to a value close to zero in advance. The calculated non-steered gain Kns is output to the multiplier 126. Then, the return viscosity control operation unit 96 outputs a value obtained by causing the multiplier 126 to multiply the basic return viscosity torque Tvrb* by the non-steered gain Kns, as a target return viscosity torque Tvr*. Since the non-steered gain Kns is "0" when a driver performs a steering operation as described above, the target return viscosity torque Tvr* is output in the non-steered state.

Figure 10:
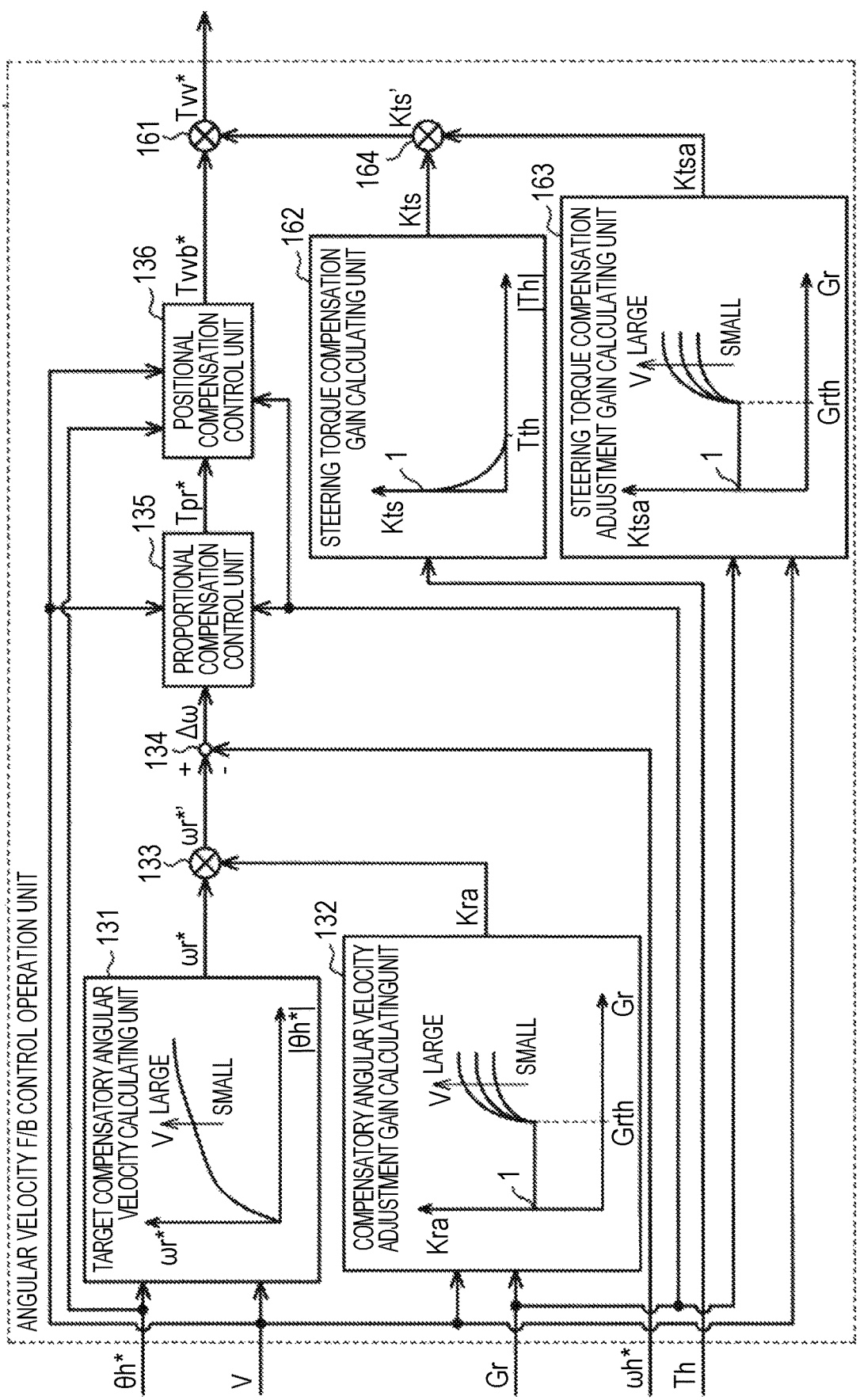
FIG. 10 is a block diagram of an angular velocity FB control operation unit according to the first embodiment.

The configuration of the angular velocity F/B control operation unit 97 will be described below. As illustrated in FIG. 10, the angular velocity F/B control operation unit 97 includes a target compensatory angular velocity calculating unit 131 that calculates a target compensatory angular velocity $\omega r^*$ based on the target steering angle $\theta h^*$ and a compensatory angular velocity adjustment gain calculating unit 132 that calculates a compensatory angular velocity adjustment gain Kra for adjusting the target compensatory angular velocity $\omega r^*$.

The target steering angle $\theta h^*$ and the vehicle speed V are input to the target compensatory angular velocity calculating unit 131. The target compensatory angular velocity calculating unit 131 includes a map in which a relationship between the target steering angle $\theta h^*$ and the vehicle speed V, and the target compensatory angular velocity $\omega r^*$ is defined, and calculates the target compensatory angular velocity $\omega r^*$ corresponding to the target steering angle $\theta h^*$ and the vehicle speed V with reference to the map. This map is set such that the target compensatory angular velocity $\omega r^*$ increases nonlinearly with an increase in the target steering angle $\theta h^*$. The map in this embodiment is set such that the target compensatory angular velocity $\omega r^*$ increases as the vehicle speed V increases, but may be set such that the target compensatory angular velocity $\omega r^*$ decreases as the vehicle speed V increases.

The grip state quantity Gr and the vehicle speed V are input to the compensatory angular velocity adjustment gain calculating unit 132. The compensatory angular velocity adjustment gain calculating unit 132 includes a map in which a relationship between the grip state quantity Gr and the vehicle speed V, and the compensatory angular velocity adjustment gain Kra is defined, and calculates the compensatory angular velocity adjustment gain Kra corresponding to the grip state quantity Gr and the vehicle speed V with reference to the map. The map in this embodiment is set similarly to the map of the inertia adjustment gain calculating unit 102, but may be set in a form different from the form of the map of the inertia adjustment gain calculating unit 102. The calculated compensatory angular velocity adjustment gain Kra is output to the multiplier 133.

The angular velocity F/B control operation unit 97 calculates a value obtained by causing the multiplier 133 to multiply the target compensatory angular velocity $\omega r^*$ by the compensatory angular velocity adjustment gain Kra, as a target compensatory angular velocity $\omega r^{*\prime}$, and outputs the calculated target compensatory angular velocity $\omega r^{*\prime}$ to a subtractor 134. The target steering velocity $\omega h^*$, in addition to the target compensatory angular velocity $\omega r^{*\prime}$, is input to the subtractor 134. Then, the angular velocity F/B control operation unit 97 calculates an angular velocity deviation $\Delta\omega$ by causing the subtractor 134 to subtract the target steering velocity $\omega h^*$ from the target compensatory angular velocity $\omega r^{*\prime}$.

The angular velocity F/B control operation unit 97 includes a proportional compensation control unit 135 and a positional compensation control unit 136 that execute compensation control for the angular velocity deviation $\Delta\omega$ such that the target steering velocity $\omega h^*$ matches the target compensatory angular velocity $\omega r^*$. The vehicle speed V and the grip state quantity Gr in addition to the angular velocity deviation $\Delta\omega$ are input to the proportional compensation control unit 135. Then, the proportional compensation control unit 135 calculates a proportional component Tpr* based on the state quantities.

Figure 11:
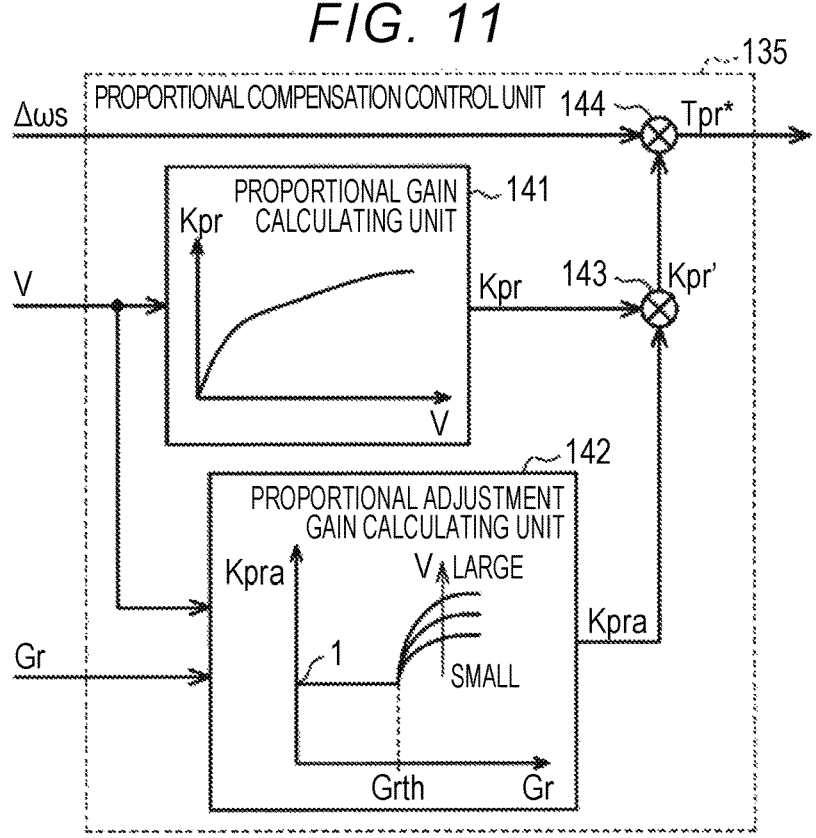
FIG. 11 is a block diagram of a proportional compensation control operation unit according to the first embodiment.

Specifically, as illustrated in FIG. 11, the proportional compensation control unit 135 includes a proportional gain calculating unit 141 that calculates a proportional gain Kpr based on the vehicle speed V and a proportional adjustment gain calculating unit 142 that calculates a proportional adjustment gain Kpra for adjusting the proportional gain Kpr.

The vehicle speed V is input to the proportional gain calculating unit 141. The proportional gain calculating unit 141 includes a map in which a relationship between the vehicle speed V and the proportional gain Kpr is defined, and calculates the proportional gain Kpr corresponding to the vehicle speed V with reference to the map. This map is set such that the proportional gain Kpr increases nonlinearly with the increase in the vehicle speed V. The calculated proportional gain Kpr is output to a multiplier 143.

The grip state quantity Gr and the vehicle speed V are input to the proportional adjustment gain calculating unit 142. The proportional adjustment gain calculating unit 142 includes a map in which a relationship between the grip state quantity Gr and the vehicle speed V, and the proportional adjustment gain Kpra is defined, and calculates the proportional adjustment gain Kpra corresponding to the grip state quantity Gr and the vehicle speed V with reference to the map. The map in this embodiment is set similarly to the map of the inertia adjustment gain calculating unit 102, but may be set in a form different from the form of the map of the inertia adjustment gain calculating unit 102. The calculated proportional adjustment gain Kpra is output to the multiplier 143.

The proportional compensation control unit 135 calculates a value obtained by causing the multiplier 143 to multiply the proportional gain Kpr by the proportional adjustment gain Kpra, as a proportional gain Kpr', and outputs the calculated proportional gain Kpr' to a multiplier 144. Then, the proportional compensation control unit 135 calculates a proportional component Tpr* by causing the multiplier 144 to multiply the angular velocity deviation $\Delta\omega$ by the proportional gain Kpr'.

As illustrated in FIG. 10, the proportional component Tpr* calculated by the proportional compensation control unit 135 is output to the positional compensation control unit 136. The target steering angle θh*, the grip state quantity Gr, and the vehicle speed V in addition to the proportional component Tpr* are input to the positional compensation control unit 136. Then, the positional compensation control unit 136 calculates a basic compensatory angular velocity torque Tvvb* based on the state quantities.

Figure 12:
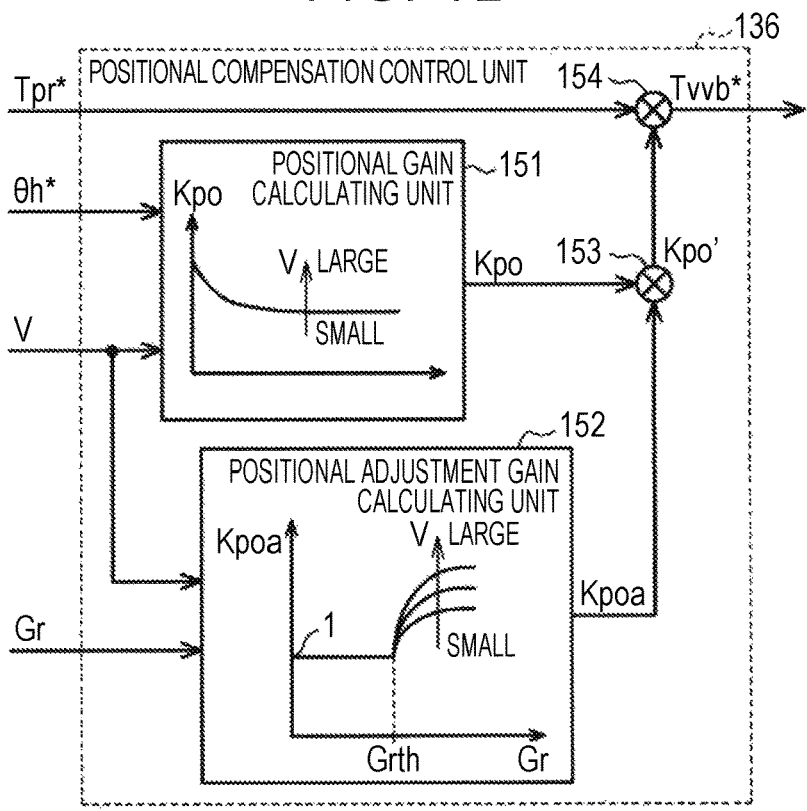
FIG. 12 is a block diagram of a positional compensation control operation unit according to the first embodiment.

Specifically, as illustrated in FIG. 12, the positional compensation control unit 136 includes a positional gain calculating unit 151 that calculates a positional gain Kpo based on the target steering angle θh* and the vehicle speed V, and a positional adjustment gain calculating unit 152 that calculates a positional adjustment gain Kpoa for adjusting the positional gain Kpo.

The target steering angle θh* and the vehicle speed V are input to the positional gain calculating unit 151. The positional gain calculating unit 151 includes a map in which a relationship between the target steering angle θh* and the vehicle speed V, and the positional gain Kpo is defined, and calculates the positional gain Kpo corresponding to the target steering angle θh* and the vehicle speed V with reference to the map. This map is set such that the positional gain Kpo has a maximum value when the absolute value of the target steering angle θh* is zero, and decreases and then is substantially constant with the increase in the absolute value of the target steering angle θh*. That is, this map is set such that the positional gain Kpo is large when the target steering angle θh* is in the vicinity of the steering neutral position. This map is set such that the positional gain Kpo increases as the vehicle speed V increases, but may be set such that the positional gain Kpo decreases as the vehicle speed V increases. The calculated positional gain Kpo is output to a multiplier 153.

The grip state quantity Gr and the vehicle speed V are input to the positional adjustment gain calculating unit 152. The positional adjustment gain calculating unit 152 includes a map in which a relationship between the grip state quantity Gr and the vehicle speed V, and the positional adjustment gain Kpoa is defined, and calculates the positional adjustment gain Kpoa corresponding to the grip state quantity Gr and the vehicle speed V with reference to the map. The map in this embodiment is set similarly to the map of the inertia adjustment gain calculating unit 102, but may be set in a form different from the form of the map of the inertia adjustment gain calculating unit 102. The calculated positional adjustment gain Kpoa is output to the multiplier 153.

The positional compensation control unit 136 calculates a value obtained by causing the multiplier 153 to multiply the positional gain Kpo by the positional adjustment gain Kpoa, as a positional gain Kpo', and outputs the calculated positional gain Kpo' to a multiplier 154. Then, the positional compensation control unit 136 calculates the basic compensatory angular velocity torque Tvvb* by causing the multiplier 154 to multiply the proportional component Tpr* by the positional gain Kpo'.

As illustrated in FIG. 10, the basic compensatory angular velocity torque Tvvb* calculated by the positional compensation control unit 136 is output to a multiplier 161. The angular velocity FB control operation unit 97 includes a steering torque compensation gain calculating unit 162 that calculates a steering torque compensation gain Kts based on the steering torque Th, and a steering torque compensation adjustment gain calculating unit 163 that calculates a steering torque compensation adjustment gain Ktsa for adjusting the steering torque compensation gain Kts.

The steering torque Th is input to the steering torque compensation gain calculating unit 162. The steering torque compensation gain calculating unit 162 includes a map in which a relationship between the steering torque Th and the steering torque compensation gain Kts is defined, and calculates the steering torque compensation gain Kts corresponding to the steering torque Th with reference to the map. This map is set similarly to the map of the non-steered gain calculating unit 127 of the return viscosity control operation unit 96, but may be set in a form different from the form of the map of the non-steered gain calculating unit 127. The calculated steering torque compensation gain Kts is output to a multiplier 164.

The grip state quantity Gr and the vehicle speed V are input to the steering torque compensation adjustment gain calculating unit 163. The steering torque compensation adjustment gain calculating unit 163 includes a map in which a relationship between the grip state quantity Gr and the vehicle speed V, and the steering torque compensation adjustment gain Ktsa is defined, and calculates the steering torque compensation adjustment gain Ktsa corresponding to the grip state quantity Gr and the vehicle speed V with reference to the map. The map in this embodiment is set similarly to the map of the inertia adjustment gain calculating unit 102, but may be set in a form different from the form of the map of the inertia adjustment gain calculating unit 102. The calculated steering torque compensation adjustment gain Ktsa is output to the multiplier 164.

The angular velocity F/B control operation unit 97 calculates a value obtained by causing the multiplier 164 to multiply the steering torque compensation gain Kts by the steering torque compensation adjustment gain Ktsa, as a steering torque compensation gain Kts', and outputs the calculated steering torque compensation gain Kts' to a multiplier 161. The angular velocity F/B control operation unit 97 outputs a value obtained by causing the multiplier 161 to multiply the basic compensatory angular velocity torque Tvvb* by the steering torque compensation gain Kts', as a target compensatory angular velocity torque Tvv*. Since the steering torque compensation gain Kts is "0" when a driver performs a steering operation as described above, the target compensatory angular velocity torque Tvv* is output in the non-steered state.

Change in a steering feeling due to adjustment of the target steering angle θh* will be described below. For example, there is a case in which the target steering angle θh* is adjusted to be greater than that before adjustment based on the grip state quantity Gr in a situation in which the vehicle is traveling on a low-μ road surface and the slip angle β is likely to increase. In this case, a steering reaction force which is applied from the steering-side motor 14 to the steering wheel 11 can be set to be less than that in a normal state from the stage before the slip angle β increases to enter the limit area, and a driver can easily recognize road surface information indicating a low-μ because a so-called sense of release is generated.

When the components which are used to calculate the target steering angle θh*, for example, the target steering acceleration αh* calculated by the inertia control operation unit 94, is adjusted to be greater than that before adjustment based on the grip state quantity Gr, quick start at the time of start of steering becomes possible and thus so-called counter-steering, which is a steering operation for returning to the normal area after entering the limit area, can be started earlier. For example, when the target viscosity torque Tvb* calculated by the viscosity control operation unit 95 is adjusted to be less than that before adjustment based on the grip state quantity Gr, quick steering becomes possible and thus, for example, a speed of counter-steering can be increased. For example, when the target return viscosity torque Tvr* calculated by the return viscosity control operation unit 96 is adjusted to be less than that before adjustment based on the grip state quantity Gr, the steering wheel 11 rapidly approaches the neutral position in the non-steered state and thus, for example, a speed of so-called self-counter-steering, which is an operation of the steering wheel 11 for returning to the normal area after entering the limit area, can be increased. For example, when the target compensatory angular velocity torque Tvv* calculated by the angular velocity F/B control operation unit 97 is adjusted to be greater (in the negative direction) than that before adjustment based on the grip state quantity Gr, the steering wheel 11 rapidly approaches the neutral position in the non-steered state and thus, for example, a speed of self-counter-steering can be increased.

On the other hand, in the same situation, there is a case in which the target steering angle θh* is adjusted to be less than that before adjustment based on the grip state quantity Gr. In this case, for example, since the steering reaction force which is applied from the steering-side motor 14 to the steering wheel 11 can be increased even when the slip angle β increases, it is possible to curb further steering to the limit area.

When the components which are used to calculate the target steering angle θh*, for example, the target steering acceleration αh* calculated by the inertia control operation unit 94 is adjusted to be less than that before adjustment based on the grip state quantity Gr, for example, the steering wheel 11 can be prevented from being accelerated and steered to the limit side after entering the limit area. For example, when the target viscosity torque Tvb* calculated by the viscosity control operation unit 95 is adjusted to be greater than that before adjustment based on the grip state quantity Gr, a damping function is strengthened and thus, for example, the steering wheel can be restrained from being steered to the limit side after entering the limit area. For example, when the target return viscosity torque Tvr* calculated by the return viscosity control operation unit 96 is adjusted to be greater than that before adjustment based on the grip state quantity Gr, the steering wheel 11 slowly approaches the neutral position in the non-steered state and thus, for example, a speed of self-counter-steering can be decreased. For example, when the target compensatory angular velocity torque Tvv* calculated by the angular velocity F/B control operation unit 97 is adjusted to be less (toward zero) than that before adjustment based on the grip state quantity Gr, the steering wheel 11 slowly approaches the neutral position in the non-steered state and thus, for example, a speed of self-counter-steering can be decreased.

Operations and advantages of this embodiment will be described below. (1) The steering-side control unit 51 calculates a target steering angle θh* in consideration of a grip state quantity Gr and calculates a target reaction torque Ts* by executing feedback control such that the steering angle θh matches the target steering angle θh*. Accordingly, since the grip state quantity Gr is reflected in the target steering angle θh* which is used to calculate the target reaction torque Ts*, it is possible to provide a superior steering feeling.

(2) The inertia control operation unit 94 includes the inertia reciprocal gain calculating unit 101 that calculates the inertia reciprocal gain Kii based on the target steering acceleration αh*, and the inertia adjustment gain calculating unit 102 that calculates the inertia adjustment gain Kiia by which the inertia reciprocal gain Kii is multiplied, and calculates the target steering acceleration αh* by multiplying the input torque Tin* by the inertia reciprocal gain Kii. Since the inertia control operation unit 94 changes the inertia adjustment gain Kiia based on the grip state quantity Gr and changes the target steering acceleration αh* by multiplying the inertia reciprocal gain Kii by the changed inertia adjustment gain Kiia to adjust the inertia reciprocal gain Kii, it is possible to appropriately adjust a sense of inertia of the steering feeling according to a grip state.

(3) Since the inertia adjustment gain calculating unit 102 changes the inertia adjustment gain Kiia according to the vehicle speed V, it is possible to appropriately adjust the inertia reciprocal gain Kii according to the vehicle speed V. (4) The viscosity control operation unit 95 includes the viscosity gain calculating unit 111 that calculates the viscosity gain Kvb based on the target steering velocity ωh*, and the viscosity adjustment gain calculating unit 112 that calculates the viscosity adjustment gain Kvba by which the viscosity gain Kvb is multiplied. The viscosity control operation unit 95 calculates the target viscosity torque Tvb* based on the target steering velocity ωh* and the viscosity gain Kvb. Since the viscosity adjustment gain calculating unit 112 changes the viscosity adjustment gain Kvba based on the grip state quantity Gr and changes the target viscosity torque Tvb* by multiplying the viscosity gain Kvb by the viscosity adjustment gain Kvba to adjust the viscosity gain Kvb, it is possible to appropriately adjust a sense of viscosity of the steering feeling according to a grip state.

(5) Since the viscosity adjustment gain calculating unit 112 changes the viscosity adjustment gain Kvba according to the vehicle speed V, it is possible to appropriately adjust the viscosity gain Kvb according to the vehicle speed V. (6) The return viscosity control operation unit 96 includes the return viscosity gain calculating unit 122 that calculates the return viscosity gain Kvr based on the target steering velocity ωh*, and the return viscosity adjustment gain calculating unit 123 that calculates the return viscosity adjustment gain Kvra by which the return viscosity gain Kvr is multiplied The return viscosity control operation unit 96 calculates the target return viscosity torque Tvr* based on the target steering velocity ωh* and the return viscosity gain Kvr. Since the return viscosity adjustment gain calculating unit 123 changes the return viscosity adjustment gain Kvra based on the grip state quantity Gr and changes the target return viscosity torque Tvr* by multiplying the return viscosity gain Kvr by the return viscosity adjustment gain Kvra to adjust the return viscosity gain Kvr, it is possible to appropriately adjust a sense of viscosity in the non-steered state according to a grip state.

(7) Since the return viscosity adjustment gain calculating unit 123 changes the return viscosity adjustment gain Kvra according to the vehicle speed V, it is possible to appropriately adjust the return viscosity adjustment gain Kvra according to the vehicle speed V. (8) The angular velocity F/B control operation unit 97 includes the target compensatory angular velocity calculating unit 131 that calculates the target compensatory angular velocity ωr* based on the target steering angle θh*, and the compensatory angular velocity adjustment gain calculating unit 132 that calculates the compensatory angular velocity adjustment gain Kra by which the target compensatory angular velocity ωr* is multiplied. The angular velocity F/B control operation unit 97 calculates the target compensatory angular velocity torque Tvv* based on the angular velocity deviation Δω between the target compensatory angular velocity ωr* and the target steering velocity ωh*. Since the compensatory angular velocity adjustment gain calculating unit 132 changes the compensatory angular velocity adjustment gain Kra based on the grip state quantity Gr and changes the target compensatory angular velocity torque Tvv* by multiplying the target compensatory angular velocity ωr* by the compensatory angular velocity adjustment gain Kra to adjust the target compensatory angular velocity ωr*, it is possible to appropriately adjust the target compensatory angular velocity ωr* according to a grip state.

(9) Since the compensatory angular velocity adjustment gain calculating unit 132 changes the compensatory angular velocity adjustment gain Kra according to the vehicle speed V, it is possible to appropriately adjust the target compensatory angular velocity ωr* according to the vehicle speed V. (10) The angular velocity F/B control operation unit 97 includes the proportional gain calculating unit 141 that calculates the proportional gain Kpr, and the proportional adjustment gain calculating unit 142 that calculates the proportional adjustment gain Kpra by which the proportional gain Kpr is multiplied. Since the angular velocity F/B control operation unit 97 changes the target compensatory angular velocity torque Tvv* by multiplying the angular velocity deviation Δω by the proportional gain Kpr, it is possible to calculate an appropriate target compensatory angular velocity torque Tvv* according to the vehicle speed V. Since the proportional adjustment gain calculating unit 142 changes the proportional gain Kpr based on the grip state quantity Gr, a grip state can be reflected in the proportional gain Kpr which is used to calculate the target compensatory angular velocity torque Tvv*.

(11) Since the proportional adjustment gain calculating unit 142 changes the proportional adjustment gain Kpra according to the vehicle speed V, it is possible to appropriately adjust the proportional gain Kpr according to the vehicle speed V. (12) The angular velocity F/B control operation unit 97 includes the positional gain calculating unit 151 that calculates the positional gain Kpo based on the target steering angle θh*, and the positional adjustment gain calculating unit 152 that calculates the positional adjustment gain Kpoa by which the positional gain Kpo is multiplied. The angular velocity F/B control operation unit 97 changes the target compensatory angular velocity torque Tvv* by multiplying the proportional component Tpr* based on the angular velocity deviation Δω by the positional gain Kpo'. Accordingly, it is possible to calculate an appropriate target compensatory angular velocity torque Tvv* according to the target steering angle θh*. Since the positional adjustment gain calculating unit 152 changes the positional adjustment gain Kpoa based on the grip state quantity Gr, a grip state can be reflected in the positional gain Kpo which is used to calculate the target compensatory angular velocity torque Tvv*.

(13) Since the positional adjustment gain calculating unit 152 changes the positional adjustment gain Kpoa according to the vehicle speed V, it is possible to appropriately adjust the positional adjustment gain Kpoa according to the vehicle speed V. (14) The angular velocity F/B control operation unit 97 includes the steering torque compensation gain calculating unit 162 that calculates the steering torque compensation gain Kts based on the steering torque Th, and the steering torque compensation adjustment gain calculating unit 163 that calculates the steering torque compensation adjustment gain Ktsa by which the steering torque compensation gain Kts is multiplied. The angular velocity F/B control operation unit 97 changes the target compensatory angular velocity torque Tvv* by multiplying the basic compensatory angular velocity torque Tvvb* which is a value based on the angular velocity deviation Δω by the steering torque compensation gain Kts. Since the steering torque compensation gain calculating unit 162 performs the calculation such that the steering torque compensation adjustment gain Ktsa is zero when the absolute value of the steering torque Th is greater than the non-steered threshold value Tth, the target compensatory angular velocity torque Tvv* is reflected in the target steering angle θh* in the non-steered state in which a driver does not input steering to the steering unit 3. Accordingly, it is possible to adjust the steering velocity of the steering wheel 11 at the time of return according to a grip state.

(15) Since the steering torque compensation adjustment gain calculating unit 163 changes the steering torque compensation adjustment gain Ktsa according to the vehicle speed V, it is possible to appropriately adjust the steering torque compensation gain Kts according to the vehicle speed V.

This embodiment can be modified as follows. This embodiment and the following modified examples can be combined with each other as long as they are not contradictory to each other. In the above-mentioned embodiment, the inertia reciprocal gain Kii' is changed according to the grip state quantity Gr by adjusting the inertia adjustment gain Kiia based on the grip state quantity Gr. However, the disclosure is not limited thereto and, for example, the inertia control operation unit 94 may calculate an inertia reciprocal gain Kii' as one gain including the inertia reciprocal gain Kii and the inertia adjustment gain Kiia and directly change the inertia reciprocal gain Kii' according to the grip state quantity Gr. Thus, the mode in the embodiment can be appropriately modified.

In the above-mentioned embodiment, the viscosity gain Kvb' is changed according to the grip state quantity Gr by adjusting the viscosity adjustment gain Kvba based on the grip state quantity Gr. However, the disclosure is not limited thereto and, for example, the viscosity control operation unit 95 may calculate a viscosity gain Kvb' as one gain including the viscosity gain Kvb and the viscosity adjustment gain Kvba and directly change the viscosity gain Kvb' according to the grip state quantity Gr. Thus, the mode in the embodiment can be appropriately modified.

In the above-mentioned embodiment, the return viscosity gain Kvr' is changed according to the grip state quantity Gr by adjusting the return viscosity adjustment gain Kvra based on the grip state quantity Gr. However, the disclosure is not limited thereto and, for example, the return viscosity control operation unit 96 may calculate a return viscosity gain Kvr' as one gain including the return viscosity gain Kvr and the return viscosity adjustment gain Kvra and directly change the return viscosity gain Kvr' according to the grip state quantity Gr. Thus, the mode in the embodiment can be appropriately modified.

In the above-mentioned embodiment, the target compensatory angular velocity ωr*' is changed according to the grip state quantity Gr by adjusting the compensatory angular velocity adjustment gain Kra based on the grip state quantity Gr. However, the disclosure is not limited thereto and, for example, the angular velocity FB control operation unit 97 may calculate a target compensatory angular velocity ωr*' as one gain including the target compensatory angular velocity ωr* and the compensatory angular velocity adjustment gain Kra and directly change the target compensatory angular velocity ωr*' according to the grip state quantity Gr. Thus, the mode in the embodiment can be appropriately modified.

In the above-mentioned embodiment, the proportional gain Kpr' is changed according to the grip state quantity Gr by adjusting the proportional adjustment gain Kpra based on the grip state quantity Gr. However, the disclosure is not limited thereto and, for example, the proportional compensation control unit 135 may calculate a proportional gain Kpra' as one gain including the proportional gain Kpr and the proportional adjustment gain Kpra and directly change the proportional gain Kpra' according to the grip state quantity Gr. Thus, the mode in the embodiment can be appropriately modified.

In the above-mentioned embodiment, the positional gain Kpo' is changed according to the grip state quantity Gr by adjusting the positional adjustment gain Kpoa based on the grip state quantity Gr. However, the disclosure is not limited thereto and, for example, the positional compensation control unit 136 may calculate a positional gain Kpo' as one gain including the positional gain Kpo and the positional adjustment gain Kpoa and directly change the positional gain Kpo' according to the grip state quantity Gr. Thus, the mode in the embodiment can be appropriately modified.

In the above-mentioned embodiment, the steering torque compensation gain Kts' is changed according to the grip state quantity Gr by adjusting the steering torque compensation adjustment gain Ktsa based on the grip state quantity Gr. However, the disclosure is not limited thereto and, for example, the angular velocity FB control operation unit 97 may calculate a steering torque compensation gain Kts' as one gain including the steering torque compensation gain Kts and the steering torque compensation adjustment gain Ktsa and directly change the steering torque compensation gain Kts' according to the grip state quantity Gr. Thus, the mode in the embodiment can be appropriately modified.

In the above-mentioned embodiment, the non-steered gain calculating unit 127 calculates the non-steered gain Kns based on the steering torque Th (a torsion bar torque) which is detected by the torque sensor 42. However, the disclosure is not limited thereto, and the non-steered gain Kns may be calculated based on a torque (an estimated steering torque) which is applied to the steering wheel 11 by a driver. The estimated steering torque can be detected, for example, by a sensor which is provided in the steering wheel 11 or obtained by calculation from the steering torque Th. Similarly, the steering torque compensation gain calculating unit 162 may calculate the steering torque compensation gain Kts based on the estimated steering torque.

In the above-mentioned embodiment, a non-steered adjustment gain calculating unit that calculates a non-steered adjustment gain for adjusting the non-steered gain Kns may be provided in the return viscosity control operation unit 96. The non-steered adjustment gain calculating unit may have, for example, the same configuration as the configuration of the steering torque compensation adjustment gain calculating unit 163. The non-steered adjustment gain calculating unit may change the non-steered adjustment gain according to the vehicle speed V.

In the above-mentioned embodiment, the steering torque compensation adjustment gain Ktsa may be calculated such that the steering torque compensation adjustment gain Ktsa is not zero when the absolute value of the steering torque Th is greater than the non-steered threshold value Tth. In this case, by multiplying the basic compensatory angular velocity torque Tvvb* by the steering torque compensation gain Kts based on the steering torque, it is possible to calculate an appropriate target compensatory angular velocity torque Tvv* according to the steering torque Th.

In the above-mentioned embodiment, the inertia adjustment gain Kiia may be set to be constant such that the inertia adjustment gain Kiia is not changed according to the vehicle speed V. Similarly, the viscosity adjustment gain Kvba, the return viscosity adjustment gain Kvra, the compensatory angular velocity adjustment gain Kra, the proportional adjustment gain Kpra, the positional adjustment gain Kpoa may not be changed according to the vehicle speed V, and may be set to be constant.

In the above-mentioned embodiment, the map forms of the inertia reciprocal gain calculating unit 101, the viscosity gain calculating unit 111, the return viscosity gain calculating unit 122, the target compensatory angular velocity calculating unit 131, the proportional gain calculating unit 141, and the positional gain calculating unit 151 can be appropriately modified.

In the above-mentioned embodiment, the positional compensation control unit 136 calculates the positional gain Kpo based on the target steering angle θh*, but the disclosure is not limited thereto and the positional gain Kpo may be calculated, for example, based on the steering angle θh.

In the above-mentioned embodiment, the target compensatory angular velocity calculating unit 131 calculates the target compensatory angular velocity ωr* based on the target steering angle θh*, but the disclosure is not limited thereto and the target compensatory angular velocity ωr* may be calculated, for example, based on the steering angle θh.

In the above-mentioned embodiment, the angular velocity F/B control operation unit 97 calculates the angular velocity deviation Δω by subtracting the target steering velocity ωh* from the target compensatory angular velocity ωr*, but the disclosure is not limited thereto and the angular velocity deviation Δω may be calculated, for example, by subtracting the steering velocity ωs based on the differential of the steering angle θh from the target compensatory angular velocity ωr*.

In the above-mentioned embodiment, the angular velocity F/B control operation unit 97 may not include one or two, or all of the proportional compensation control unit 135, the positional compensation control unit 136, and the steering torque compensation gain calculating unit 162.

In the above-mentioned embodiment, the viscosity control operation unit 95 calculates the target viscosity torque Tvb* by multiplying the target steering velocity ωh* by the viscosity gain Kvb', but the disclosure is not limited thereto and the target viscosity torque Tvb* may be calculated, for example, by multiplying a sign signal extracted from the target steering velocity ωh* by the viscosity gain Kvb'. The return viscosity control operation unit 96 may calculate the target return viscosity torque Tvr* by multiplying the target steering velocity ωh* by the return viscosity gain Kvr'.

In the above-mentioned embodiment, the target steering angle calculating unit 64 may not include one or both of the return viscosity control operation unit 96 and the angular velocity F/B control operation unit 97. In the above-mentioned embodiment, when at least one of the inertia control operation unit 94, the viscosity control operation unit 95, the return viscosity control operation unit 96, and the angular velocity F/B control operation unit 97 performs calculation in consideration of the grip state quantity Gr, the other calculating units may perform calculation without considering the grip state quantity Gr.

In the above-mentioned embodiment, a degree of grip obtained by dividing the road-surface axial force Fer by the vehicle state quantity axial force Fyr is set as the grip state quantity Gr, but the disclosure is not limited thereto and, for example, a degree of grip loss obtained by subtracting the vehicle state quantity axial force Fyr from the road-surface axial force Fer (a value indicating to what degree the grip of the turning wheel 4 is lost) may be set as the grip state quantity Gr.

In the above-mentioned embodiment, the grip state quantity Gr is calculated based on the road-surface axial force Fer and the vehicle state quantity axial force Fyr. However, the disclosure is not limited thereto, and since the grip state quantity Gr can be calculated based on a plurality of kinds of axial forces, the grip state quantity Gr may be calculated, for example, based on the road-surface axial force Fer and the ideal axial force Fib or based on the road-surface axial force Fer, the ideal axial force Fib, and the vehicle state quantity axial force Fyr. An axial force other than the ideal axial force Fib, the road-surface axial force Fer, and the vehicle state quantity axial force Fyr may be calculated and be used to calculate the grip state quantity Gr.

In the above-mentioned embodiment, the road-surface axial force Fer is calculated based on the q-axis current value Iqt, but the disclosure is not limited thereto and, for example, a pressure sensor that can detect an axial force may be provided in the rack shaft 22 and a detection result thereof may be used as the road-surface axial force Fer.

In the above-mentioned embodiment, the ideal axial force Fib may be calculated based on the target steering angle θh* (the target turning-corresponding angle) and the vehicle speed V, but the disclosure is not limited thereto and the ideal axial force Fib may be calculated based on only the target steering angle θh* or may be calculated based on the turning-corresponding angle θp. For example, the ideal axial force Fib may be calculated using another method in consideration of another parameter such as the steering torque Th or the vehicle speed V.

In the above-mentioned embodiment, the reaction component Fir (the distributed axial force) is calculated by employing the ideal axial force Fib and the road-surface axial force Fer at predetermined proportions (i.e., by summing the ideal axial force Fib and the road-surface axial force Fer) at predetermined proportions, but the disclosure is not limited thereto and, for example, the distributed axial force may be calculated by employing (i.e., by summing) the ideal axial force Fib and the vehicle state quantity axial force Fyr at predetermined proportions. The mode for calculating the distributed axial force can be appropriately modified.

In the above-mentioned embodiment, the distributed axial force calculating unit 83 may calculate the distribution gains Gib and Ger in consideration of a parameter other than the vehicle speed V. For example, in a vehicle in which a drive mode indicating a set state of a control pattern for an in-vehicle engine or the like can be selected out of a plurality of drive modes, the selected drive mode may be used as a parameter for setting the distribution gains Gib and Ger. In this case, the distributed axial force calculating unit 83 may include a plurality of maps for the drive modes, the plurality of maps having different tendencies with respect to the vehicle speed V, and the distribution gains Gib and Ger may be calculated with reference to the maps.

In the above-mentioned embodiment, the reaction component calculating unit 63 calculates a basic reaction force based on an axial force acting on the rack shaft 22, as the reaction component Fir, but the disclosure is not limited thereto and, for example, a value obtained by reflecting another reaction force in the basic reaction force may be calculated as the reaction component. For example, an end reaction force, which is a reaction force resisting a further turning operation of the steering wheel 11 when the absolute value of the steering angle θh of the steering wheel 11 approaches a steering angle threshold value, may be employed as such a reaction force. For example, it is possible to use, as the steering angle threshold value, the turning-corresponding angle θp at a virtual-rack-end vicinity position which is located closer to the neutral position by a predetermined angle than a virtual rack end position which is set closer to the neutral position than a mechanical rack end position at which movement of the rack shaft 22 in the axial direction is restricted by causing the rack end 25 to come into contact with the rack housing 23. The steering angle θh at a rotation end position of the steering wheel 11 may be used as the steering angle threshold value.

Figure 13:
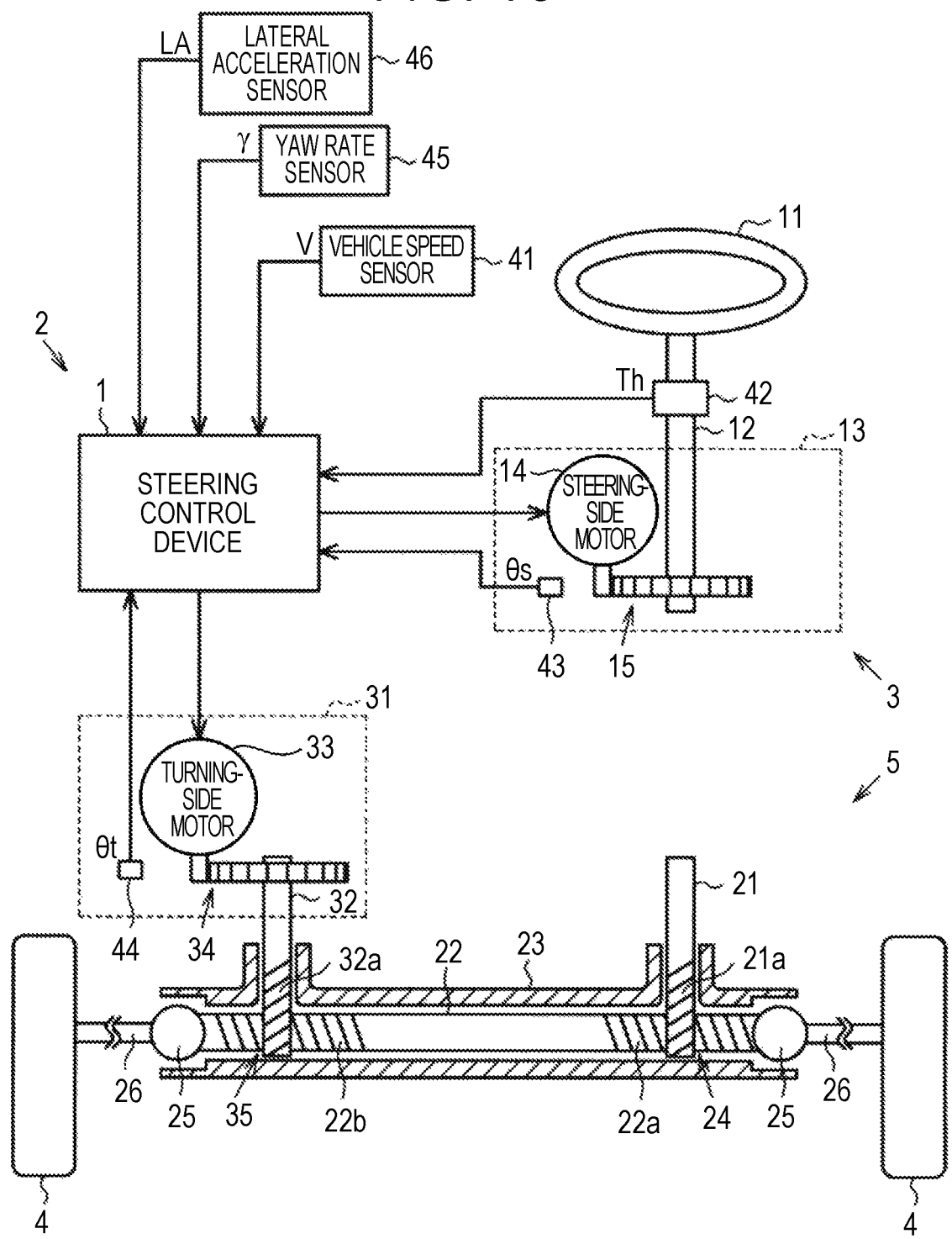
FIG. 13 is a diagram schematically illustrating a configuration of a steer-by-wire steering system according to a second embodiment.

Hereinafter, a steering control device according to a second embodiment will be described with reference to the accompanying drawings. As illustrated in FIG. 13, a steer-by-wire steering system 2 which is a control object of a steering control device 1 includes a steering unit 3 that is steered by a driver and a turning unit 5 that turns turning wheels 4 according to a driver's steering of the steering unit 3. The same elements as the elements of the first embodiment illustrated in FIG. 1 will be referred to by the same reference numerals and signs and description thereof will not be repeated.

Figure 14:
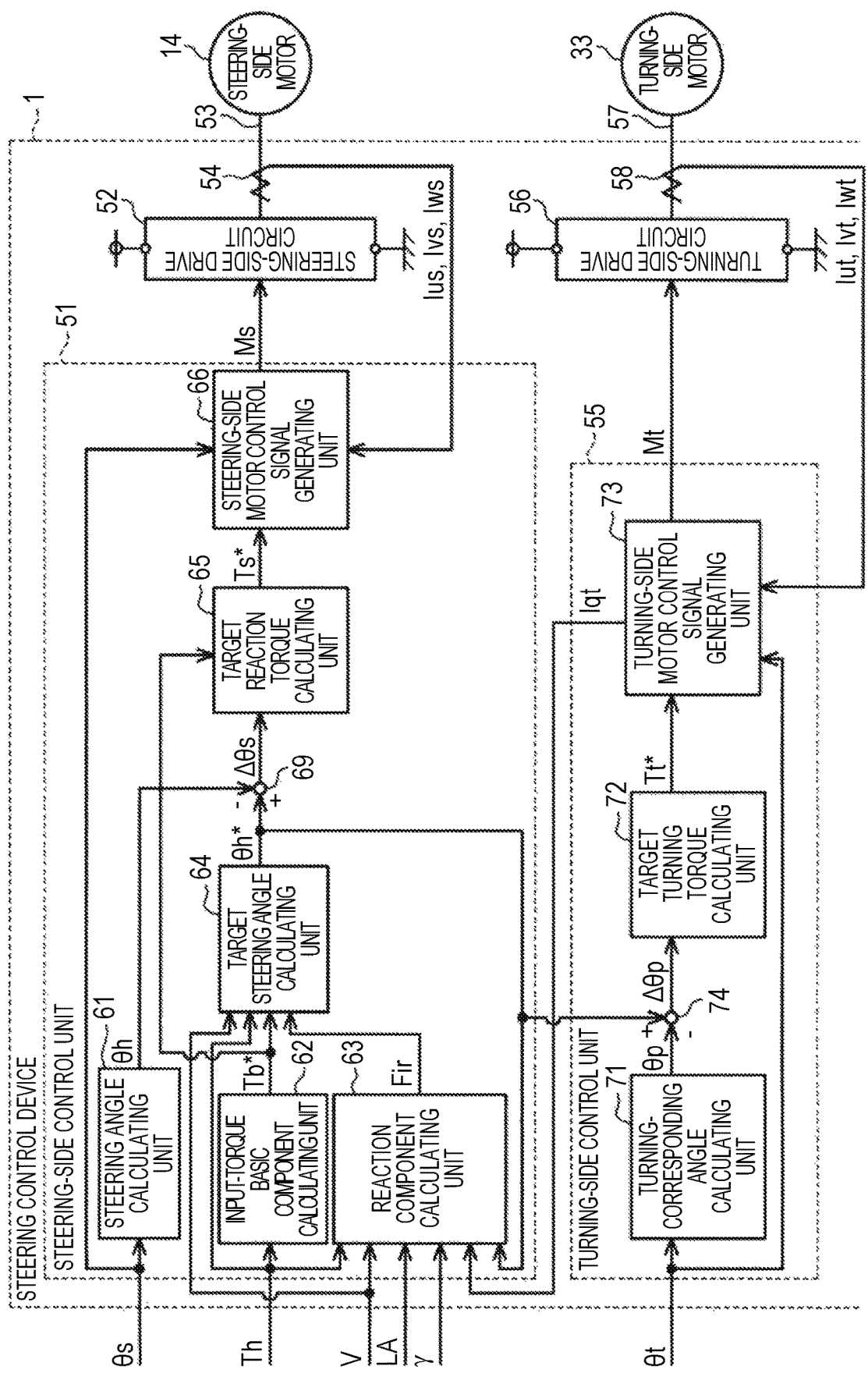
FIG. 14 is a block diagram of a steering control device according to the second embodiment.

The configuration of the steering control device 1 will be described below in detail. As illustrated in FIG. 14, the steering control device 1 includes a steering-side control unit 51 serving as a control unit that outputs a steering-side motor control signal Ms and a steering-side drive circuit 52 that supplies a drive power to a steering-side motor 14 based on the steering-side motor control signal Ms. Current sensors 54 that detect phase current values Ius, Ivs, and Iws of the steering-side motor 14 which flow in connection lines 53 between the steering-side drive circuit 52 and motor coils of phases of the steering-side motor 14 are connected to the steering-side control unit 51. In FIG. 14, for the purpose of convenience of description, the connection lines 53 of the phases and the current sensors 54 of the phases are collectively illustrated as being single. The same elements as the elements of the first embodiment illustrated in FIG. 2 will be referred to by the same reference numerals and signs and description thereof will not be repeated.

Figure 15:
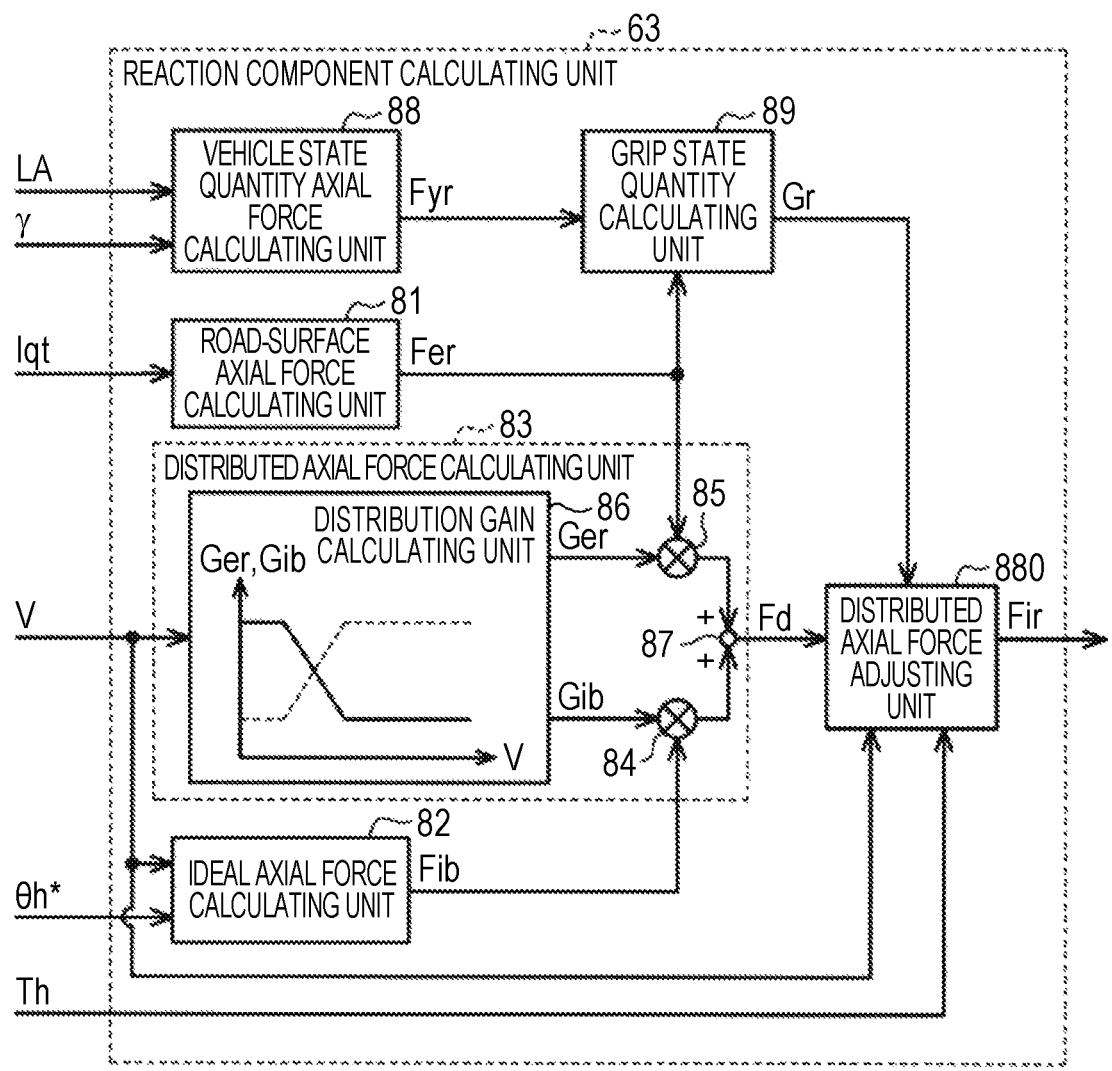
FIG. 15 is a block diagram of a reaction component calculating unit according to the second embodiment.

As illustrated in FIG. 15, the reaction component calculating unit 63 includes a road-surface axial force calculating unit 81 serving as an axial force calculating unit that calculates a road-surface axial force Fer and an ideal axial force calculating unit 82 serving as an axial force calculating unit that calculates an ideal axial force Fib. The road-surface axial force Fer and the ideal axial force Fib are calculated in the dimension of a torque (N·m). The reaction component calculating unit 63 includes a distributed axial force calculating unit 83 that calculates a distributed axial force Fd by employing (i.e., by summing) the ideal axial force Fib and the road-surface axial force Fer at predetermined proportions such that an axial force applied to the turning wheels 4 from a road surface (road surface information transmitted from the road surface) is reflected in the distributed axial force Fd. The same elements as the elements of the first embodiment illustrated in FIG. 3 will be referred to by the same reference numerals and signs and description thereof will not be repeated.

The distributed axial force calculating unit 83 multiplies the ideal axial force Fib by the distribution gain Gib using the multiplier 84, multiplies the road-surface axial force Fer by the distribution gain Ger using the multiplier 85, and sums the resultant values using the adder 87 to calculate the distributed axial force Fd. The calculated distributed axial force Fd is output to a distributed axial force adjusting unit 880 which will be described later.

Figure 16:
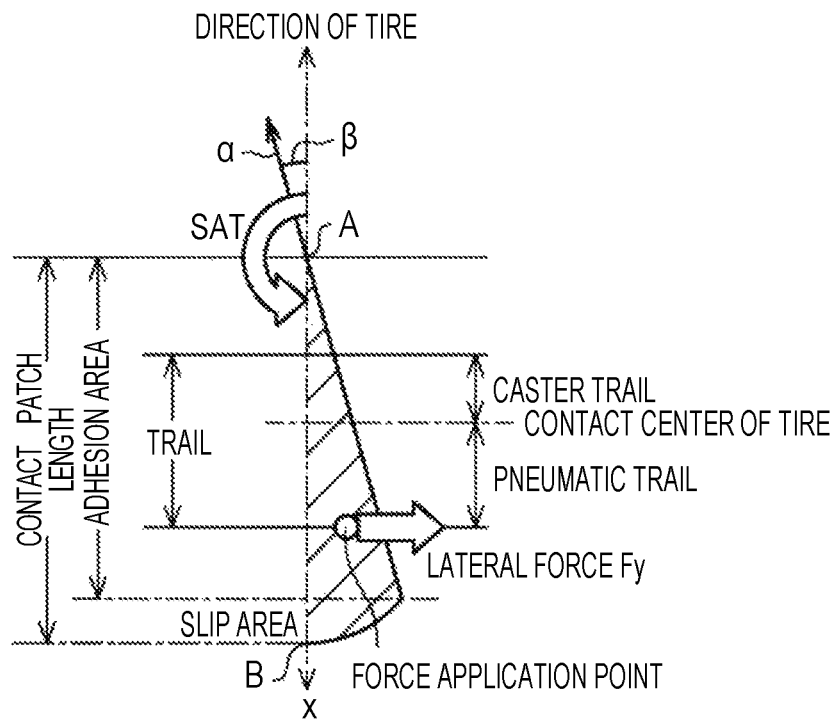
FIG. 16 is a diagram schematically illustrating a relationship between a lateral force acting on a force application point, a self-aligning torque, and a pneumatic trail.

FIG. 16 is a top view of a tread (contact patch) of a turning wheel with a slip angle β and corresponds to FIG. 4 according to the first embodiment, and thus description thereof will not be repeated.

Figure 17:
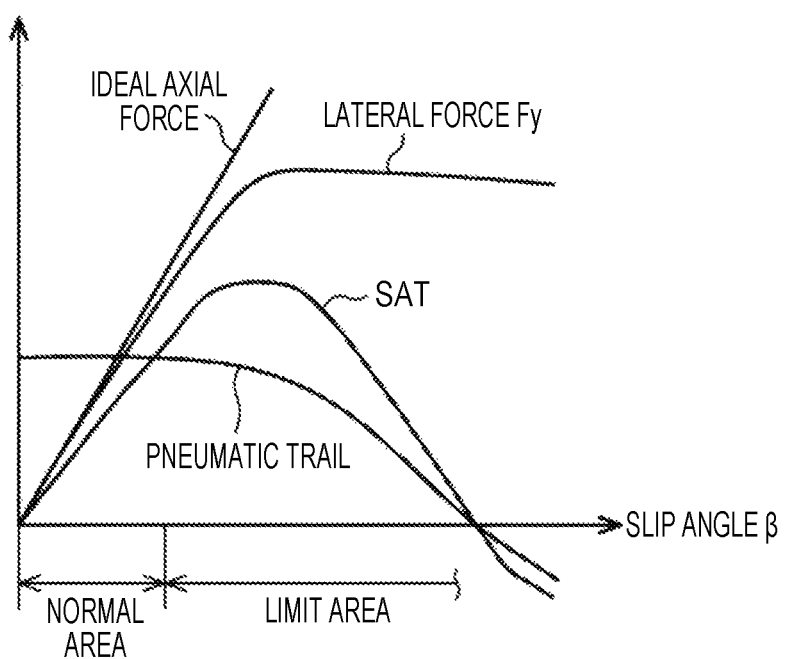
FIG. 17 is a graph illustrating changes of an ideal axial force, a lateral force (a vehicle state quantity axial force), a self-aligning torque (a road-surface axial force), and a pneumatic trail with respect to the change of a slip angle.

FIG. 17 illustrates changes of the ideal axial force Fib, the lateral force Fy (the vehicle state quantity axial force Fyr), the self-aligning torque SAT (the road-surface axial force Fer), and the pneumatic trail with respect to the change of the slip angle β and corresponds to FIG. 5 according to the first embodiment, and thus description thereof will not be repeated.

As illustrated in FIG. 15, the grip state quantity Gr which is calculated by the grip state quantity calculating unit 89 is output to the distributed axial force adjusting unit 880. The distributed axial force adjusting unit 880 calculates the reaction component Fir as the adjusted distributed axial force by adjusting the distributed axial force Fd input from the distributed axial force calculating unit 83 based on the grip state quantity Gr, the steering torque Th, and the vehicle speed V, and outputs the calculated reaction component Fir to the target steering angle calculating unit 64.

Figure 18:
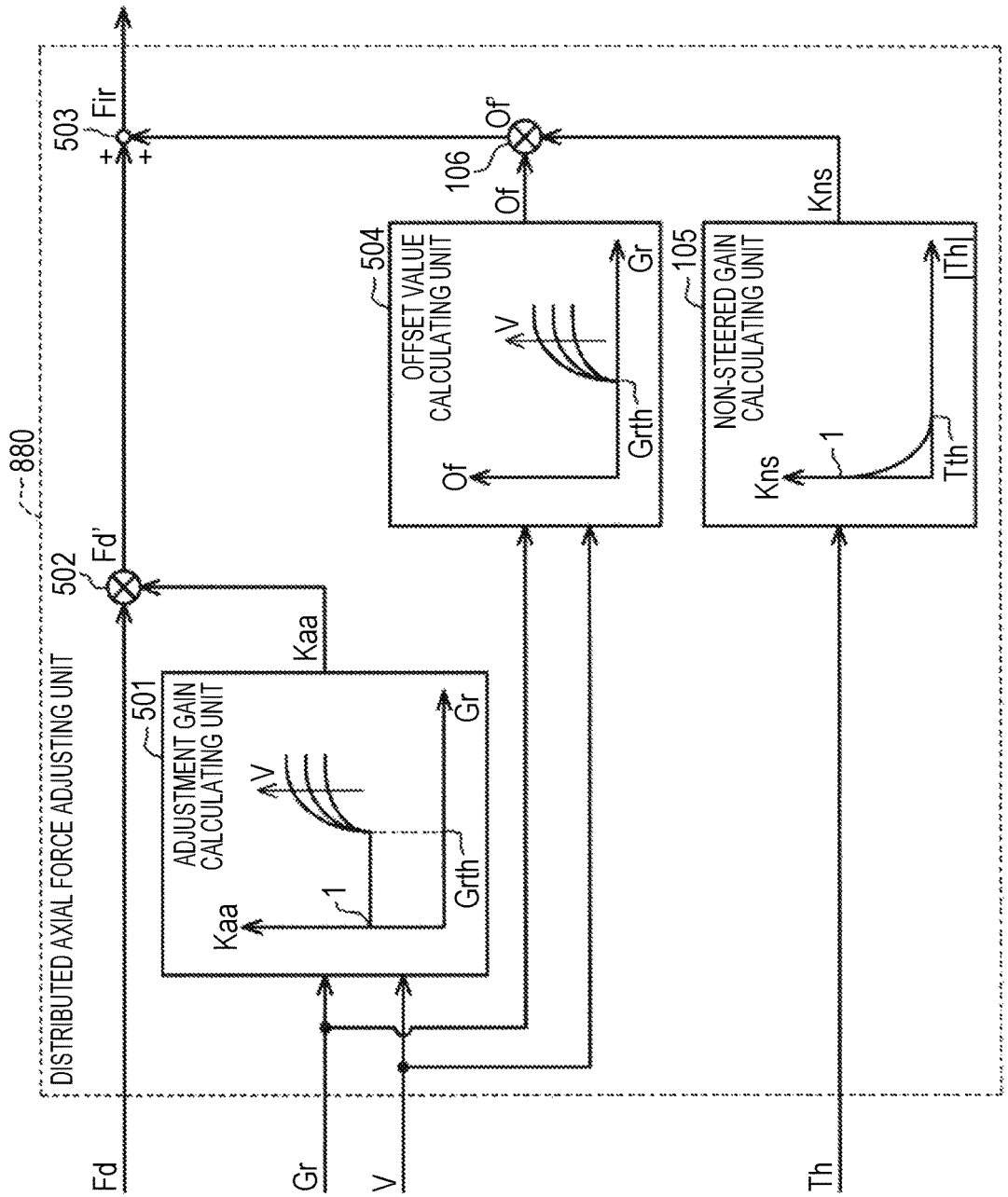
FIG. 18 is a block diagram of a distributed axial force adjusting unit according to the second embodiment.

The configuration of the distributed axial force adjusting unit 880 will be described below. As illustrated in FIG. 18, the distributed axial force adjusting unit 880 includes a distribution adjustment gain calculating unit 501. The grip state quantity Gr and the vehicle speed V are input to the distribution adjustment gain calculating unit 501. The distribution adjustment gain calculating unit 501 includes a map in which a relationship between the grip state quantity Gr and the vehicle speed V, and a distribution adjustment gain Kaa is defined, and calculates the distribution adjustment gain Kaa corresponding to the grip state quantity Gr and the vehicle speed V with reference to the map. This map is set such that the distribution adjustment gain Kaa is "1" in an area in which the grip state quantity Gr is equal to or less than a grip threshold value Grth and the distribution adjustment gain Kaa increases with the increase in the grip state quantity Gr when the grip state quantity Gr is greater than the grip threshold value Grth. The grip threshold value Grth is a value indicating the grip state quantity Gr at the slip angle β which is a boundary between the normal area and the limit area and is set in advance by experiment or the like. The map is set such that the distribution adjustment gain Kaa increases with the increase in the vehicle speed V in an area in which the grip state quantity Gr is greater than the grip threshold value Grth. The form of the map can be appropriately modified, and may be set such that the distribution adjustment gain Kaa decreases with the increase in the grip state quantity Gr in the area in which the grip state quantity Gr is greater than the grip threshold value Grth, and/or may be set such that the distribution adjustment gain Kaa decreases with the increase in the vehicle speed V in the area in which the grip state quantity Gr is greater than the grip threshold value Grth.

The calculated distribution adjustment gain Kaa along with the distributed axial force Fd is output to a multiplier 502. The distributed axial force adjusting unit 880 outputs a value obtained by causing the multiplier 502 to multiply the distributed axial force Fd by the distribution adjustment gain Kaa, as a gradient-adjusted distributed axial force Fd' to an adder 503. The distributed axial force adjusting unit 880 includes an offset value calculating unit 504 and a non-steered gain calculating unit 105.

The grip state quantity Gr and the vehicle speed V are input to the offset value calculating unit 504. The offset value calculating unit 504 includes a map in which a relationship between the grip state quantity Gr and the vehicle speed V, and an offset value Of is defined, and calculates the offset value Of corresponding to the grip state quantity Gr and the vehicle speed V with reference to the map. This map is set such that the offset value Of is "0" in an area in which the grip state quantity Gr is equal to or less than a grip threshold value Grth and the offset value Of increases with the increase in the grip state quantity Gr when the grip state quantity Gr is greater than the grip threshold value Grth. The map is set such that the offset value Of increases with the increase in the vehicle speed V in an area in which the grip state quantity Gr is greater than the grip threshold value Grth. The form of the map can be appropriately modified and, for example, may be set such that the offset value Of decreases (becomes negative) with the increase in the grip state quantity Gr in the area in which the grip state quantity Gr is greater than the grip threshold value Grth, and/or may be set such that the offset value Of decreases (becomes negative) with the increase in the vehicle speed V in the area in which the grip state quantity Gr is greater than the grip threshold value Grth. The calculated offset value Of is output to a multiplier 106.

The steering torque Th is input to the non-steered gain calculating unit 105. The non-steered gain calculating unit 105 includes a map in which a relationship between the steering torque Th and a non-steered gain Kns is defined, and calculates the non-steered gain Kns corresponding to the steering torque Th with reference to the map. This map is set such that the non-steered gain Kns is "1" when the absolute value of the steering torque Th is "0," the non-steered gain Kns decreases with an increase in the absolute value of the steering torque Th, and the non-steered gain Kns is "0" when the absolute value of the steering torque Th is greater than a non-steered threshold value Tth. The non-steered threshold value Tth is a value at which it is determined that a driver performs a steering operation and is set to a value close to zero in advance. The calculated non-steered gain Kns is output to the multiplier 106.

The distributed axial force adjusting unit 880 outputs an offset value Of' obtained by causing the multiplier 106 to multiply the offset value Of by the non-steered gain Kns to the adder 503. Then, the distributed axial force adjusting unit 880 calculates a value obtained by causing the adder 503 to add the offset value Of' to the gradient-adjusted distributed axial force Fd', as a reaction component Fir. Since the non-steered gain Kns is "0" when a driver performs a steering operation as described above, the offset value Of is added to adjust the distributed axial force Fd only in the non-steered state.

Change in a steering feeling due to adjustment of the distributed axial force Fd will be described below. For example, there is a case in which the reaction component Fir is adjusted to be less than the distributed axial force Fd based on the grip state quantity Gr in a situation in which the vehicle is traveling on a low-μ road surface and the slip angle β is likely to increase. In this case, a steering reaction force which is applied from the steering-side motor 14 to the steering wheel 11 can be set to be less than that in a normal state from the stage before the slip angle β increases to enter the limit area, and a driver can easily recognize road surface information indicating a low-μ because a so-called sense of release is generated.

On the other hand, in the same situation, there is a case in which the reaction component Fir is adjusted to be greater than the distributed axial force Fd based on the grip state quantity Gr. In this case, for example, since the steering reaction force applied from the steering-side motor 14 to the steering wheel 11 can be increased even when the slip angle β increases, a driver can continue to perform steering without feeling discomfort.

Operations and advantages of this embodiment will be described below. (1) The steering-side control unit 51 adjusts the distributed axial force Fd based on the grip state quantity Gr and changes the steering reaction force in consideration of the reaction component Fir that is the adjusted distributed axial force. Here, a steering feeling is basically realized (provided) by a sense of inertia, a sense of viscosity, and a sense of stiffness which are expressed by an inertia term, a viscosity term, and a spring term in an equation of motion representing a relationship between the input torque Tin* input to the steering system 2 and the turning angle. By adjusting the distributed axial force Fd corresponding to the spring term of the equation of motion based on the grip state quantity Gr as in this embodiment, it is possible to cause a driver to feel a sense of stiffness of a steering operation based on a grip state, as a response, and it is possible to provide a superior steering feeling.

(2) The distributed axial force adjusting unit 880 includes the distribution adjustment gain calculating unit 501 that calculates the distribution adjustment gain Kaa by which the distributed axial force Fd is multiplied, and adjusts the distributed axial force Fd by multiplying the distributed axial force Fd by the distribution adjustment gain Kaa. Since the distribution adjustment gain calculating unit 501 changes the distribution adjustment gain Kaa based on the grip state quantity Gr, it is possible to adjust a sense of stiffness of a steering operation based on a gradient of the reaction component Fir (the adjusted distributed axial force), that is, change of a spring constant of the spring term.

(3) Since the distribution adjustment gain calculating unit 501 changes the distribution adjustment gain Kaa according to the vehicle speed V, it is possible to cause a driver to feel a grip state which varies according to the vehicle speed V, as a response, through a sense of stiffness of a steering operation which is realized based on the distribution adjustment gain Kaa.

(4) The distributed axial force adjusting unit 880 includes the offset value calculating unit 504 that calculates the offset value Of by which the distributed axial force Fd is multiplied, and adjusts the distributed axial force Fd by adding the offset value Of to the distributed axial force Fd. Since the offset value calculating unit 504 changes the offset value Of based on the grip state quantity Gr, it is possible to cause a driver to feel a sense of stiffness of a steering operation based on the grip state quantity Gr, as a response, regardless of the spring constant of the spring term, and it is thus possible to provide a superior steering feeling.

(5) The distributed axial force adjusting unit 880 includes the non-steered gain calculating unit 105 that calculates the non-steered gain Kns by which the offset value Of is multiplied, and the non-steered gain calculating unit 105 calculates the non-steered gain Kns such that the offset value Of is greater than zero only in the non-steered state. Accordingly, since the offset value Of is added to the distributed axial force Fd to adjust the distributed axial force Fd in a state in which a driver does not actually steer the steering wheel 11, it is possible to adjust the steering velocity ωh of the steering wheel 11 at the time of return according to a grip state.

(6) Since the offset value calculating unit 504 changes the offset value Of according to the vehicle speed V, it is possible to cause a driver to feel a grip state which varies according to the vehicle speed V, as a response, through a sense of stiffness of a steering operation which is realized based on the offset value Of.

Hereinafter, a steering control device according to a third embodiment will be described with reference to the accompanying drawings. For the purpose of convenience of description, the same elements as the elements of the second embodiment will be referred to by the same reference numerals and signs and description thereof will not be repeated.

Figure 19:
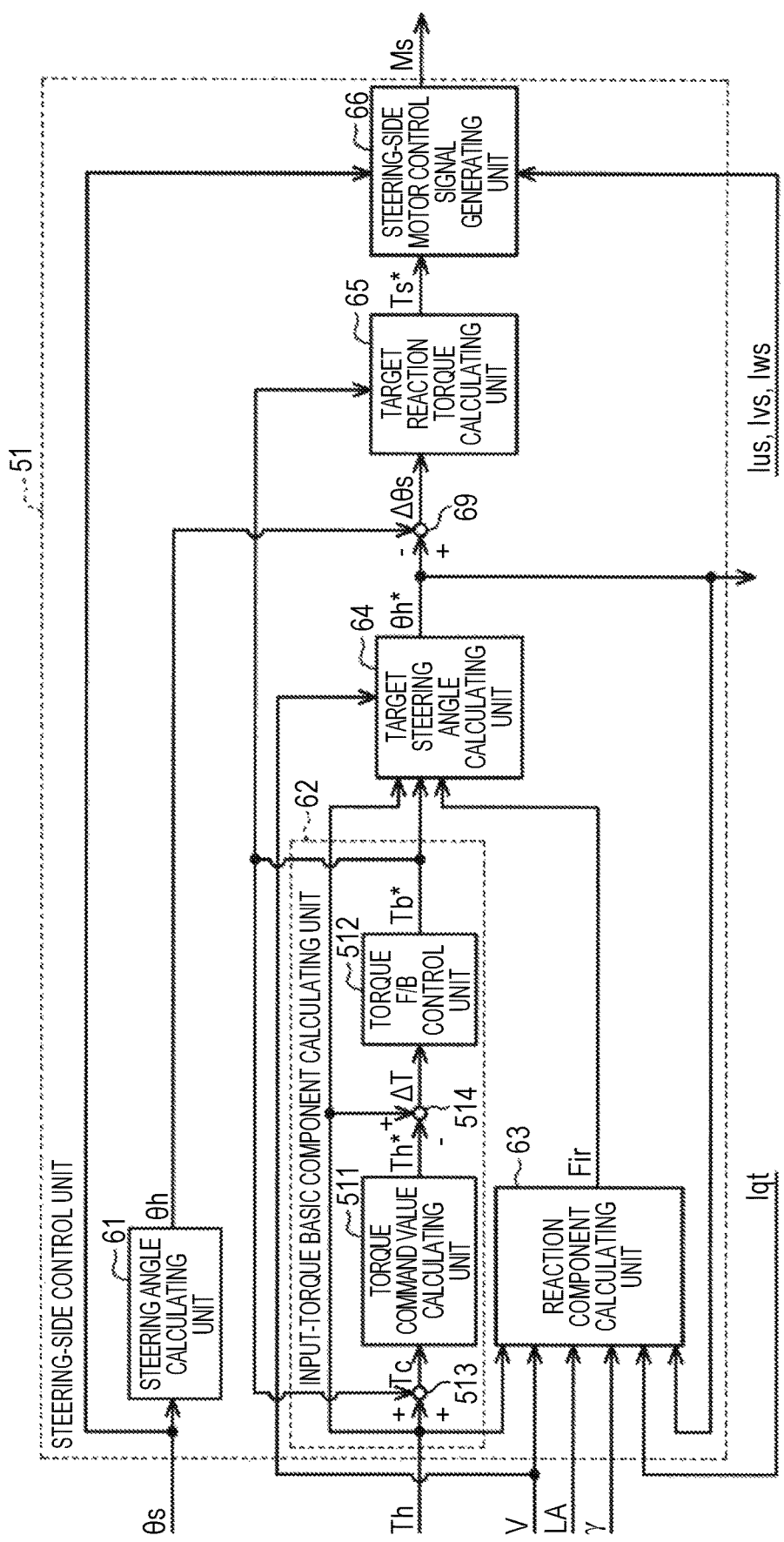
FIG. 19 is a block diagram of a steering-side control unit according to a third embodiment.

As illustrated in FIG. 19, an input-torque basic component calculating unit 62 according to this embodiment includes a torque command value calculating unit 511 that calculates a torque command value Th*, which is a target value of a steering torque Th to be input by a driver, in response to a drive torque Tc, and a torque feedback control unit (hereinafter referred to as a torque F/B control unit) 512 that executes torque feedback control.

Specifically, the drive torque Tc which is obtained by causing the adder 513 to add the input-torque basic component Tb* to the steering torque Th is input to the torque command value calculating unit 511. The torque command value calculating unit 511 calculates the torque command value Th* which has a greater absolute value as the absolute value of the drive torque Tc becomes larger.

A torque deviation ΔT which is obtained by causing the subtractor 514 to subtract the torque command value Th* from the steering torque Th is input to the torque F/B control unit 512. The torque F/B control unit 512 calculates an input-torque basic component Tb* as a controlled variable for feedback-controlling the steering torque Th to the torque command value Th*, based on the torque deviation ΔT. Specifically, the torque F/B control unit 512 calculates, as the input-torque basic component Tb*, the sum of output values of a proportional element, an integral element, and a differential element with the use of the torque deviation ΔT as an input.

The calculated input-torque basic component Tb* is output to the target reaction torque calculating unit 65 similarly to the second embodiment and is output to the adder 513. Accordingly, similarly to the second embodiment, the target steering angle calculating unit 64 calculates the target steering angle θh* and the target reaction torque calculating unit 65 calculates the target reaction torque Ts*.

The reaction component calculating unit 63 calculates a reaction component Fir (an adjusted distributed axial force) adjusted based on the grip state quantity Gr similarly to the second embodiment. Accordingly, the target steering angle θh* is changed and the target reaction torque Ts* is changed.

In this embodiment, the same operations and advantages as the operations and advantages of (1) to (6) in the second embodiment are achieved.

Hereinafter, a steering control device according to a fourth embodiment will be described with reference to the accompanying drawings. For the purpose of convenience of description, the same elements as the elements of the second embodiment will be referred to by the same reference numerals and signs and description thereof will not be repeated.

Figure 20:
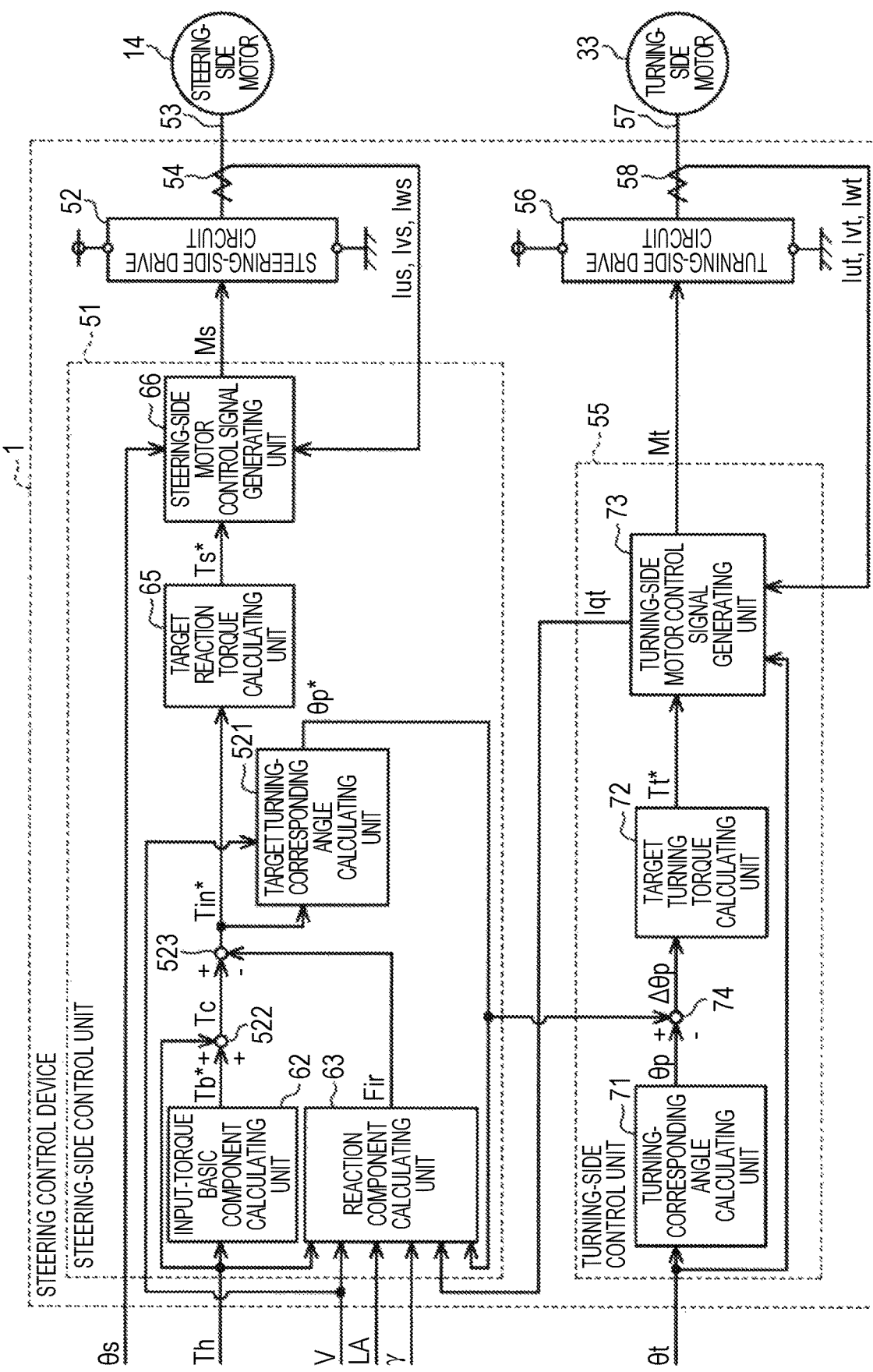
FIG. 20 is a block diagram of a steering control device according to a fourth embodiment.

As illustrated in FIG. 20, the steering-side control unit 51 according to this embodiment includes a target turning-corresponding angle calculating unit 521 that calculates a target turning-corresponding angle θp* which is a target value of the turning-corresponding angle θp which can be converted into the turning angle of the turning wheels 4, and does not include the target steering angle calculating unit 64.

The steering-side control unit 51 includes an adder 522 to which the input-torque basic component Tb* along with the steering torque Th is input, and calculates the drive torque Tc by causing the adder 522 to sum the input values. The steering-side control unit 51 includes a subtractor 523 to which the reaction component Fir along with the drive torque Tc is input, and calculates an input torque Tin* by causing the subtractor 523 to subtract the reaction component Fir from the drive torque Tc. The calculated input torque Tin* is output to the target reaction torque calculating unit 65 and the target turning-corresponding angle calculating unit 521. The target reaction torque calculating unit 65 calculates the target reaction torque Ts*, which is a target value of the steering reaction force applied from the steering-side motor 14, based on the input torque Tin*. Specifically, the target reaction torque calculating unit 65 calculates the target reaction torque Ts* which has a greater absolute value as the input torque Tin* becomes larger.

The input torque Tin* and the vehicle speed V are input to the target turning-corresponding angle calculating unit 521. The target turning-corresponding angle calculating unit 521 calculates the target turning-corresponding angle θp* through the same calculation process as the calculation process by which the target steering angle calculating unit 64 of the second embodiment calculates the target steering angle θh*. The calculated target turning-corresponding angle θp* is the same value as the target steering angle θh* in the second embodiment and is output to the turning-side control unit 55 and the reaction component calculating unit 63.

The reaction component calculating unit 63 calculates a reaction component Fir (an adjusted distributed axial force) adjusted based on the grip state quantity Gr similarly to the second embodiment. The reaction component Fir serving as a basis of the input torque Tin* is changed based on the grip state quantity Gr. Accordingly, the target reaction torque Ts* based on the input torque Tin* is changed according to the grip state.

In this embodiment, the same operations and advantages as the operations and advantages of (1) to (6) in the second embodiment are achieved.

Hereinafter, a steering control device according to a fifth embodiment will be described with reference to the accompanying drawings. For the purpose of convenience of description, the same elements as the elements of the fourth embodiment will be referred to by the same reference numerals and signs and description thereof will not be repeated.

Figure 21:
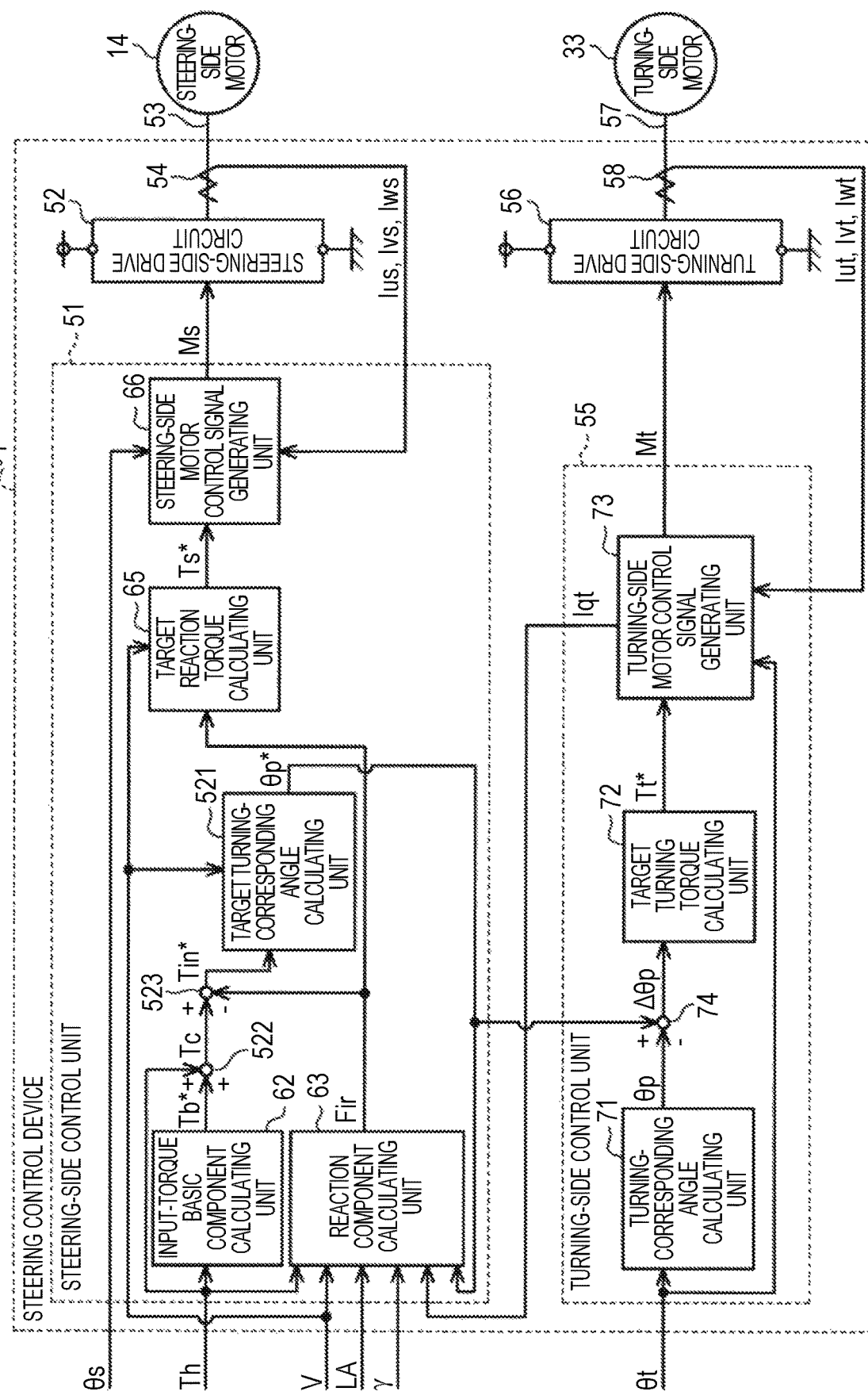
FIG. 21 is a block diagram of a steering control device according to a fifth embodiment.

As illustrated in FIG. 21, a reaction component Fir and a vehicle speed V are input to the target reaction torque calculating unit 65 according to this embodiment. The target reaction torque calculating unit 65 calculates a target reaction torque Ts* which has a greater absolute value as the absolute value of the reaction component Fir becomes larger and the vehicle speed V becomes higher.

The reaction component calculating unit 63 calculates a reaction component Fir (an adjusted distributed axial force) adjusted based on the grip state quantity Gr similarly to the second embodiment. Accordingly, the target reaction torque Ts* is changed.

In this embodiment, the same operations and advantages as the operations and advantages of (1) to (6) in the second embodiment are achieved. This embodiment can be modified as follows. This embodiment and the following modified examples can be combined with each other as long as they are not contradictory to each other.

In the fourth and fifth embodiments, the target turning-corresponding angle θp* is calculated based on the input torque Tin*, but the disclosure is not limited thereto and the target turning-corresponding angle θp* may be calculated, for example, based on another parameter such as a steering angle θh.

In the second to fifth embodiments, the distributed axial force adjusting unit 880 may not include the non-steered gain Kns. In the above-mentioned embodiments, the non-steered gain calculating unit 105 calculates the non-steered gain Kns based on the steering torque Th (a torsion bar torque) which is detected by the torque sensor 42. However, the disclosure is not limited thereto and the non-steered gain Kns may be calculated based on a torque (an estimated steering torque) which is applied to the steering wheel 11 by a driver. The estimated steering torque can be detected by, for example, a sensor which is provided in the steering wheel 11 or can be calculated from the steering torque Th by calculation.

In the second to fifth embodiments, in the manner in which the distributed axial force adjusting unit 880 adjusts the distributed axial force Fd, the distributed axial force Fd may be multiplied by only the distribution adjustment gain Kaa or be multiplied by only the offset value Of, and the form can be appropriately modified.

In the second to fifth embodiments, the distribution adjustment gain Kaa may not be changed according to the vehicle speed V and may be set to be constant. Similarly, the offset value Of may not be changed according to the vehicle speed V and may be set to be constant. In the embodiments, a degree of grip which is obtained by dividing the road-surface axial force Fer by the vehicle state quantity axial force Fyr is defined as the grip state quantity Gr, but the disclosure is not limited thereto and, for example, a degree of grip loss (a value indicating to what degree the grip of the turning wheels 4 is lost) which is obtained by subtracting the vehicle state quantity axial force Fyr from the road-surface axial force Fer may be defined as the grip state quantity Gr.

In the second to fifth embodiments, the grip state quantity Gr is calculated based on the road-surface axial force Fer and the vehicle state quantity axial force Fyr. However, the disclosure is not limited thereto. Since the grip state quantity Gr can be calculated based on a plurality of kinds of axial forces, the grip state quantity Gr may be calculated, for example, based on the road-surface axial force Fer and the ideal axial force Fib or based on the road-surface axial force Fer, the ideal axial force Fib, and the vehicle state quantity axial force Fyr. An axial force other than the ideal axial force Fib, the road-surface axial force Fer, and the vehicle state quantity axial force Fyr may be calculated and the calculated axial force may be used to calculate the grip state quantity Gr.

In the second to fifth embodiments, the road-surface axial force Fer is calculated based on the q-axis current value Iqt, but the disclosure is not limited thereto and, for example, a pressure sensor or the like that can detect an axial force may be provided in the rack shaft 22 and a detection result thereof may be used as the road-surface axial force Fer.

In the second to fifth embodiments, the ideal axial force Fib is calculated based on the target steering angle θh* (the target turning-corresponding angle) and the vehicle speed V, but the disclosure is not limited thereto and the ideal axial force Fib may be calculated based on only the target steering angle θh* (the target turning-corresponding angle) or may be calculated based on the turning-corresponding angle θp. For example, the ideal axial force Fib may be calculated using another method in consideration of another parameter such as the steering torque Th or the vehicle speed V.

In the second to fifth embodiments, the distributed axial force Fd is calculated by employing (i.e., by summing) the ideal axial force Fib and the road-surface axial force Fer at predetermined proportions, but the disclosure is not limited thereto. For example, the distributed axial force Fd may be calculated by employing (i.e., by summing) the ideal axial force Fib and the vehicle state quantity axial force Fyr at predetermined proportions. The mode for calculating the distributed axial force Fd can be appropriately changed.

In the second to fifth embodiments, the distributed axial force calculating unit 83 may calculate the distribution gains Gib and Ger in consideration of a parameter other than the vehicle speed V. For example, in a vehicle in which a drive mode indicating a set state of a control pattern for an in-vehicle engine or the like can be selected out of a plurality of drive modes, the selected drive mode may be used as a parameter for setting the distribution gains Gib and Ger. In this case, the distributed axial force calculating unit 83 may include a plurality of maps for the drive modes, the plurality maps having different tendencies with respect to the vehicle speed V, and the distribution gains Gib and Ger may be calculated with reference to the maps.

In the second to fifth embodiments, the reaction component calculating unit 63 calculates the adjusted distributed axial force as the reaction component Fir, but the disclosure is not limited thereto. For example, a value obtained by reflecting another reaction force in the adjusted axial force may be calculated as the reaction component Fir. For example, an end reaction force, which is a reaction force resisting a further turning operation of the steering wheel 11 when the absolute value of the steering angle θh of the steering wheel 11 approaches a steering angle threshold value, may be employed as such a reaction force. For example, it is possible to use, as the steering angle threshold value, the turning-corresponding angle θp at a virtual-rack-end vicinity position which is located closer to the neutral position by a predetermined angle than a virtual rack end position which is set closer to the neutral position than a mechanical rack end position at which movement of the rack shaft 22 in the axial direction is restricted by causing the rack end 25 to come into contact with the rack housing 23. The steering angle θh at a rotation end position of the steering wheel 11 may be used as the steering angle threshold value.

In the second and third embodiments, the target reaction torque calculating unit 65 calculates the target reaction torque Ts* by adding the input-torque basic component Tb* to the basic reaction torque, but the disclosure is not limited thereto and, for example, the basic reaction torque may be calculated as the target reaction torque Ts* without adding the input-torque basic component Tb* thereto.

Figure 22:
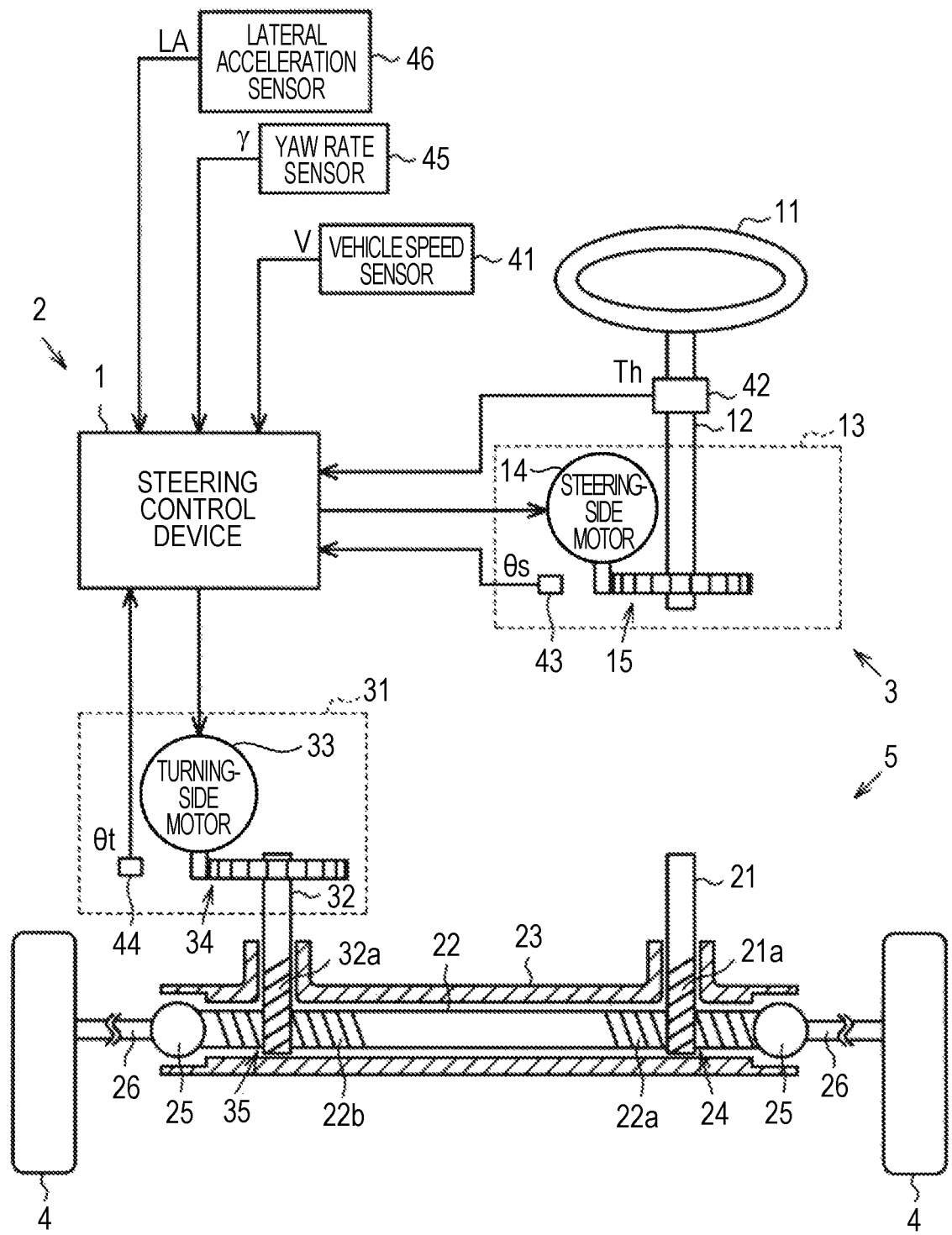
FIG. 22 is a diagram schematically illustrating a configuration of a steer-by-wire steering system according to a sixth embodiment.

Hereinafter, a steering control device according to a sixth embodiment will be described with reference to the accompanying drawings. As illustrated in FIG. 22, a steer-by-wire steering system 2 which is a control object of a steering control device 1 includes a steering unit 3 that is steered by a driver and a turning unit 5 that turns turning wheels 4 according to a driver's steering of the steering unit 3. The same elements as the elements according to the first embodiment illustrated in FIG. 1 will be referred to by the same reference numerals and signs and description thereof will not be repeated.

Figure 23:
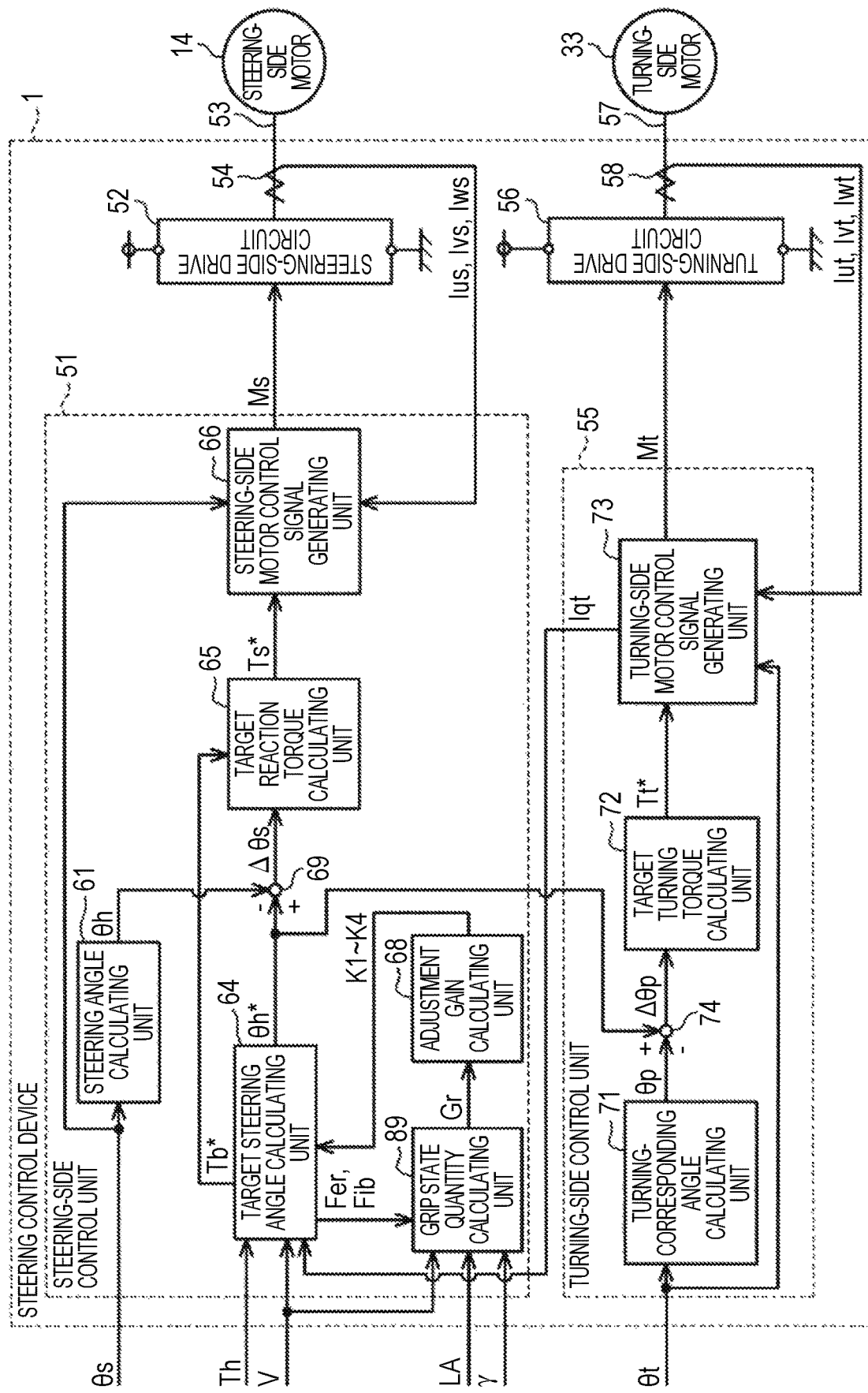
FIG. 23 is a block diagram of a steering control device according to the sixth embodiment.

The configuration of the steering control device 1 will be described below in detail. As illustrated in FIG. 23, the steering control device 1 includes a steering-side control unit 51 serving as a control unit that outputs a steering-side motor control signal Ms and a steering-side drive circuit 52 that supplies a drive power to the steering-side motor 14 based on the steering-side motor control signal Ms. The same elements as the elements according to the first embodiment illustrated in FIG. 2 will be referred to by the same reference numerals and signs and description thereof will not be repeated.

The steering-side control unit 51 includes a steering angle calculating unit 61 that calculates a steering angle θh of the steering wheel 11 based on the rotation angle θs of the steering-side motor 14 and a target steering angle calculating unit 64 that calculates a target steering angle θh* based on the steering torque Th. The steering-side control unit 51 further includes a target reaction torque calculating unit 65 that calculates a target reaction torque Ts* based on the steering angle θh and the target steering angle θh* and a steering-side motor control signal generating unit 66 that generates the steering-side motor control signal Ms based on the target reaction torque Ts*. The steering-side control unit 51 further includes a grip state quantity calculating unit 89 that calculates a grip state quantity Gr and an adjustment gain calculating unit 68 that changes first to fourth adjustment gains K1 to K4 according to the grip state quantity Gr.

The steering angle calculating unit 61 converts the input rotation angle θs into an absolute angle in a range greater than 360°, for example, by counting the number of turns of the steering-side motor 14 from the steering neutral position and thus acquires the rotation angle. The steering angle calculating unit 61 calculates the steering angle θh by multiplying the rotation angle, which has been obtained by conversion into the absolute angle, by a conversion factor Ks based on the rotation speed ratio of the steering-side reduction gear 15.

The vehicle speed V, the steering torque Th, the first to fourth adjustment gains K1 to K4, and the q-axis current value Iqt of the turning-side motor 33 are input to the target steering angle calculating unit 64. The target steering angle calculating unit 64 calculates the target steering angle θh* based on the input state quantities as will be described later and outputs the calculated target steering angle θh* to a subtractor 69 and the turning-side control unit 55.

An angle deviation Δθs obtained by causing the subtractor 69 to subtract the steering angle θh from the target steering angle θh*, and the input-torque basic component Tb* output from the target steering angle calculating unit 64 which will be described later are input to the target reaction torque calculating unit 65. The target reaction torque calculating unit 65 calculates a basic reaction torque, which is a basis of a steering reaction force applied by the steering-side motor 14, as a controlled variable for feedback-controlling the steering angle θh to the target steering angle θh*, based on the angle deviation Δθs, and calculates the target reaction torque Ts* by adding the input-torque basic component Tb* to the basic reaction torque. Specifically, the target reaction torque calculating unit 65 calculates, as the basic reaction torque, the sum of output values of a proportional element, an integral element, and a differential element with the use of the angle deviation Δθs.

The rotation angle θs and the phase current values Ius, Ivs, and Iws in addition to the target reaction torque Ts* are input to the steering-side motor control signal generating unit 66. The steering-side motor control signal generating unit 66 in this embodiment calculates a q-axis target current value Iqs* on the q axis in a d/q coordinate system based on the target reaction torque Ts*. In this embodiment, a d-axis target current value Ids* on the d axis is set to zero.

The steering-side motor control signal generating unit 66 generates (calculates) the steering-side motor control signal Ms which is output to the steering-side drive circuit 52 by executing current feedback control in the d/q coordinate system. Specifically, the steering-side motor control signal generating unit 66 calculates a d-axis current value Ids and a q-axis current value Iqs which are actual current values of the steering-side motor 14 in the d/q coordinate system by mapping the phase current values Ius, Ivs, and Iws onto the d/q coordinates based on the rotation angle θs. Then, the steering-side motor control signal generating unit 66 calculates a voltage command value based on the current deviations on the d axis and the q axis such that the d-axis current value Ids matches the d-axis target current value Ids* and such that the q-axis current value Iqs matches the q-axis target current value Iqs*, and generates the steering-side motor control signal Ms having a duty ratio based on the voltage command value. By outputting the calculated steering-side motor control signal Ms to the steering-side drive circuit 52, a drive power corresponding to the steering-side motor control signal Ms is output to the steering-side motor 14 and the operation thereof is controlled.

The turning-side control unit 55 will be described below. The rotation angle θt, the target steering angle θh*, and the phase current values Iut, Ivt, and Iwt of the turning-side motor 33 are input to the turning-side control unit 55. Then, the turning-side control unit 55 generates the turning-side motor control signal Mt based on these state quantities and outputs the generated turning-side motor control signal Mt.

Specifically, the turning-side control unit 55 includes a turning-corresponding angle calculating unit 71 that calculates a turning-corresponding angle θp corresponding to a rotation angle (a pinion angle) of the first pinion shaft 21 serving as a rotation shaft whose rotation angle can be converted into a turning angle of the turning wheels 4. The turning-side control unit 55 further includes a target turning torque calculating unit 72 that calculates a target turning torque Tt* based on the turning-corresponding angle θp and the target steering angle θh* and a turning-side motor control signal generating unit 73 that generates the turning-side motor control signal Mt based on the target turning torque Tt*. In the steering system 2 according to this embodiment, a steering angle ratio which is a ratio of the steering angle θh and the turning-corresponding angle θp is set to be constant and a target turning-corresponding angle is the same as the target steering angle θh*.

The turning-corresponding angle calculating unit 71 converts an input rotation angle θt into an absolute value in a range greater than 360°, for example, by counting the number of turns of the turning-side motor 33 from the steering neutral position at which the vehicle travels straight, and thus acquires the rotation angle. The turning-corresponding angle calculating unit 71 calculates the turning-corresponding angle θp by multiplying the rotation angle, which has been obtained by conversion into the absolute angle, by a conversion factor Kt based on a rotation speed ratio of the turning-side reduction gear 34 and a rotation speed ratio of the first and second rack and pinion mechanisms 24 and 35. That is, the turning-corresponding angle θp corresponds to the steering angle θh of the steering wheel 11 when the first pinion shaft 21 is assumed to be connected to the steering shaft 12.

An angle deviation Δθp obtained by causing the subtractor 74 to subtract the turning-corresponding angle θp from the target steering angle θh* (the target turning-corresponding angle) is input to the target turning torque calculating unit 72. Then, the target turning torque calculating unit 72 calculates a target turning torque Tt*, which is a target value of a turning force given by the turning-side motor 33, as a controlled variable for feedback-controlling the turning-corresponding angle θp to the target steering angle θh*, based on the angle deviation Δθp. Specifically, the target turning torque calculating unit 72 calculates the sum of output values of a proportional element, an integral element, and a differential element with the angle deviation Δθp as an input as the target turning torque Tt*.

The rotation angle θt and the phase current values Iut, Ivt, and Iwt in addition to the target turning torque Tt* are input to the turning-side motor control signal generating unit 73. The turning-side motor control signal generating unit 73 calculates a q-axis target current value Iqt* on the q axis in the d/q coordinate system based on the target turning torque Tt*. In this embodiment, a d-axis target current value Idt* on the d axis is set to zero.

The turning-side motor control signal generating unit 73 generates (calculates) the turning-side motor control signal Mt which is output to the turning-side drive circuit 56 by executing current feedback control in the d/q coordinate system. Specifically, the turning-side motor control signal generating unit 73 calculates a d-axis current value Idt and a q-axis current value Iqt which are actual current values of the turning-side motor 33 in the d/q coordinate system by mapping the phase current values Iut, Ivt, and Iwt onto the d/q coordinates based on the rotation angle θt. Then, the turning-side motor control signal generating unit 73 calculates a voltage command value based on the current deviations on the d axis and the q axis such that the d-axis current value Idt matches the d-axis target current value Idt* and such that the q-axis current value Iqt matches the q-axis target current value Iqt*, and generates the turning-side motor control signal Mt having a duty ratio based on the voltage command value. By outputting the calculated turning-side motor control signal Mt to the turning-side drive circuit 56, a drive power corresponding to the turning-side motor control signal Mt is output to the turning-side motor 33 and the operation thereof is controlled. The q-axis current value Iqt which is calculated in the process of generating the turning-side motor control signal Mt is output to the target steering angle calculating unit 64.

Figure 24:
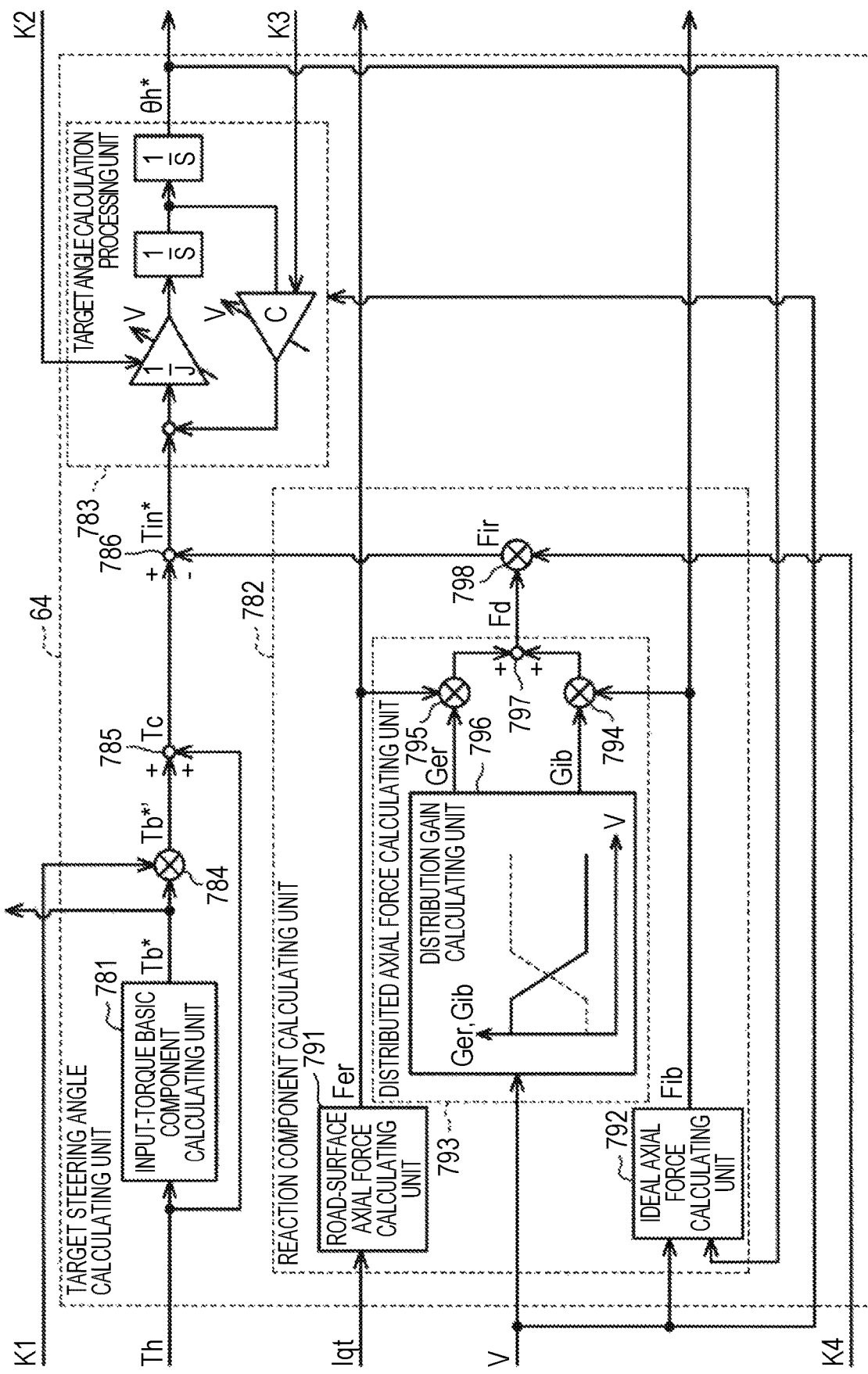
FIG. 24 is a block diagram of a target steering angle calculating unit according to the sixth embodiment.

The configuration of the target steering angle calculating unit 64 will be described below. As illustrated in FIG. 24, the target steering angle calculating unit 64 includes an input-torque basic component calculating unit 781 that calculates an input-torque basic component Tb* which is a force for rotating the steering wheel 11 and a reaction component calculating unit 782 that calculates a reaction component Fir which is a force resisting rotation of the steering wheel 11. The target steering angle calculating unit 64 further includes a target angle calculation processing unit 783 that calculates a target steering angle θh* based on the steering torque Th, the input-torque basic component Tb*, and the reaction component Fir.

The steering torque Th is input to the input-torque basic component calculating unit 781. The input-torque basic component calculating unit 781 calculates an input-torque basic component (a reaction-force basic component) Tb* which has a larger absolute value as the absolute value of the steering torque Th becomes larger and outputs the calculated input-torque basic component Tb* to a multiplier 784 and the target reaction torque calculating unit 65. The multiplier 784 calculates an input-torque basic component Tb*' by multiplying the input-torque basic component Tb* by the first adjustment gain K1 which is output from the adjustment gain calculating unit 68 which will be described later. The input-torque basic component Tb*' along with the steering torque Th is input to an adder 785. The adder 785 calculates a drive torque Tc by adding the steering torque Th to the input-torque basic component Tb*' and outputs the calculated drive torque Tc to a subtractor 786. The reaction component Fir which is calculated by the reaction component calculating unit 782 which will be described later, in addition to the drive torque Tc, is input to the subtractor 786. The subtractor 786 calculates an input torque Tin* by subtracting the reaction component Fir from the drive torque Tc.

The input torque Tin*, the vehicle speed V, and the second and third adjustment gains K2 and K3 are input to the target angle calculation processing unit 783. The target angle calculation processing unit 783 in this embodiment calculates the target steering angle θh* using a model (a steering model) formula of Equation (5) for correlating the input torque Tin* with the target steering angle θh*.

$$Tin^* = K3 \cdot C \cdot \theta h^{*\prime} + (J/K2) \cdot \theta h^{*\prime\prime} \quad (5)$$

This model formula defines and represents a relationship between a torque of a rotation shaft that rotates due to rotation of the steering wheel 11 and the rotation angle of the rotation shaft in a structure in which the steering wheel 11 (the steering unit 3) and the turning wheels 4 (the turning unit 5) are mechanically connected to each other. This model formula is expressed using a viscosity coefficient C modeling friction and the like of the steering system 2 and an inertia coefficient J modeling the inertia of the steering system 2. The viscosity coefficient C and the inertia coefficient J are set to vary depending on the vehicle speed V. The second and third adjustment gains K2 and K3 are output from the adjustment gain calculating unit 68 which will be described later. The target steering angle θh* which is calculated using the model formula is output to the reaction component calculating unit 782 in addition to the subtractor 69 and the turning-side control unit 55 (see FIG. 23).

The configuration of the reaction component calculating unit 782 will be described below. The vehicle speed V, the target steering angle θh*, the phase current values Iut, Ivt, and Iwt which are actual current values of the turning-side motor 33, and the fourth adjustment gain K4 are input to the reaction component calculating unit 782. The reaction component calculating unit 782 calculates a reaction component Fir (a basic reaction force) corresponding to an axial force acting on the rack shaft 22 based on the input state quantities and outputs the calculated reaction component Fir to the subtractor 786.

The reaction component calculating unit 782 includes a road-surface axial force calculating unit 791 that calculates a road-surface axial force Fer and an ideal axial force calculating unit 792 that calculates an ideal axial force Fib. The road-surface axial force Fer and the ideal axial force Fib are calculated in the dimension of a torque (N·m). The reaction component calculating unit 782 includes a distributed axial force calculating unit 793 that calculates a distributed axial force Fd by employing (i.e., by summing) the ideal axial force Fib and the road-surface axial force Fer at predetermined proportions such that an axial force applied to the turning wheels 4 from the road surface (road surface information which is transmitted from the road surface) is reflected in the distributed axial force Fd.

The target steering angle θh* (the target turning-corresponding angle) and the vehicle speed V are input to the ideal axial force calculating unit 792. The ideal axial force calculating unit 792 calculates the ideal axial force Fib which is an ideal value of the axial force applied to the turning wheels 4 (a force transmitted to the turning wheels 4) and in which road surface information is not reflected, based on the target steering angle θh*. Specifically, the ideal axial force calculating unit 792 calculates the ideal axial force Fib such that the absolute value thereof increases as the absolute value of the target steering angle θh* increases. The ideal axial force calculating unit 792 calculates the ideal axial force Fib such that the absolute value thereof increases as the vehicle speed V increases. The calculated ideal axial force Fib is output to a multiplier 794 and the grip state quantity calculating unit 89 which will be described later.

The q-axis current value Iqt of the turning-side motor 33 is input to the road-surface axial force calculating unit 791. The road-surface axial force calculating unit 791 calculates the road-surface axial force Fer which is an estimated value of the axial force applied to the turning wheels 4 (a force transmitted to the turning wheels 4) and in which road surface information is reflected, based on the q-axis current value Iqt. Specifically, the road-surface axial force calculating unit 791 calculates the road-surface axial force Fer such that the absolute value thereof increases as the absolute value of the q-axis current value Iqt increases on the assumption that the torque applied to the rack shaft 22 from the turning-side motor 33 and the torque corresponding to the force applied to the turning wheels 4 from the road surface match each other. The calculated road-surface axial force Fer is output to a multiplier 795 and the grip state quantity calculating unit 89 which will be described later.

The road-surface axial force Fer and the ideal axial force Fib in addition to the vehicle speed V are input to the distributed axial force calculating unit 793. The distributed axial force calculating unit 793 includes a distribution gain calculating unit 796 that calculates a distribution gain Gib and a distribution gain Ger which are distribution proportions at which the distributed axial force is distributed to the ideal axial force Fib and the road-surface axial force Fer, based on the vehicle speed V. The distribution gain calculating unit 796 in this embodiment includes a map in which a relationship between the vehicle speed V and the distribution gains Gib and Ger is defined and calculates the distribution gains Gib and Ger corresponding to the vehicle speed V with reference to the map. The distribution gain Gib has a value which is less when the vehicle speed V is high than when the vehicle speed V is low, and the distribution gain Ger has a value which is greater when the vehicle speed V is high than when the vehicle speed V is low. In this embodiment, the values of the distribution gains Gib and Ger are set such that the sum thereof becomes "1." The calculated distribution gain Gib is output to the multiplier 794 and the calculated distribution gain Ger is output to the multiplier 795.

The distributed axial force calculating unit 793 multiplies the ideal axial force Fib by the distribution gain Gib using the multiplier 794, multiplies the road-surface axial force Fer by the distribution gain Ger using the multiplier 795, and sums the resultant values using the adder 797 to calculate the distributed axial force Fd. The reaction component calculating unit 782 calculates a value obtained by causing the multiplier 798 to multiply the distributed axial force Fd by the fourth adjustment gain K4 which will be described later, as a reaction component Fir, and outputs the calculated reaction component Fir to the subtractor 786.

The grip state quantity calculating unit 89 will be described below. As illustrated in FIG. 23, the ideal axial force Fib, the road-surface axial force Fer, the vehicle speed V, the yaw rate γ, and the lateral acceleration LA are input to the grip state quantity calculating unit 89. The grip state quantity calculating unit 89 calculates a grip state quantity Gr based on the input state quantities.

Figure 25:
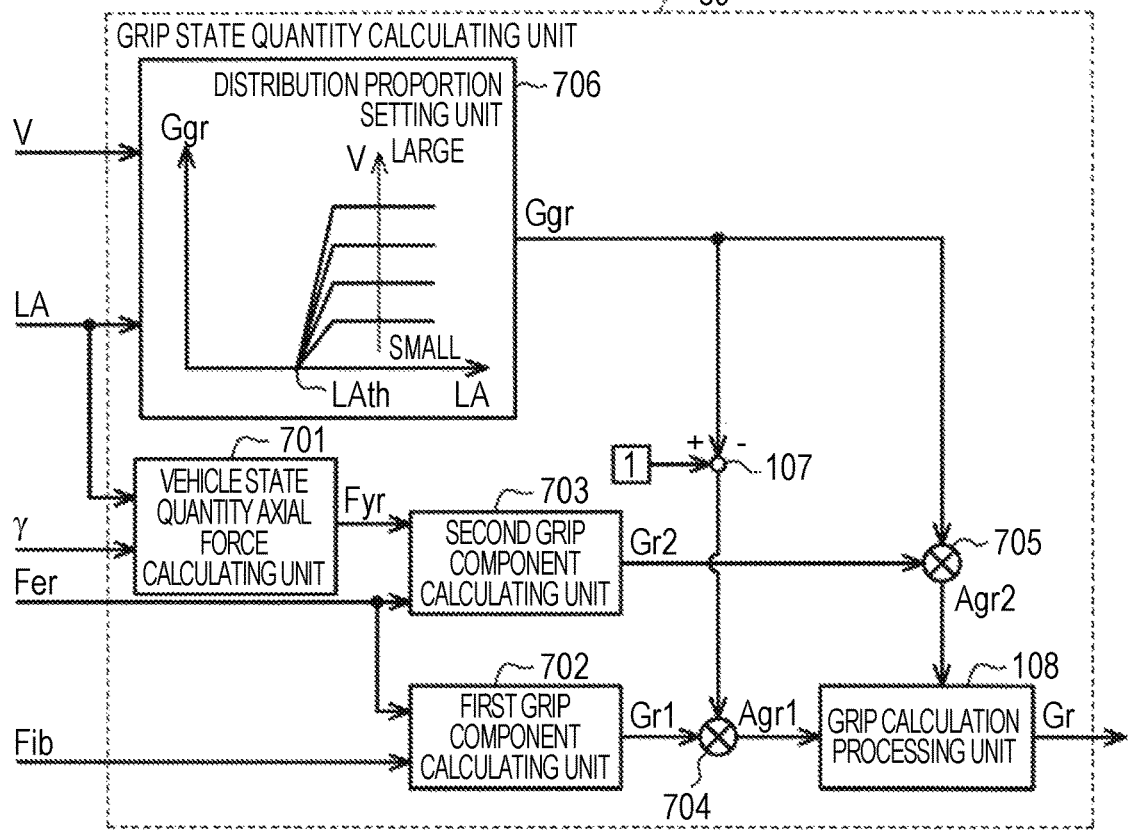
FIG. 25 is a block diagram of a grip state quantity calculating unit according to the sixth embodiment.

Specifically, as illustrated in FIG. 25, the grip state quantity calculating unit 89 includes a vehicle state quantity axial force calculating unit 701 that calculates a vehicle state quantity axial force Fyr. The vehicle state quantity axial force Fyr is calculated in the dimension of a torque (N·m). The yaw rate γ and the lateral acceleration LA as vehicle state quantities are input to the vehicle state quantity axial force calculating unit 701. The vehicle state quantity axial force calculating unit 701 calculates a lateral force Fy by inputting the yaw rate γ and the lateral acceleration LA to Equation (6).

$$\text{Lateral force } Fy = Kla \times \text{lateral acceleration } LA + K\gamma \times \gamma' \tag{6}$$

Here, "γ'" represents a differential value of the yaw rate γ, and "Kla" and "Kγ" represent coefficients which are set in advance by experiment or the like. The vehicle state quantity axial force calculating unit 701 outputs the lateral force Fy as the vehicle state quantity axial force Fyr because the calculated lateral force Fy can be approximately considered as an axial force applied to the rack shaft 22.

Figure 26:
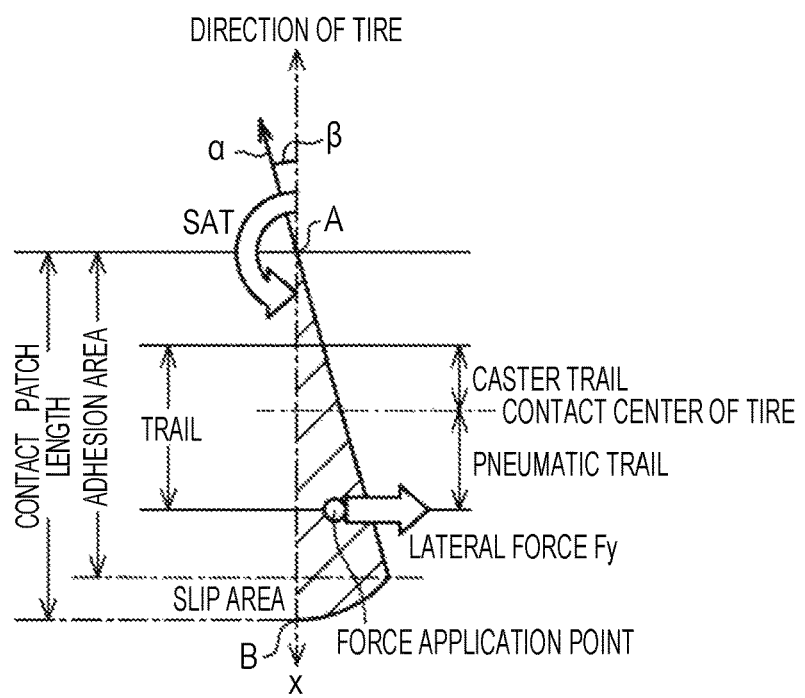
FIG. 26 is a diagram schematically illustrating a relationship between a lateral force acting on a force application point, a self-aligning torque, and a pneumatic trail.

A relationship between a slip angle β of the turning wheels and a force applied to the turning wheels will be described below with reference to FIGS. 26 and 27. FIG. 26 is a top view of a tread (contact patch) of one turning wheel with a slip angle β. A center line x directed in the direction of one turning wheel indicates the original direction of the turning wheel, and the progress direction of the turning wheel is indicated by a line α. In the drawing, when point A is defined as a contact start point of the turning wheel and point B is defined as a contact end point, the tread is dragged by the road surface by the slip angle β and is shifted from the center line x to the line α and thus warps. In FIG. 26, an area in which the tread is shifted and warps is hatched. In the warping area, an area on the side of point A is an adhesion area, and an area on the side of point B is a slip area. A lateral force Fy acts on a force application point of the tread of the turning wheel when the tire turns at the slip angle β, and a moment around the vertical axis is a self-aligning torque SAT. A distance between the contact center of the turning wheel and the force application point is a pneumatic trail, and the sum of the pneumatic trail and a caster trail is a trail.

Figure 27:
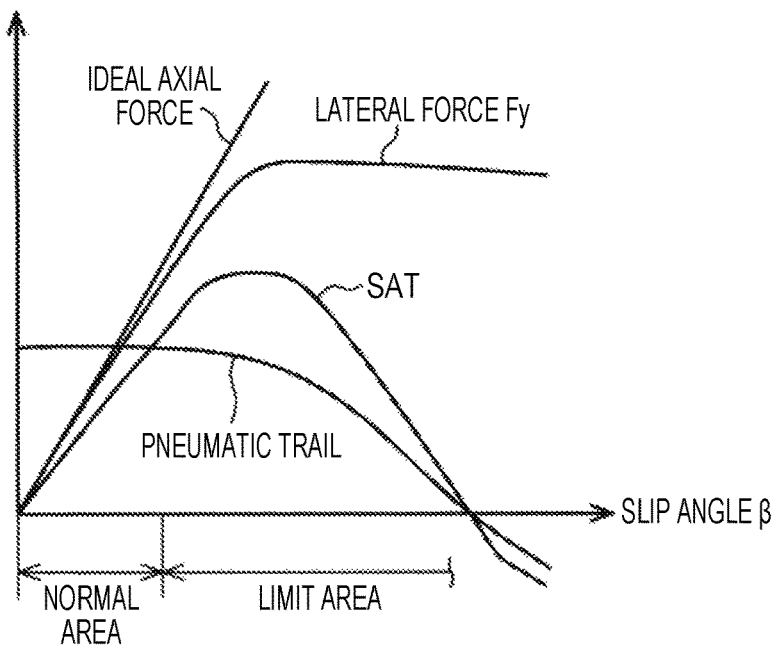
FIG. 27 is a graph illustrating changes of an ideal axial force, a lateral force (a vehicle state quantity axial force), a self-aligning torque (a road-surface axial force), and a pneumatic trail with respect to change of a slip angle.

FIG. 27 illustrates changes of the ideal axial force Fib, the lateral force Fy (the vehicle state quantity axial force Fyr), the self-aligning torque SAT (the road-surface axial force Fer), and the pneumatic trail with respect to the change of the slip angle β. As illustrated in the drawing, in an area in which the slip angle β is small in the turning wheel which is turning, the ideal axial force Fib, the lateral force Fy, and the self-aligning torque SAT increase substantially linearly with an increase in the slip angle β, and a difference between these values is small. On the other hand, in an area in which the slip angle β has a certain large magnitude, the ideal axial force Fib continues to increase substantially linearly with the increase in the slip angle β, and the lateral force Fy continues to increase and then tends to be substantially constant or to decrease slightly. The self-aligning torque SAT continues to increase for a moment with the increase in the slip angle β, but exhibits a tendency to decrease greatly with the decrease in the pneumatic trail. The area in which the values change substantially linearly and the differences therebetween is small is defined as a normal area, and the area in which the lateral force Fy and the self-aligning torque SAT change nonlinearly and the difference therebetween increases is defined as a limit area. The normal area and the limit area which are illustrated in FIG. 27 are distinguished for the purpose of convenience.

When the axial force at the time of turning is regarded as the self-aligning torque SAT, the relationship between the self-aligning torque SAT and the lateral force Fy can be expressed by Equation (7) using a parameter corresponding to a pneumatic trail from the contact center between the turning wheel and the road surface to the force application point on which the lateral force acts as illustrated in FIG. 26.

$$\text{Self-aligning torque } SAT = \text{Lateral force } Fy \times \text{Pneumatic trail} \tag{7}$$

Then, when "axial force≈reaction force from the road surface" is considered, it can be said that the road-surface axial force Fer based on the drive current (that is, the q-axis current value Iqt) of the turning-side motor 33 approximately expresses the self-aligning torque SAT.

The lateral force Fy is a force which is generated in the turning wheel 4, and the lateral force Fy can be approximately expressed by the lateral acceleration LA with replacement of "lateral force Fy≈force generated in the lateral direction of the vehicle." Since responsiveness to an actual axial force when movement is started is not made sufficient by only the lateral acceleration LA, a differential of the yaw rate γ is added thereto to improve the responsiveness and thus Equation (6) is obtained.

With the use of Equation (7), the grip state quantity Gr which is represented by a degree of grip indicating to what degree the turning wheel 4 grips the road surface can be expressed by Equation (8).

$$\text{Grip state quantity } Gr = \text{self-aligning torque } SAT / \text{lateral force } Fy \tag{8}$$

Since the road-surface axial force Fer can approximately express the self-aligning torque SAT and the vehicle state quantity axial force Fyr can approximately express the lateral force, the grip state quantity Gr is expressed by Equation (9).

$$\text{Grip state quantity } Gr = (Ker \times \text{road-surface axial force}) / (Ky \times \text{vehicle state quantity axial force}) \tag{9}$$

Here, "Ker" and "Ky" represent coefficients which are set in advance by experiment or the like. A vehicle state changes according to the traveling state thereof. Therefore, in the case where the vehicle state quantity axial force Fyr based on the yaw rate γ and the lateral acceleration LA is used, the axial force which is actually applied to the rack shaft 22 when behavior of the vehicle changes greatly can be more accurately estimated than in the case where the ideal axial force Fib is used. However, when the vehicle is in the low-speed state including a stopped state, the values of the yaw rate γ and the lateral acceleration LA decrease, and therefore, the magnitude of noise increases relative to the output values of the yaw rate sensor 45 and the lateral acceleration sensor 46. In this case, when the yaw rate γ and the lateral acceleration LA are used, the axial force cannot be detected accurately as compared to when the target steering angle θh* is used.

In this regard, as illustrated in FIG. 25, the grip state quantity calculating unit 89 according to this embodiment includes a first grip component calculating unit 702 that calculates a first grip component Gr1 based on the ideal axial force Fib and the road-surface axial force Fer and a second grip component calculating unit 703 that calculates a second grip component Gr2 based on the vehicle state quantity axial force Fyr and the road-surface axial force Fer. When the vehicle speed V and the lateral acceleration LA which are the traveling state quantities indicating the traveling state of the vehicle indicate the low-speed state, the grip state quantity calculating unit 89 calculates the grip state quantity Gr at the distribution proportions including the first grip component Gr1. On the other hand, when the vehicle speed V and the lateral acceleration LA indicate the intermediate-to-high speed state, the grip state quantity calculating unit 89 calculates the grip state quantity Gr at the distribution proportions including the second grip component Gr2.

Specifically, the road-surface axial force Fer and the ideal axial force Fib are input to the first grip component calculating unit 702. The first grip component calculating unit 702 calculates the first grip component Gr1 by dividing the road-surface axial force Fer by the ideal axial force Fib and outputs the calculated first grip component Gr1 to the multiplier 704. When the absolute value of the ideal axial force Fib is equal to or less than a zero threshold value F0, the first grip component calculating unit 702 according to this embodiment does not divide the road-surface axial force Fer by the ideal axial force Fib and outputs "0" as the first grip component Gr1. That is, the first grip component calculating unit 702 has a zero-proportion preventing function of preventing the first grip component Gr1 from diverging by dividing the road-surface axial force Fer by zero. The zero threshold value F0 is set to a very small value close to zero. The road-surface axial force Fer and the vehicle state quantity axial force Fyr are input to the second grip component calculating unit 703. The second grip component calculating unit 703 calculates the second grip component Gr2 by dividing the road-surface axial force Fer by the vehicle state quantity axial force Fyr and outputs the calculated second grip component Gr2 to the multiplier 705. The second grip component calculating unit 703 according to this embodiment has the zero-proportion preventing function, and does not perform division and outputs "0" as the second grip component Gr2 when the absolute value of the vehicle state quantity axial force Fyr is equal to or less than the zero threshold value F0.

The grip state quantity calculating unit 89 includes a distribution proportion setting unit 706 that sets a distribution proportion Ggr regarding the second grip component Gr2 and the first grip component Gr1. The vehicle speed V and the lateral acceleration LA are input to the distribution proportion setting unit 706. The distribution proportion setting unit 706 includes a map illustrated in FIG. 25 and sets the distribution proportion Ggr with reference to the map. In this map, the distribution proportion Ggr is set such that the proportion including the second grip component Gr2 increases as the vehicle speed V and the lateral acceleration LA approach values indicating the intermediate-to-high speed state from values indicating the low-speed state.

Specifically, the distribution proportion Ggr is set such that the distribution proportion Ggr is "0" in an area in which the lateral acceleration LA is equal to or less than a lateral acceleration threshold value LAth and the distribution proportion Ggr increases with an increase in the lateral acceleration LA and is then constant when the lateral acceleration LA is greater than the lateral acceleration threshold value LAth. The distribution proportion Ggr is set such that the distribution proportion Ggr is "0" in an area in which the vehicle speed V is equal to or less than a vehicle speed threshold value Vth and the distribution proportion Ggr increases with an increase in the vehicle speed V when the vehicle speed V is greater than the vehicle speed threshold value Vth. The maximum value of the distribution proportion Ggr is set to "1." The lateral acceleration threshold value LAth and the vehicle speed threshold value Vth are set such that the detection values thereof are large relative to noise, and sensor accuracy can be secured at the lateral acceleration threshold value LAth and the vehicle speed threshold value Vth. The lateral acceleration threshold value LAth and the vehicle speed threshold value Vth are set in advance by experiment or the like. The value of the lateral acceleration LA indicates that the traveling state of the vehicle is the low-speed state when the lateral acceleration LA is equal to or less than the lateral acceleration threshold value LAth, and the value of the lateral acceleration LA indicates that the traveling state of the vehicle is the intermediate-to-high speed state when the lateral acceleration LA is greater than the lateral acceleration threshold value LAth. Similarly, the value of the vehicle speed V indicates that the traveling state of the vehicle is the low-speed state when the vehicle speed V is equal to or less than the vehicle speed threshold value Vth, and the value of the vehicle speed V indicates that the traveling state of the vehicle is the intermediate-to-high speed state when the vehicle speed V is greater than the vehicle speed threshold value Vth.

The set distribution proportion Ggr is output to the subtractor 107 and a multiplier 705. An integer "1", in addition to the distribution proportion Ggr, is constantly input to the subtractor 107, and a value obtained by subtracting the distribution proportion Ggr from the integer "1" is output to a multiplier 704. That is, the sum of the distribution proportion of the first grip component Gr1 and the distribution proportion of the second grip component Gr2 is set to "1."

The grip state quantity calculating unit 89 outputs a value obtained by causing the multiplier 704 to multiply the first grip component Gr1 by the output value (1—distribution proportion Ggr) from the subtractor 107, as a first grip distributed quantity Agr1, to a grip calculation processing unit 108. The grip state quantity calculating unit 89 outputs a value obtained by causing the multiplier 705 to multiply the second grip component Gr2 by the distribution proportion Ggr, as a second grip distributed quantity Agr2, to the grip calculation processing unit 108. The grip calculation processing unit 108 outputs a value obtained by summing the first grip distributed quantity Agr1 and the second grip distributed quantity Agr2, as the grip state quantity Gr.

Figure 28:
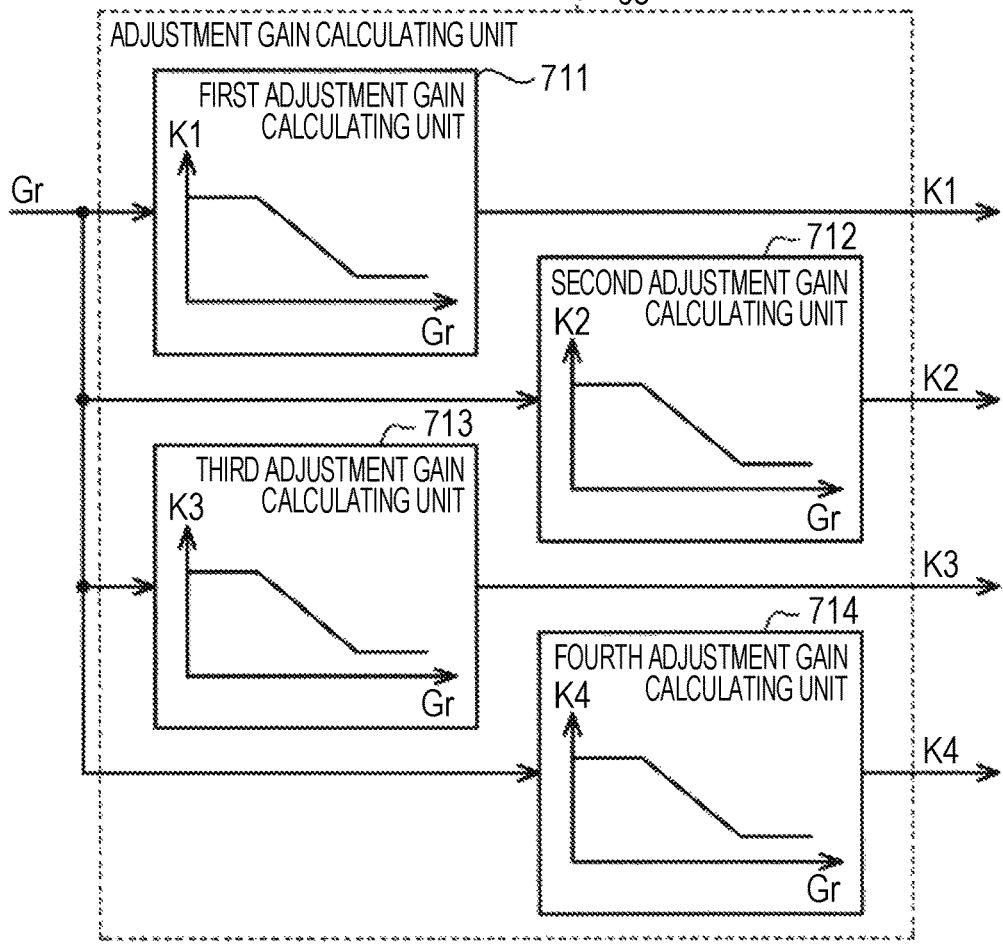
FIG. 28 is a block diagram of an adjustment gain calculating unit according to the sixth embodiment.

The configuration of the adjustment gain calculating unit 68 will be described below. As illustrated in FIG. 23, the calculated grip state quantity Gr is input to the adjustment gain calculating unit 68. As illustrated in FIG. 28, the adjustment gain calculating unit 68 includes first to fourth adjustment gain calculating units 711 to 714, and the grip state quantity Gr is input to the first to fourth adjustment gain calculating units 711 to 714.

The first adjustment gain calculating unit 711 includes a map in which a relationship between the grip state quantity Gr and the first adjustment gain K1 is defined. The second adjustment gain calculating unit 712 includes a map in which a relationship between the grip state quantity Gr and the second adjustment gain K2 is defined. The third adjustment gain calculating unit 713 includes a map in which a relationship between the grip state quantity Gr and the third adjustment gain K3 is defined. The fourth adjustment gain calculating unit 714 includes a map in which a relationship between the grip state quantity Gr and the fourth adjustment gain K4 is defined.

In the example illustrated in FIG. 28, the maps are set such that the first to fourth adjustment gains K1 to K4 are large when the grip state quantity Gr is small and the first to fourth adjustment gains K1 to K4 decrease when the grip state quantity Gr increases, but the disclosure is not limited to the relationship. For example, the maps may be set such that the first to fourth adjustment gains K1 to K4 are small when the grip state quantity Gr is small and the first to fourth adjustment gains K1 to K4 increase when the grip state quantity Gr increases. The tendencies indicated by the maps may be different from each other and, for example, the maps may be set such that the first adjustment gain K1 and the fourth adjustment gain K4 are small and the second and third adjustment gains K2 and K3 are large when the grip state quantity Gr is small.

As illustrated in FIG. 24, the calculated first adjustment gain K1 is output to the multiplier 784 and the input-torque basic component Tb* is multiplied by the first adjustment gain K1. Accordingly, the input-torque basic component Tb*' changes according to the first adjustment gain K1. The second adjustment gain K2 is output to the target angle calculation processing unit 783 and the reciprocal of the inertia coefficient J is multiplied by the second adjustment gain K2. Accordingly, the inertia term changes according to the second adjustment gain K2. The third adjustment gain K3 is output to the target angle calculation processing unit 783 and the viscosity coefficient C is multiplied by the third adjustment gain K3. Accordingly, the viscosity term changes according to the third adjustment gain K3. The fourth adjustment gain K4 is output to the multiplier 798 and the distributed axial force Fd is multiplied by the fourth adjustment gain K4. Accordingly, the reaction component Fir changes according to the fourth adjustment gain K4. When the first to fourth adjustment gains K1 to K4 change, the target steering angle θh* changes and the target reaction torque Ts* also changes.

Change in a steering feeling due to the changes of the first to fourth adjustment gains K1 to K4 will be described below. For example, there is a case in which the values of the first to fourth adjustment gains K1 to K4 are set such that the target reaction torque Ts* is finally less than that in a case in which the grip state quantity Gr is not considered, in a situation in which the vehicle travels on a low-μ road surface and the slip angle β is likely to increase. In this case, a steering reaction force applied from the steering-side motor 14 to the steering wheel 11 can be set to be less than that in a normal state from the stage before the slip angle β increases to enter the limit area, and a driver can easily recognize road surface information indicating a low-μ road because a so-called sense of release is generated.

On the other hand, in the same situation, there is a case in which the values of the first to fourth adjustment gains K1 to K4 are set such that the target reaction torque Ts* is finally greater than that in the case in which the grip state quantity Gr is not considered. In this case, the steering reaction force applied from the steering-side motor 14 to the steering wheel 11 can be set to increase even in a state in which the slip angle β increases, and a driver can continue to perform steering without feeling discomfort.

Operations and advantages of this embodiment will be described below. (1) When the lateral acceleration LA and the vehicle speed V indicate the low-speed state and accuracy of the vehicle state quantity axial force Fyr cannot be secured, the grip state quantity calculating unit 89 calculates the grip state quantity Gr at the distribution proportions including the first grip component Gr1 based on the ideal axial force Fib and the road-surface axial force Fer. On the other hand, when the lateral acceleration LA and the vehicle speed V indicate the intermediate-to-high speed state and accuracy of the vehicle state quantity axial force Fyr can be secured, the grip state quantity calculating unit 89 calculates the grip state quantity Gr at the distribution proportions including the second grip component Gr2 based on the vehicle state quantity axial force Fyr and the road-surface axial force Fer. Accordingly, it is possible to calculate an appropriate grip state quantity Gr and to appropriately compensate for the steering reaction force in consideration of the grip state quantity Gr.

(2) Since the grip state quantity calculating unit 89 calculates the grip state quantity Gr such that the distribution proportion of the second grip component Gr2 increases as the lateral acceleration LA and the vehicle speed V approaches the intermediate-to-high speed state from the low-speed state, it is possible to more appropriately calculate the grip state quantity Gr.

(3) Since the distribution proportion setting unit 706 sets the distribution proportions based on the lateral acceleration LA and the vehicle speed V, it is possible to determine the traveling state of the vehicle and to calculate the grip state quantity Gr based on an appropriate traveling state quantity.

Hereinafter, a steering control device according to a seventh embodiment will be described with reference to the accompanying drawings. For the purpose of convenience of description, the same elements as the elements according to the sixth embodiment will be referred to by the same reference numerals and signs and description thereof will not be repeated.

Figure 29:
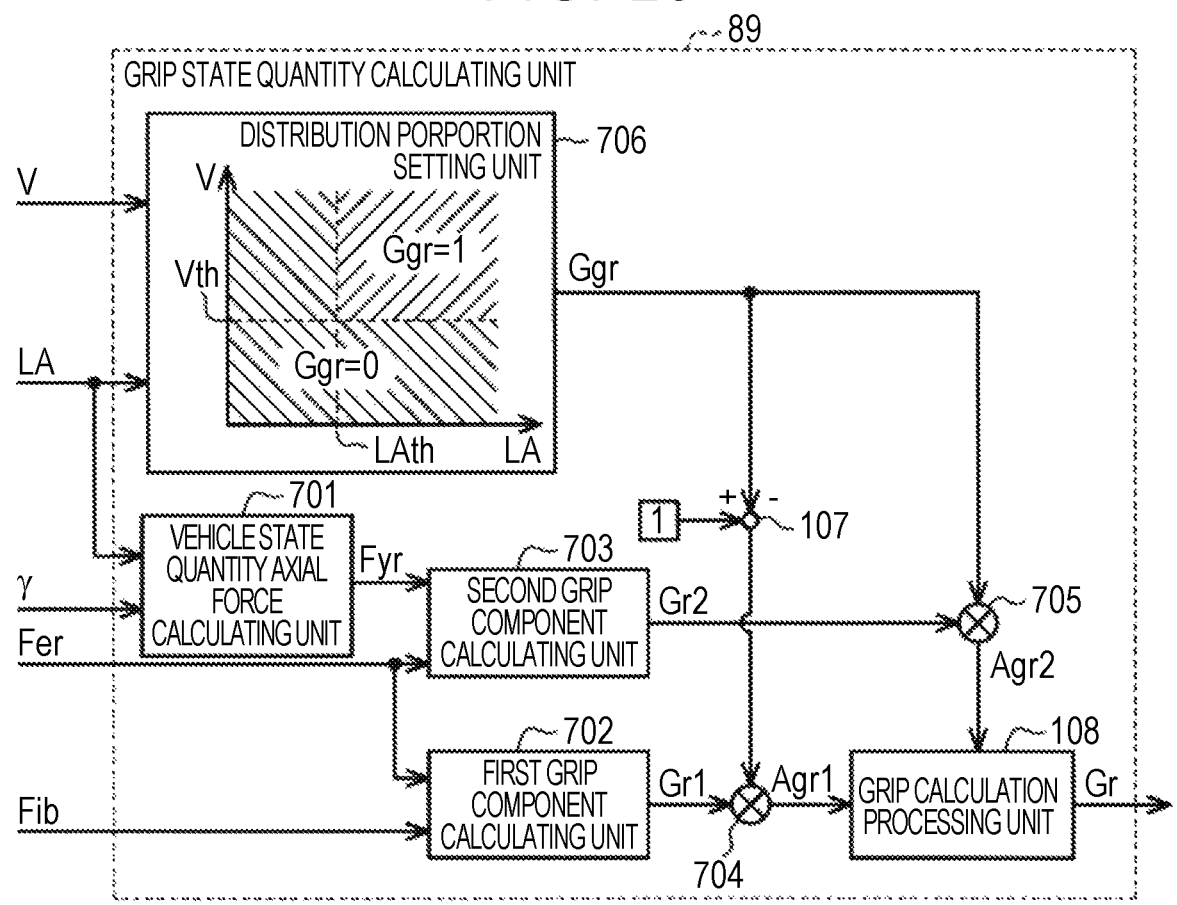
FIG. 29 is a block diagram of a grip state quantity calculating unit according to a seventh embodiment.

As illustrated in FIG. 29, the distribution proportion setting unit 706 according to this embodiment calculates the grip state quantity Gr at the distribution proportion Ggr including only the first grip component Gr1 with reference to the map illustrated in the drawing when at least one of the vehicle speed V and the lateral acceleration LA indicates that the vehicle is in the low-speed state. The distribution proportion setting unit 706 calculates the grip state quantity Gr at the distribution proportion Ggr including only the second grip component Gr2 when both the vehicle speed V and the lateral acceleration LA indicate that the vehicle is in the intermediate-to-high speed state. Specifically, the map illustrated in the drawing is set such that the distribution proportion Ggr is "0" when the lateral acceleration LA is equal to or less than a lateral acceleration threshold value LAth or the vehicle speed V is equal to or less than a vehicle speed threshold value Vth and the distribution proportion Ggr is "1" when the lateral acceleration LA is greater than the lateral acceleration threshold value LAth and the vehicle speed V is greater than the vehicle speed threshold value Vth.

Similarly to the sixth embodiment, the calculated grip state quantity Gr is input to the adjustment gain calculating unit 68 and the target reaction torque Ts* is changed according to the grip state by changing the first to fourth adjustment gains K1 to K4.

Operations and advantages of this embodiment will be described below. In this embodiment, the following advantages are achieved in addition to the operations and advantages of (1) and (3) in the sixth embodiment. (4) When at least one of the lateral acceleration LA and the vehicle speed V indicates that the vehicle is in the low-speed state, the grip state quantity calculating unit 89 calculates the grip state quantity Gr at the distribution proportions including only the first grip component Gr1 based on the ideal axial force Fib, that is, without using the second grip component Gr2 based on the vehicle state quantity axial force Fyr. Since the first grip component Gr1 is a value based on the ideal axial force Fib with high accuracy when the vehicle is in the low-speed state and is not based on the vehicle state quantity axial force Fyr with low accuracy when the vehicle is in the low-speed state as described above, the grip state quantity calculating unit 89 in this embodiment can more appropriately calculate the grip state quantity.

(5) When both the lateral acceleration LA and the vehicle speed V indicate that the vehicle is in the intermediate-to-high speed state, the grip state quantity calculating unit 89 calculates the grip state quantity Gr at the distribution proportions including only the second grip component Gr2 based on the vehicle state quantity axial force Fyr, that is, without using the first grip component Gr1 based on the ideal axial force Fib. Since the second grip component Gr2 is a value based on the vehicle state quantity axial force Fyr with high accuracy when the vehicle is in the intermediate-to-high speed state and is not based on the ideal axial force Fib with low accuracy when the vehicle is in the intermediate-to-high speed state as described above, the grip state quantity calculating unit 89 in this embodiment can more appropriately calculate the grip state quantity Gr.

Hereinafter, a steering control device according to an eighth embodiment will be described with reference to the accompanying drawings. For the purpose of convenience of description, the same elements as the elements according to the sixth embodiment will be referred to by the same reference numerals and signs and description thereof will not be repeated.

Figure 30:
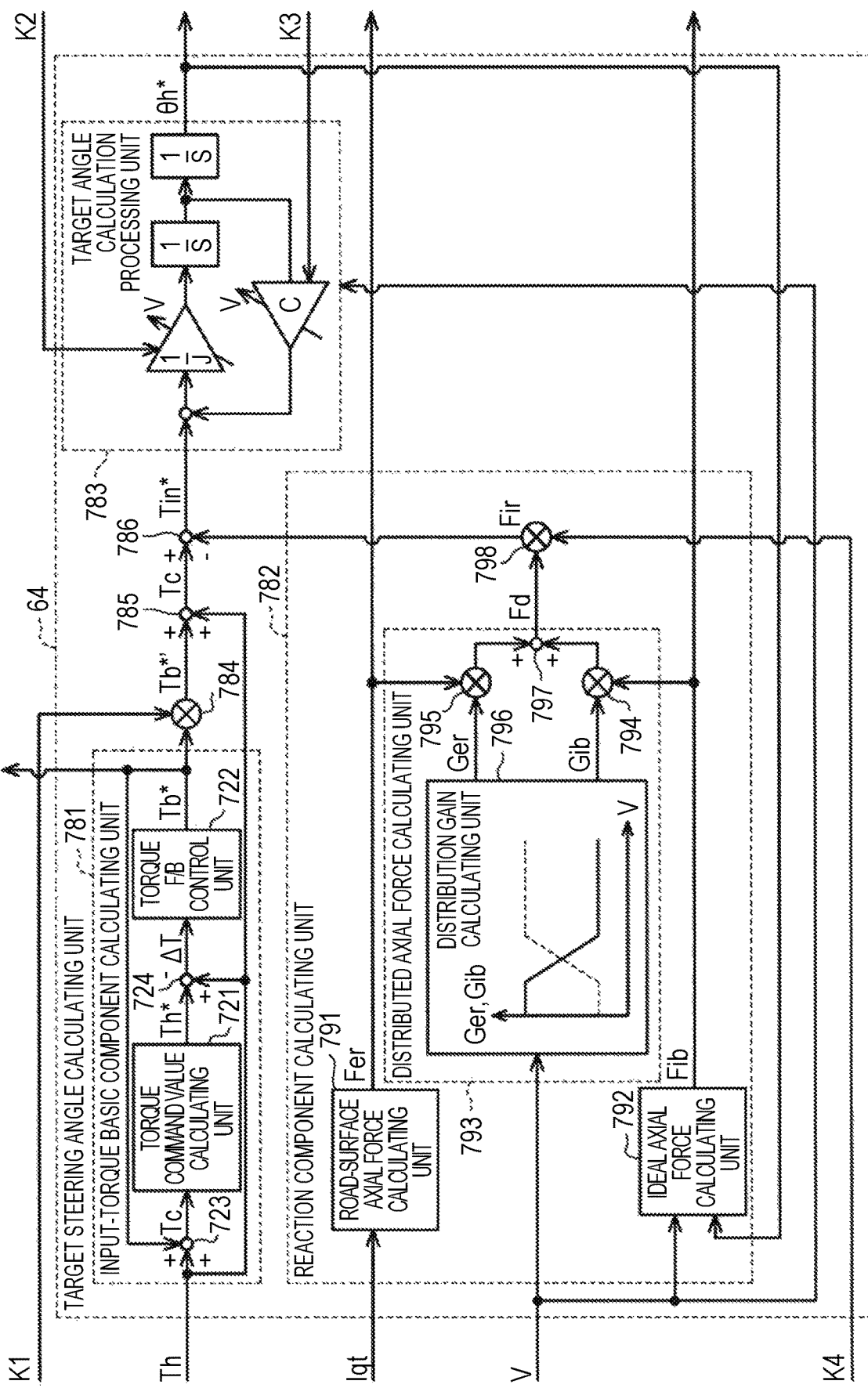
FIG. 30 is a block diagram of a target steering angle calculating unit according to an eighth embodiment.

As illustrated in FIG. 30, the input-torque basic component calculating unit 781 according to this embodiment includes a torque command value calculating unit 721 that calculates a torque command value Th*, which is a target value of the steering torque Th to be input by a driver, in response to a drive torque Tc, and a torque feedback control unit (hereinafter referred to as a torque F/B control unit) 722 that performs torque feedback control.

Specifically, the drive torque Tc which is obtained by causing the adder 723 to add the input-torque basic component Tb* to the steering torque Th is input to the torque command value calculating unit 721. The torque command value calculating unit 721 calculates the torque command value Th* of which the absolute value increases as the absolute value of the drive torque Tc increases.

A torque deviation ΔT which is obtained by causing the subtractor 724 to subtract the torque command value Th* from the steering torque Th is input to the torque F/B control unit 722. The torque F/B control unit 722 calculates the input-torque basic component Tb* as a controlled variable for feedback-controlling the steering torque Th to the torque command value Th*, based on the torque deviation ΔT. Specifically, the torque FB control unit 722 calculates, as the input-torque basic component Tb*, the sum of a proportional element, an integral element, and a differential element with the use of the torque deviation ΔT as an input.

Similarly to the first embodiment, the calculated input-torque basic component Tb* is output to the target reaction torque calculating unit 65 and the multiplier 784, and an input-torque basic component Tb*' is calculated by multiplying the input-torque basic component Tb* by the first adjustment gain K1. Accordingly, the target steering angle θh* changes and the target reaction torque Ts* changes according to the grip state.

In this embodiment, the same operations and advantages as the operations and advantages of (1) to (3) in the sixth embodiment are achieved.

Hereinafter, a steering control device according to a ninth embodiment will be described with reference to the accompanying drawings. For the purpose of convenience of description, the same elements as the elements according to the sixth embodiment will be referred to by the same reference numerals and signs and description thereof will not be repeated.

Figure 31:
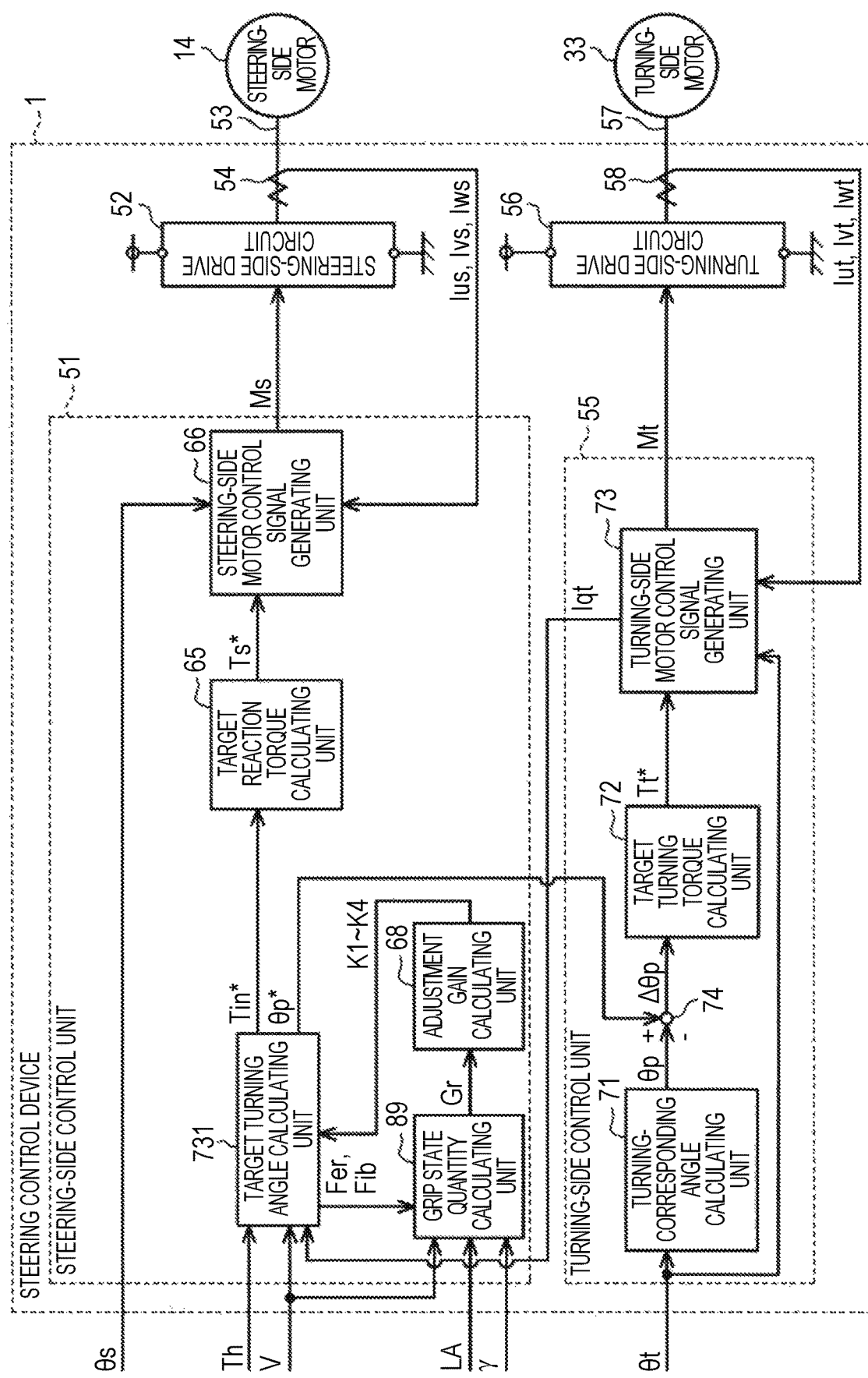
FIG. 31 is a block diagram of a steering control device according to a ninth embodiment.
Figure 32:
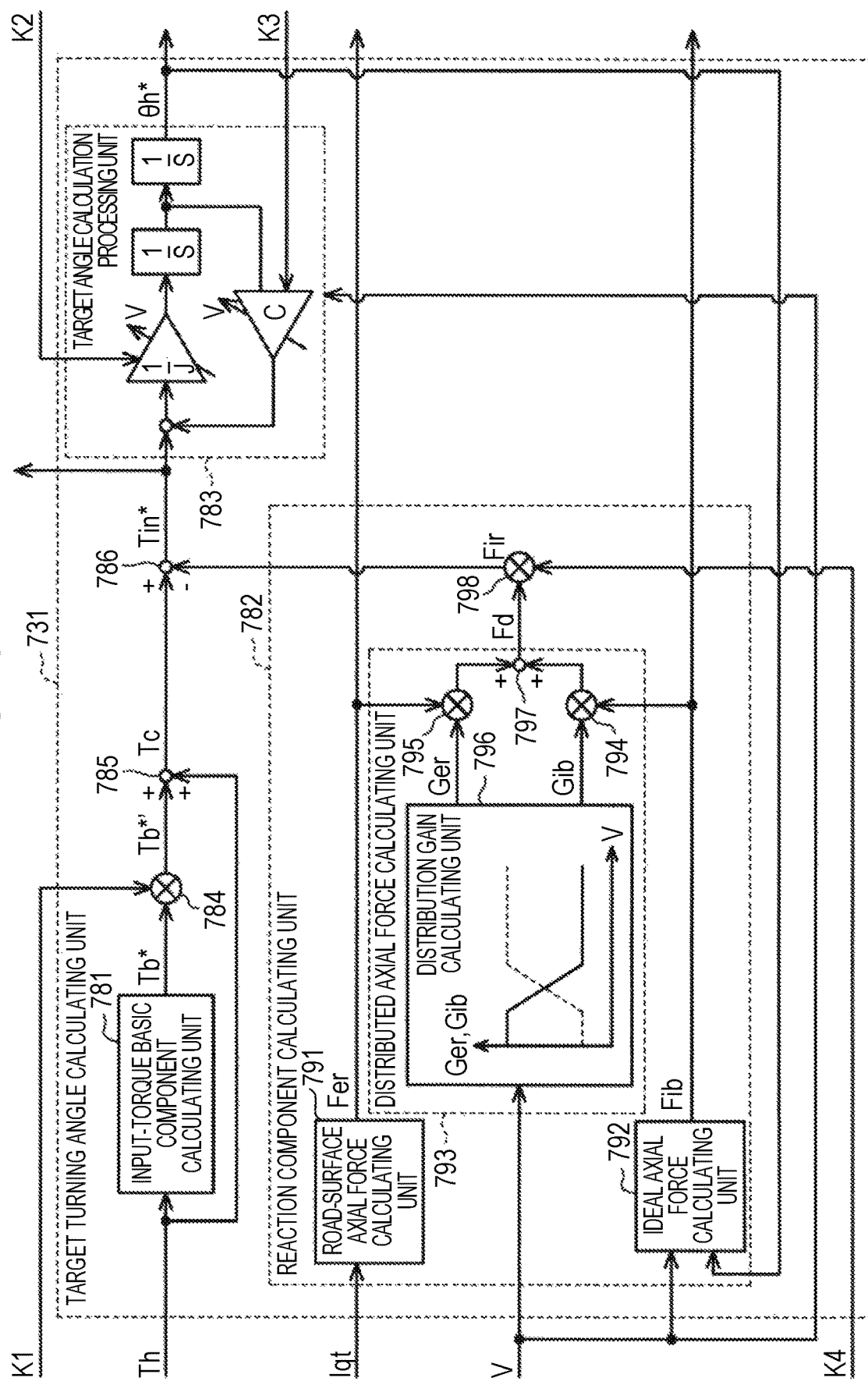
FIG. 32 is a block diagram of a target turning-corresponding angle calculating unit according to the ninth embodiment.

As illustrated in FIG. 31, the steering-side control unit 51 in this embodiment includes a target turning-corresponding angle calculating unit 731 that calculates a target turning-corresponding angle θp* which is a target value of a turning-corresponding angle θp which can be converted into a turning angle of the turning wheels 4 and does not include the target steering angle calculating unit 64. As illustrated in FIG. 32, the target turning-corresponding angle calculating unit 731 calculates the target turning-corresponding angle θp* through the same calculation process as the calculation process of calculating the target steering angle θh* which is performed by the target steering angle calculating unit 64 in the sixth embodiment. For the purpose of convenience of description, constituent blocks of the target turning-corresponding angle calculating unit 731 will be referred to by the same reference numerals and signs as the constituent blocks of the target steering angle calculating unit 64 (see FIG. 24).

As illustrated in FIG. 31, the target turning-corresponding angle θp* which is calculated by the target turning-corresponding angle calculating unit 731 is output to the turning-side control unit 55. Similarly to the sixth embodiment, the ideal axial force Fib and the road-surface axial force Fer are output to the grip state quantity calculating unit 89. The input torque Tin* which is input to the target angle calculation processing unit 783 is input to the target reaction torque calculating unit 65 from the target turning-corresponding angle calculating unit 731.

The target reaction torque calculating unit 65 in this embodiment calculates the target reaction torque Ts* which is a target value of a steering reaction force applied from the steering-side motor 14, based on the input torque Tin*. Specifically, the target reaction torque calculating unit 65 calculates the target reaction torque Ts* of which the absolute value increases as the input torque Tin* increases. The input-torque basic component Tb* and the reaction component Fir serving as bases of the input torque Tin* are changed according to the first and fourth adjustment gains K1 and K4. Accordingly, the target reaction torque Ts* based on the input torque Tin* is changed according to the grip state.

In this embodiment, the same operations and advantages as the operations and advantages of (1) to (3) in the sixth embodiment are achieved.

Hereinafter, a steering control device according to a tenth embodiment will be described with reference to the accompanying drawings. For the purpose of convenience of description, the same elements as the elements according to the ninth embodiment will be referred to by the same reference numerals and signs and description thereof will not be repeated.

Figure 33:
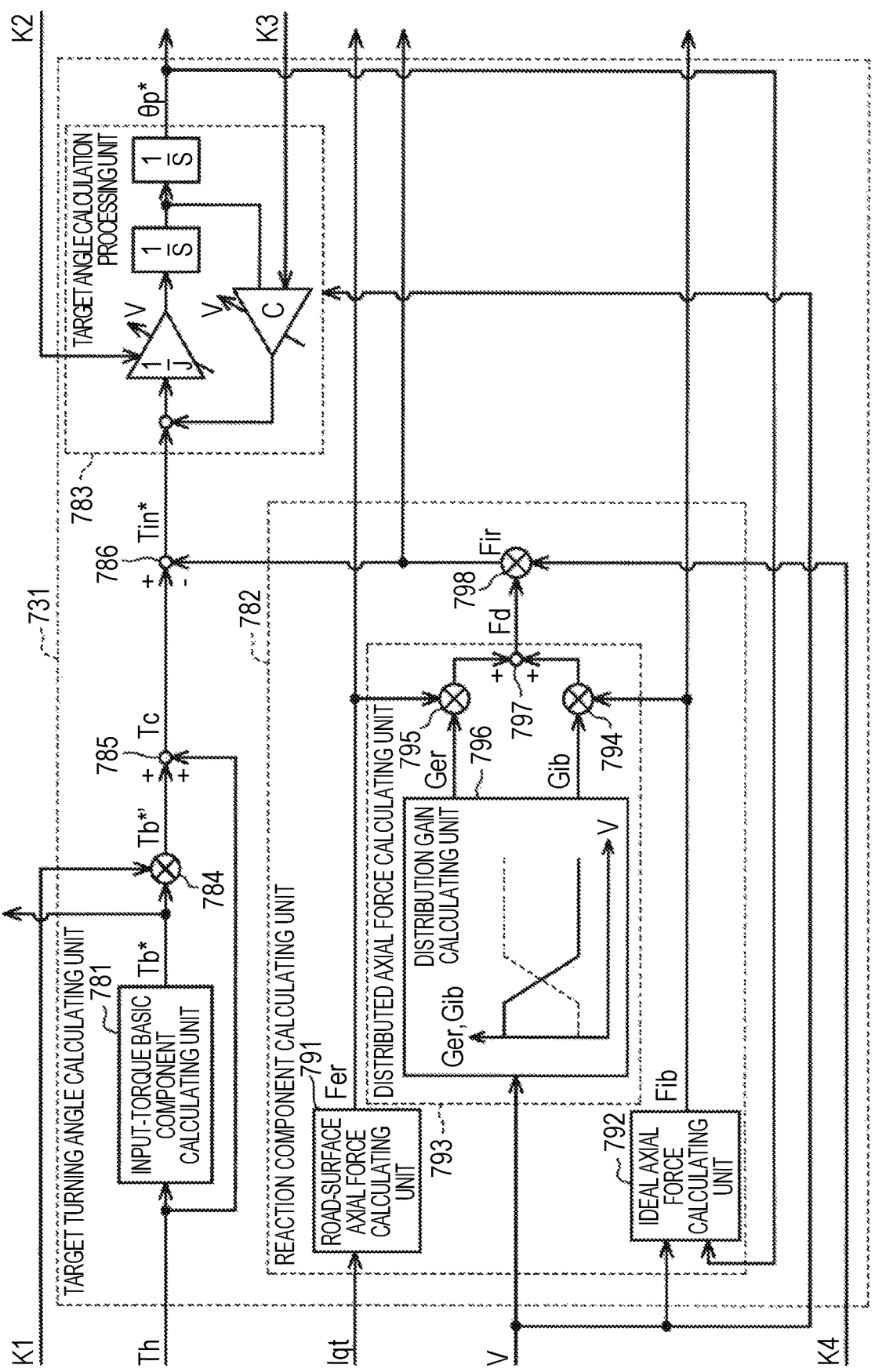
FIG. 33 is a block diagram of a target turning-corresponding angle calculating unit according to a tenth embodiment.

As illustrated in FIG. 33, the target turning-corresponding angle calculating unit 731 according to this embodiment outputs the reaction component Fir to the target reaction torque calculating unit 65 and does not output the input torque Tin* thereto. The target reaction torque calculating unit 65 (see FIG. 31) calculates the target reaction torque Ts* of which the absolute value increases as the absolute value of the reaction component Fir increases and the vehicle speed V increases. The reaction component Fir is changed according to the fourth adjustment gain K4. Accordingly, the target reaction torque Ts* based on the reaction component Fir is changed according to the grip state.

In this embodiment, the same operations and advantages as the operations and advantages of (1) to (3) in the sixth embodiment are achieved. This embodiment can be modified as follows. This embodiment and the following modified examples can be combined with each other as long as they are not contradictory to each other.

In the ninth and tenth embodiments the target turning-corresponding angle θp* is calculated based on the input torque Tin*, but the disclosure is not limited thereto and the target turning-corresponding angle θp* may be calculated based on another parameter such as the steering angle θh.

In the seventh embodiment, the grip state quantity Gr may be calculated based on only the second grip component Gr2 when the vehicle speed V and the lateral acceleration LA indicate that the vehicle is in the intermediate-to-high speed state, and the grip state quantity Gr may be calculated based on the first and second grip components Gr1 and Gr2 when the vehicle speed V and the lateral acceleration LA indicate that the vehicle is in the low-speed state. The grip state quantity Gr may be calculated based on only the first grip component Gr1 when the vehicle speed V and the lateral acceleration LA indicate that the vehicle is in the low-speed state, and the grip state quantity Gr may be calculated based on the first and second grip components Gr1 and Gr2 when the vehicle speed V and the lateral acceleration LA indicate that the vehicle is in the intermediate-to-high speed state.

In the sixth to tenth embodiments, the mode for realizing the zero proportion preventing function can be appropriately modified. For example, when the absolute value of the vehicle state quantity axial force Fyr is equal to or less than the zero threshold value F0, the vehicle state quantity axial force Fyr may be set to a preset lower limit. The first grip component calculating unit 702 and the second grip component calculating unit 703 may not have the zero proportion preventing function.

In the sixth to tenth embodiments, the distribution proportion setting unit 706 sets the distribution proportion Ggr using the lateral acceleration LA and the vehicle speed V as the traveling state quantities, but the disclosure is not limited thereto and the distribution proportion Ggr may be set, for example, using only one of the lateral acceleration LA and the vehicle speed V. For example, the distribution proportion Ggr may be set using another parameter such as the yaw rate γ

In the sixth to tenth embodiments, a degree of grip which is obtained by dividing the road-surface axial force Fer by the ideal axial force Fib is defined as the first grip component Gr1, but the disclosure is not limited thereto and, for example, a degree of grip loss (a value indicating to what degree the grip of the turning wheels 4 is lost) which is obtained by subtracting the ideal axial force Fib from the road-surface axial force Fer may be defined as the first grip component Gr1. Similarly, a degree of grip loss which is obtained by subtracting the vehicle state quantity axial force Fyr from the road-surface axial force Fer may be defined as the second grip component Gr2.

In the sixth to tenth embodiments, the grip state quantity Gr is calculated by summing the first grip component Gr1 based on the road-surface axial force Fer and the ideal axial force Fib and the second grip component Gr2 based on the road-surface axial force Fer and the vehicle state quantity axial force Fyr at predetermined distribution proportions. However, the disclosure is not limited thereto and the grip state quantity Gr may be calculated, for example, by calculating a third grip component based on the ideal axial force Fib and the vehicle state quantity axial force Fyr and summing the grip components at predetermined distribution proportions.

In the sixth to tenth embodiments, the road-surface axial force Fer is calculated based on the q-axis current value Iqt, but the disclosure is not limited thereto and, for example, a pressure sensor or the like that can detect an axial force may be provided in the rack shaft 22 and the detection result thereof may be used as the road-surface axial force Fer.

In the sixth to tenth embodiments, the ideal axial force Fib is calculated based on the target steering angle θh* (the target turning-corresponding angle) and the vehicle speed V, but the disclosure is not limited thereto and the ideal axial force Fib may be calculated based on only the target steering angle θh* (the target turning-corresponding angle) or may be calculated based on the turning-corresponding angle θp. For example, the ideal axial force Fib may be calculated using another method in consideration of another parameter such as the steering torque Th or the vehicle speed V.

In the sixth to tenth embodiments, the first to fourth adjustment gains K1 to K4 are employed as gains based on the grip state quantity Gr, but the disclosure is not limited thereto and at least one thereof may be employed. A gain by which another state quantity is multiplied may be added.

In the sixth to tenth embodiments, the distributed axial force Fd is calculated by employing (i.e., by summing) the ideal axial force Fib and the road-surface axial force Fer at predetermined proportions, but the disclosure is not limited thereto. For example, the distributed axial force Fd may be calculated by employing (i.e., by summing) the ideal axial force Fib and the vehicle state quantity axial force Fyr at predetermined proportions. The mode for calculating the distributed axial force Fd can be appropriately changed.

In the above-mentioned embodiments, the vehicle state quantity axial force Fyr is calculated based on the yaw rate γ and the lateral acceleration LA, but the disclosure is not limited thereto and, for example, the vehicle state quantity axial force Fyr may be calculated based on only one of the yaw rate γ and the lateral acceleration LA.

In the sixth to tenth embodiments, the distributed axial force calculating unit 793 may calculate the distribution gains Gib and Ger in consideration of a parameter other than the vehicle speed V. For example, in a vehicle in which a drive mode indicating a set state of a control pattern for an in-vehicle engine or the like can be selected out of a plurality of drive modes, the selected drive mode may be used as a parameter for setting the distribution gains Gib and Ger. In this case, the distributed axial force calculating unit 793 may include a plurality of maps for the drive modes, the plurality of maps having different tendencies with respect to the vehicle speed V, and the distribution gains Gib and Ger may be calculated with reference to the maps.

In the sixth to tenth embodiments, the reaction component calculating unit 782 calculates a basic reaction force corresponding to an axial force acting on the rack shaft 22, as the reaction component Fir, but the disclosure is not limited thereto. For example, a value obtained by reflecting another reaction force in the base reaction force may be calculated as the reaction component. For example, an end reaction force, which is a reaction force resisting a further turning operation of the steering wheel 11 when the absolute value of the steering angle θh of the steering wheel 11 approaches a steering angle threshold value, may be employed as such a reaction force. For example, it is possible to use, as the steering angle threshold value, the turning-corresponding angle θp at a virtual-rack-end vicinity position which is located closer to the neutral position by a predetermined angle than a virtual rack end position which is set closer to the neutral position than a mechanical rack end position at which movement of the rack shaft 22 in the axial direction is restricted by causing the rack end 25 to come into contact with the rack housing 23. The steering angle θh at a rotation end position of the steering wheel 11 may be used as the steering angle threshold value.

In the above-mentioned embodiments, the target steering angle calculating unit 64 sets the target steering angle θh* based on the steering torque Th and the vehicle speed V, but the disclosure is not limited thereto and, for example, the vehicle speed V may not be used as long as the target steering angle θh* is set based on at least the steering torque Th.

In the above-mentioned embodiments, the steering angle ratio between the steering angle θh and the turning-corresponding angle θp is set to be constant, but the disclosure is not limited thereto and the steering angle ratio may be set to vary depending on a vehicle speed or the like. In this case, the target steering angle θh* and the target turning-corresponding angle θp* have different values.

In the above-mentioned embodiments, the target steering angle calculating unit 64 may calculate the target steering angle θh* using a model formula to which a so-called spring term using a spring constant K is added, the spring constant K being determined based on specifications of suspension, wheel alignment, and the like.

In the first to third embodiments and the sixth to eighth embodiments, the target reaction torque calculating unit 65 calculates the target reaction torque Ts* by adding the input-torque basic component Tb* to the basic reaction torque, but the disclosure is not limited thereto. For example, the input-torque basic component Tb* may not be added thereto and the basic reaction torque may be calculated as the target reaction torque Ts* without any change.

In the above-mentioned embodiments, the rack shaft 22 may be supported, for example, by a bush instead of the first rack and pinion mechanism 24. In the above-mentioned embodiments, for example, the turning-side actuator 31 may have a structure in which the turning-side motor 33 is disposed to be coaxial with the rack shaft 22 or a structure in which the turning-side motor 33 is disposed to be parallel to the rack shaft 22.

In the above-mentioned embodiment, the steering system 2 which is a control object of the steering control device 1 is a linkless steer-by-wire steering system in which the steering unit 3 and the turning unit 5 are mechanically disconnected from each other, but the disclosure is not limited thereto. A steer-by-wire steering system in which the steering unit 3 and the turning unit 5 can be mechanically disconnected and connected by a clutch may be used.

Figure 34:
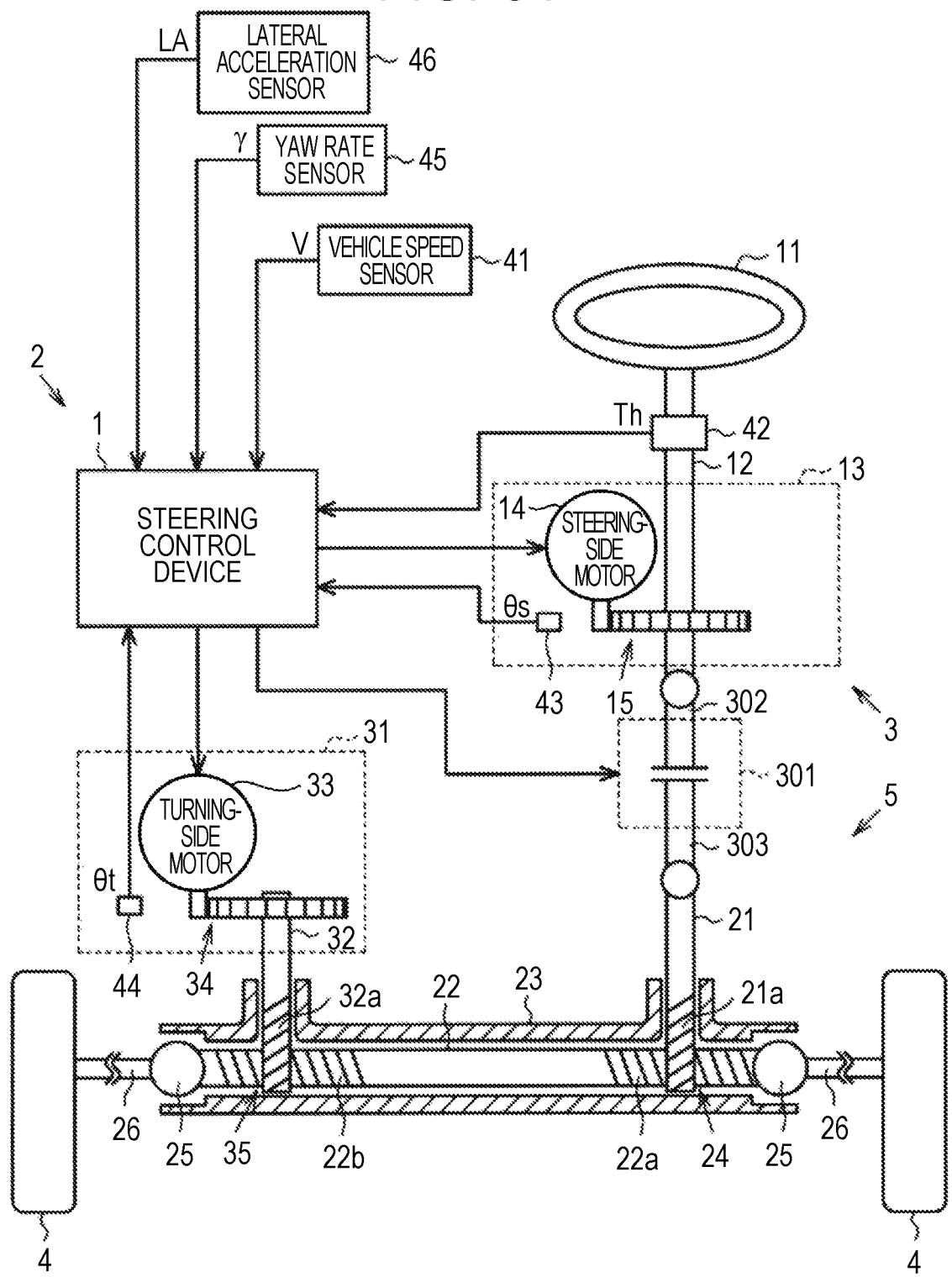
FIG. 34 is a diagram schematically illustrating a configuration of a steer-by-wire steering system according to a modified example.

For example, in the example illustrated in FIG. 34, a clutch 301 is provided between the steering unit 3 and the turning unit 5. The clutch 301 is connected to the steering shaft 12 via an input-side intermediate shaft 302 fixed to an input-side element of the clutch 301 and is connected to the first pinion shaft 21 via an output-side intermediate shaft 303 fixed to an output-side element of the clutch 301. When the clutch 301 is switched to a disengaged state in response to a control signal from the steering control device 1, the steering system 2 is switched to a steer-by-wire mode. When the clutch 301 is switched to an engaged state, the steering system 2 is switched to an electric power steering mode.

What is claimed is:

1. A steering control device configured to control a steering system having a structure in which a steering unit and a turning unit that turns turning wheels in response to steering input to the steering unit are mechanically separated or are configured to be mechanically disconnected and connected, the steering control device comprising a control unit configured to control operation of a steering-side motor that applies a steering reaction force which is a force resisting the steering input to the steering unit, wherein the control unit includes a target steering angle calculating unit configured to calculate a target steering angle which is a target value of a steering angle of a steering wheel which is connected to the steering unit based on a steering torque input to the steering unit and is configured to calculate a target reaction torque which is a target value of the steering reaction force based on execution of feedback control for causing the steering angle to match the target steering angle, wherein the control unit includes:
a plurality of axial force calculating units configured to calculate a plurality of kinds of axial forces acting on a turning shaft to which the turning wheels are connected based on different state quantities; and
a grip state quantity calculating unit configured to calculate a grip state quantity based on the plurality of kinds of axial forces, and wherein the target steering angle calculating unit is configured to calculate the target steering angle in consideration of the grip state quantity.

2. The steering control device according to claim 1, wherein the target steering angle calculating unit is configured to calculate the target steering angle based on a model formula for correlating an input torque input to a rotation shaft that rotates due to rotation of the steering wheel with a rotation angle of the rotation shaft when the steering unit and the turning unit are assumed to be mechanically connected.

3. The steering control device according to claim 2, wherein:
the target steering angle calculating unit includes an inertia control operation unit that corresponds to an inertia term based on an angular acceleration of the rotation shaft in the model formula,
the inertia control operation unit is configured to calculate a target angular acceleration which is a target value of the angular acceleration of the rotation shaft by multiplying a value based on the input torque by an inertia reciprocal gain corresponding to the target angular acceleration, and
the inertia control operation unit is configured to change the inertia reciprocal gain based on the grip state quantity.

4. The steering control device according to claim 2, wherein:
the target steering angle calculating unit includes a viscosity control operation unit that corresponds to a viscosity term based on an angular velocity of the rotation shaft in the model formula;
the viscosity control operation unit is configured to calculate a target viscosity torque which is to be added to the input torque based on a viscosity gain corresponding to a target angular velocity which is a target value of the angular velocity of the rotation shaft and the target angular velocity; and
the viscosity control operation unit is configured to change the viscosity gain based on the grip state quantity.

5. The steering control device according to claim 2, wherein:
the target steering angle calculating unit includes a return viscosity control operation unit that corresponds to a viscosity term based on an angular velocity of the rotation shaft in the model formula and operates in a non-steered state;

the return viscosity control operation unit is configured to calculate a target return viscosity torque which is to be added to the input torque based on a return viscosity gain corresponding to a target angular velocity which is a target value of the angular velocity of the rotation shaft and the target angular velocity; and the return viscosity control operation unit is configured to change the return viscosity gain based on the grip state quantity.

6. The steering control device according to claim 2, wherein:

the target steering angle calculating unit includes an angular velocity feedback control operation unit configured to cause a value corresponding to a target angular velocity which is a target value of an angular velocity of the rotation shaft in the model formula to match a target compensatory angular velocity;

the angular velocity feedback control operation unit is configured to calculate a compensatory angular velocity torque which is to be added to the input torque based on an angular velocity deviation between the target compensatory angular velocity based on a value corresponding to the target steering angle and the value corresponding to the target angular velocity; and the angular velocity feedback control operation unit is configured to change the target compensatory angular velocity based on the grip state quantity.

7. The steering control device according to claim 6, wherein:

the angular velocity feedback control operation unit is configured to adjust the compensatory angular velocity torque by multiplying a value based on the angular velocity deviation by a proportional gain based on a vehicle speed; and the angular velocity feedback control operation unit is configured to change the proportional gain based on the grip state quantity.

8. The steering control device according to claim 6, wherein:

the angular velocity feedback control operation unit is configured to adjust the compensatory angular velocity torque by multiplying a value based on the angular velocity deviation by a positional gain based on the value corresponding to the target steering angle; and the angular velocity feedback control operation unit is configured to change the positional gain based on the grip state quantity.

9. The steering control device according to claim 6, wherein:

the angular velocity feedback control operation unit is configured to adjust the compensatory angular velocity torque by multiplying a value based on the angular velocity deviation by a steering torque compensation gain based on the steering torque input to the steering unit; and the angular velocity feedback control operation unit is configured to change the steering torque compensation gain based on the grip state quantity.

10. The steering control device according to claim 9, wherein the angular velocity feedback control operation unit is configured to calculate the steering torque compensation gain such that the steering torque compensation gain is zero when an absolute value of the steering torque is greater than a non-steered threshold value indicating a non-steered state.

11. A steering control device configured to control a steering system having a structure in which a steering unit and a turning unit that turns turning wheels in response to steering input to the steering unit are mechanically separated or are configured to be mechanically disconnected and connected, the steering control device comprising a control unit configured to control operation of a steering-side motor that applies a steering reaction force which is a force resisting the steering input to the steering unit, wherein the control unit includes:

a plurality of axial force calculating units configured to calculate a plurality of kinds of axial forces acting on a turning shaft to which the turning wheels are connected based on different state quantities;

a distributed axial force calculating unit configured to calculate a distributed axial force by summing the plurality of kinds of axial forces at distribution proportions which are individually set;

a grip state quantity calculating unit configured to calculate a grip state quantity based on the plurality of kinds of axial forces;

a distributed axial force adjusting unit configured to adjust the distributed axial force based on the grip state quantity; and a target steering angle calculating unit configured to calculate a target steering angle which is a target value of a steering angle of a steering wheel connected to the steering unit in consideration of an adjusted distributed axial force that is the distributed axial force adjusted by the distributed axial force adjusting unit, and wherein the control unit is configured to calculate a target reaction torque which is a target value of the steering reaction force based on execution of angle feedback control for causing the steering angle to match the target steering angle.

12. The steering control device according to claim 11, wherein:

the distributed axial force adjusting unit includes a distribution adjustment gain calculating unit configured to calculate a distribution adjustment gain by which the distributed axial force is multiplied; and the distribution adjustment gain calculating unit is configured to change the distribution adjustment gain based on the grip state quantity.

13. The steering control device according to claim 11, wherein:

the distributed axial force adjusting unit includes an offset value calculating unit configured to calculate an offset value which is added to the distributed axial force; and the offset value calculating unit is configured to change the offset value based on the grip state quantity.

14. A steering control device configured to control a steering system having a structure in which a steering unit and a turning unit that turns turning wheels in response to steering input to the steering unit are mechanically separated or are configured to be mechanically disconnected and connected, the steering control device comprising a control unit configured to control operation of a steering-side motor that applies a steering reaction force which is a force resisting the steering input to the steering unit, wherein the control unit includes:

an ideal axial force calculating unit configured to calculate an ideal axial force based on a value related to a rotation angle of a rotation shaft, the rotation angle being converted into a turning angle of the turning wheels;

a road-surface axial force calculating unit configured to calculate a road-surface axial force based on road surface information;

a vehicle state quantity axial force calculating unit configured to calculate a vehicle state quantity axial force based on a vehicle state quantity which varies depending on a traveling state of a vehicle; and a grip state quantity calculating unit configured to calculate a plurality of grip components based on the ideal axial force, the road-surface axial force, and the vehicle state quantity axial force and to calculate a grip state quantity by summing the plurality of grip components at predetermined distribution proportions, wherein the control unit is configured to calculate a target reaction torque which is a target value of the steering reaction force in consideration of the grip state quantity, and wherein the grip state quantity calculating unit is configured to calculate the grip state quantity at the distribution proportions including a first grip component based on the ideal axial force and the road-surface axial force when a traveling state quantity indicating the traveling state of the vehicle represents a low-speed state including a stopped state and to calculate the grip state quantity at the distribution proportions including a second grip component based on at least the vehicle state quantity axial force when the traveling state quantity represents an intermediate-to-high speed state which is faster than the stopped state.

15. The steering control device according to claim 14, wherein the grip state quantity calculating unit is configured to calculate the grip state quantity such that the distribution proportion of the second grip component increases as the traveling state quantity becomes closer to the intermediate-to-high speed state from the low-speed state.

16. The steering control device according to claim 14, wherein the grip state quantity calculating unit is configured to calculate the grip state quantity at the distribution proportions including only the first grip component when the traveling state quantity represents the low-speed state.

17. The steering control device according to claim 14, wherein the grip state quantity calculating unit is configured to calculate the grip state quantity at the distribution proportions including only the second grip component when the traveling state quantity represents the intermediate-to-high speed state.

* * * * *